United States Patent
Perkowski

(10) Patent No.: US 7,089,199 B2
(45) Date of Patent: *Aug. 8, 2006

(54) SYSTEM FOR AND METHOD OF MANAGING AND DELIVERING MANUFACTURER-SPECIFIED CONSUMER PRODUCT INFORMATION TO CONSUMERS IN THE MARKETPLACE

(75) Inventor: Thomas J. Perkowski, Darien, CT (US)

(73) Assignee: Metrologic Instruments, Inc., Blackwood, NJ (US)

( * ) Notice: Subject to any disclaimer, the term of this patent is extended or adjusted under 35 U.S.C. 154(b) by 255 days.

This patent is subject to a terminal disclaimer.

(21) Appl. No.: 10/281,336

(22) Filed: Oct. 24, 2002

(65) Prior Publication Data

US 2004/0019535 A1 Jan. 29, 2004

Related U.S. Application Data

(63) Continuation of application No. 09/284,917, filed as application No. PCT/US97/19227 on Oct. 27, 1997, now abandoned.

(51) Int. Cl.
*G06F 17/60* (2006.01)

(52) U.S. Cl. ............................. 705/27; 705/26
(58) Field of Classification Search ............ 705/26, 705/27
See application file for complete search history.

(56) References Cited

U.S. PATENT DOCUMENTS 5,157,687 A 10/1992 Tymes (Continued)

FOREIGN PATENT DOCUMENTS

EP 0 645 728 A2 3/1995

(Continued)

OTHER PUBLICATIONS

IDOC's, Linking the worlds of print and electronic media, dated Sep. 1998.*

(Continued)

*Primary Examiner*—Mark Fadok
(74) *Attorney, Agent, or Firm*—Thomas J. Perkowski, Esq., P.C.

(57) ABSTRACT

A method of managing and delivering manufacturer-specified consumer product information to consumers in the marketplace. For a plurality of UPN-labeled consumer products offered for sale within a the marketplace, the manufacturer of the plurality of UPN-labeled consumer products or an agent thereof, accesses an Internet-enabled relational database and store therein, information elements representative of (1) a plurality of universal product numbers (UPNs) assigned to the plurality of UPN-labeled consumer products manufactured by the manufacturer and registered with the relational database, and (2A) a trademark (TM) symbolically linked to each the UPN, (2B) a product description (PD) symbolically linked to each the UPN, and (2C) one or more uniform resource locators (URLs) symbolically linked to each the UPN, wherein each the URL specifies the location of an information resource located on the Internet and related to one of the plurality of UPN-labeled consumer products registered with the relational database by the manufacturer, and wherein a UPN/TM/PD/URL data link is created and maintained in the relational database for each the UPN-labeled consumer product registered with the relational database by the manufacturer. A consumer within the marketplace transmits a request to the relational database from the Internet-enabled client computer. The UPN, TM and/or PD contained in the request enabled the consumer to access the URLs symbolically linked to the UPN, TM and/or PD, and the URLS are then transmitted to the Internet-enabled client computer for display to and use by a consumer in accessing information resources stored in the Internet-based product information servers, at the URLs.

14 Claims, 31 Drawing Sheets

U.S. PATENT DOCUMENTS

| | | |
|---|---|---|
| 5,297,249 A | 3/1994 | Bernstein et al. |
| 5,355,472 A | 10/1994 | Lewis |
| 5,398,336 A | 3/1995 | Tantry et al. |
| 5,448,046 A | 9/1995 | Swartz |
| 5,572,643 A | 11/1996 | Judson |
| 5,592,378 A | 1/1997 | Cameron et al. |
| 5,600,833 A | 2/1997 | Senn et al. |
| 5,612,527 A | 3/1997 | Ovadia |
| 5,640,193 A | 6/1997 | Wellner |
| 5,715,444 A | 2/1998 | Danish et al. |
| 5,825,002 A | 10/1998 | Roslak |
| 5,869,819 A | 2/1999 | Knowles et al. |
| 5,890,175 A | 3/1999 | Wong et al. |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,918,213 A | 6/1999 | Bernard et al. |
| 5,918,214 A | 6/1999 | Perkowski |
| 5,923,884 A | 7/1999 | Peyret et al. |
| 5,930,767 A | 7/1999 | Reber et al. |
| 5,933,829 A | 8/1999 | Durst et al. |
| 5,940,595 A | 8/1999 | Reber et al. |
| 5,950,173 A | 9/1999 | Perkowski |
| 5,963,916 A | 10/1999 | Kaplan |
| 5,978,773 A | 11/1999 | Hudetz et al. |
| 5,979,757 A | 11/1999 | Tracy et al. |
| 5,986,651 A | 11/1999 | Reber et al. |
| 5,992,752 A | 11/1999 | Wilz, Sr. et al. |
| 5,995,105 A | 11/1999 | Reber et al. |
| 6,012,102 A | 1/2000 | Shachar |
| 6,027,024 A | 2/2000 | Knowles |
| 6,045,048 A | 4/2000 | Wilz, Sr. et al. |
| 6,064,979 A | 5/2000 | Perkowski |
| 6,081,827 A | 6/2000 | Reber et al. |
| 6,108,656 A | 8/2000 | Durst et al. |
| 6,138,151 A | 10/2000 | Reber et al. |
| 6,152,369 A | 11/2000 | Wilz et al. |
| 6,199,048 B1 | 3/2001 | Hudetz et al. |

FOREIGN PATENT DOCUMENTS

| | | |
|---|---|---|
| EP | 0 744 856 A2 | 11/1996 |
| EP | 0 856 812 A2 | 5/1998 |
| WO | WO 97/01137 | 1/1997 |
| WO | WO 97/37319 | 10/1997 |
| WO | WO 98/03923 | 1/1998 |
| WO | WO 98/06055 | 2/1998 |
| WO | WO 98/09243 | 3/1998 |
| WO | WO 98/19259 | 5/1998 |
| WO | WO 98/20411 | 5/1998 |
| WO | WO 98/20434 | 5/1998 |
| WO | WO 98/20440 | 5/1998 |
| WO | WO 98/21679 | 5/1998 |
| WO | WO 98/21713 | 5/1998 |
| WO | WO 98/24036 | 6/1998 |
| WO | WO 98/24049 | 6/1998 |
| WO | WO 98/29822 | 7/1998 |
| WO | WO 98/34458 | 8/1998 |
| WO | WO 98/35297 | 8/1998 |
| WO | WO 98/38589 | 9/1998 |
| WO | WO 98/38761 | 9/1998 |
| WO | WO 98/51035 | 11/1998 |
| WO | WO 98/51036 | 11/1998 |
| WO | WO 98/51077 | 11/1998 |
| WO | WO 98/57295 | 12/1998 |
| WO | WO 98/58320 | 12/1998 |
| WO | WO 99/00756 | 1/1999 |
| WO | WO 99/33013 | 7/1999 |
| WO | WO 99/33014 | 7/1999 |

OTHER PUBLICATIONS

Operating manual for the QRS Keystone for Vendors (1996) by QRS Corporation, www.qrs.com, pp. 1–126.

Operating manual for the QRS Keystone for Retailers (1996) by QRS Corporation, www.qrs.com, pp. 1–115.

Investors Press Release entitled "Newest Addition to ViaLink Services: Exchange Manager" (Aug. 1997) by Applied Intelligence Group, Inc., http://www2.vialink.com/investors/press_releases/02_24_98.html, pp. 1–2.

Web–based technical report entitled "Amended Annual Report (10KSB) for Applied Intelligence Group, Inc." http://www.edgar–online.com, Mar. 28, 1997, pp. 1–55.

Draft Technical Report entitled "The Retail Store of the Future: Crest of the Third Wave" by Robert J. Corey, Ph.D. and John R. Spears, Ed.D., Jan. 15, 1997, pp. 1–45.

Investors Press Release entitled "ViaLink Item Catalog Services Goes Online" (Jan. 1997), by Applied Intelligence Group, Inc., http://www/vialink.com/investors/press_releases, pp. 1.

Scientific publication entitled "IDOCs™ Linking the Worlds of Print and Electronic Media$^{SM}$" by NeoMedia Technologies, Inc., Sep. 11, 1998, pp. 1–8.

Product brochure entitled "The Catalog" (1996) by Quick–Response Services Corporation, www.qrs.com, pp. 1–2.

Product Brochure for the PREMO WEBDOX by Premenos Corporation, Concord, CA, www.premenos.com, 1997 1 page.

Operating manual entitled "WEBDOX General Information Manual" by Premenos Corp., Concord, CA, 1996–1997, pp. 1–20.

Scientific publication entitled "World–Wide Web: The Information Universe", 1996, by Tim Berners–Lee et al., CERN, 1211 Geneva 23, Switzerland, pp. 1–8.

Web–based product brochure for the Synclink Item Catalog by Vialink, Inc., http://www.vialink.com/products/products–catalog.html, 1 page.

Product brochure for "NCR Web Kiosk Solutions" by NCR Corporation, www.ncr.com, 1999, pp. 1–14.

PCT/US97/19227, 1998.

* cited by examiner

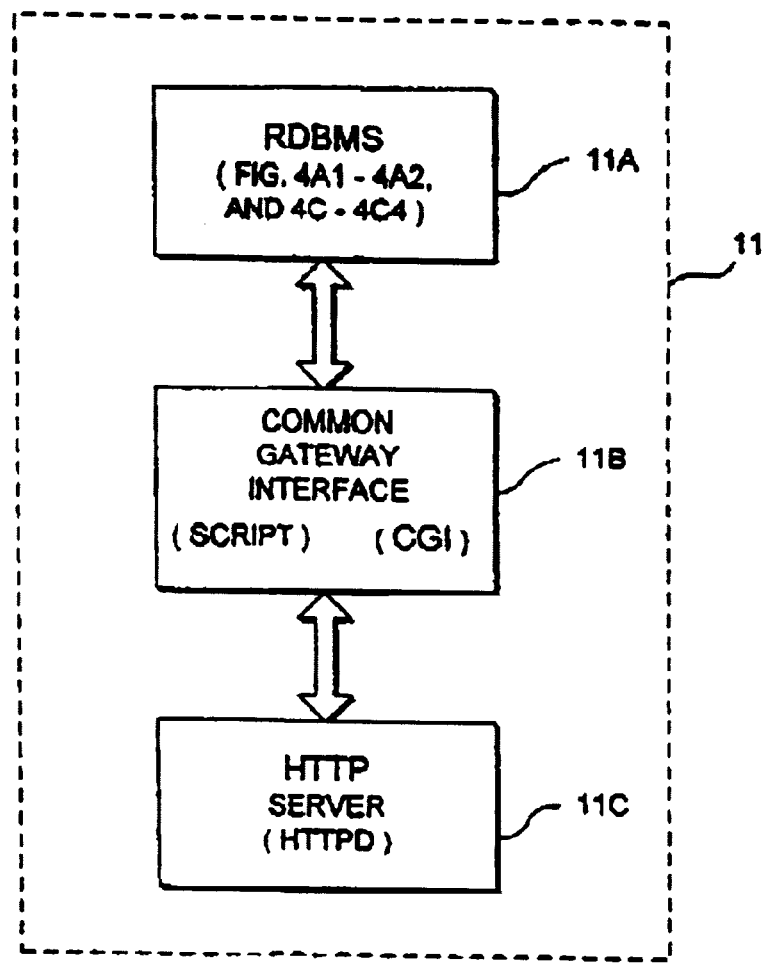
F I G. 2B

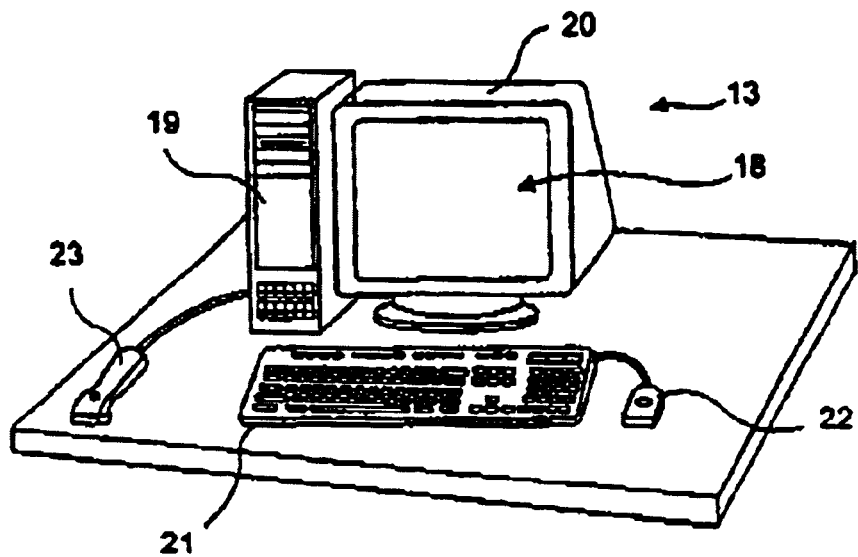
FIG. 3A1
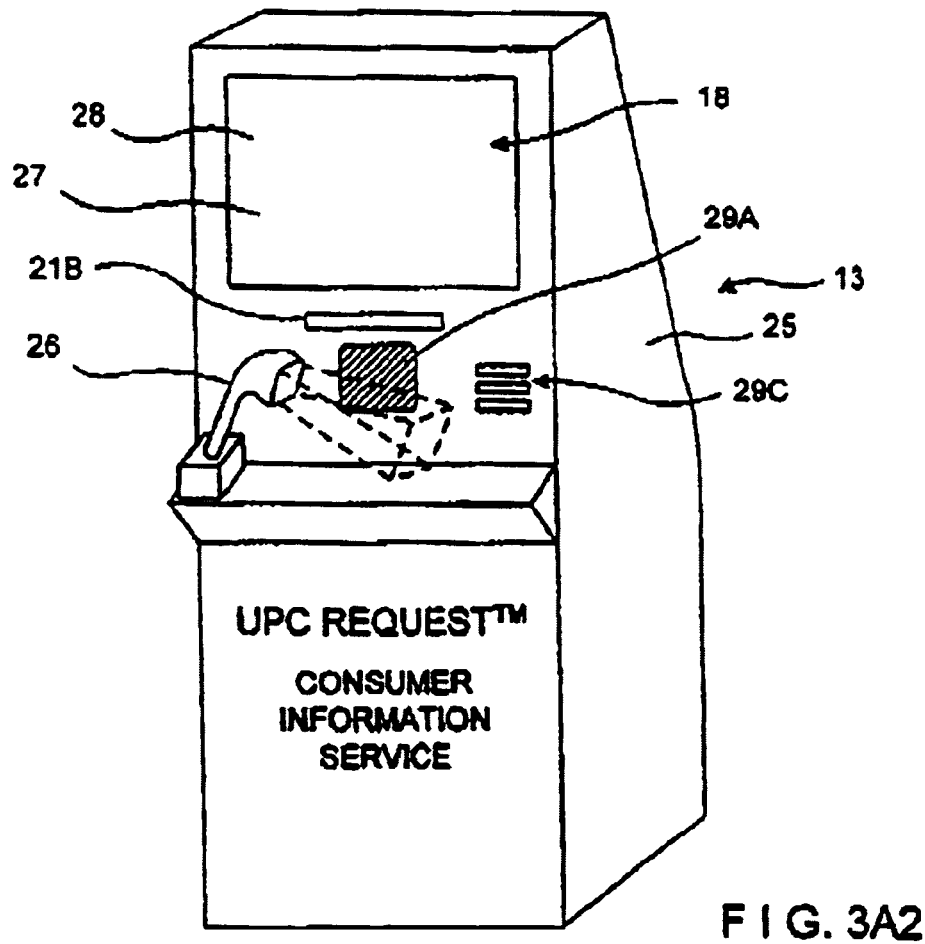
UPC REQUEST™
CONSUMER
INFORMATION
SERVICE
FIG. 3A2

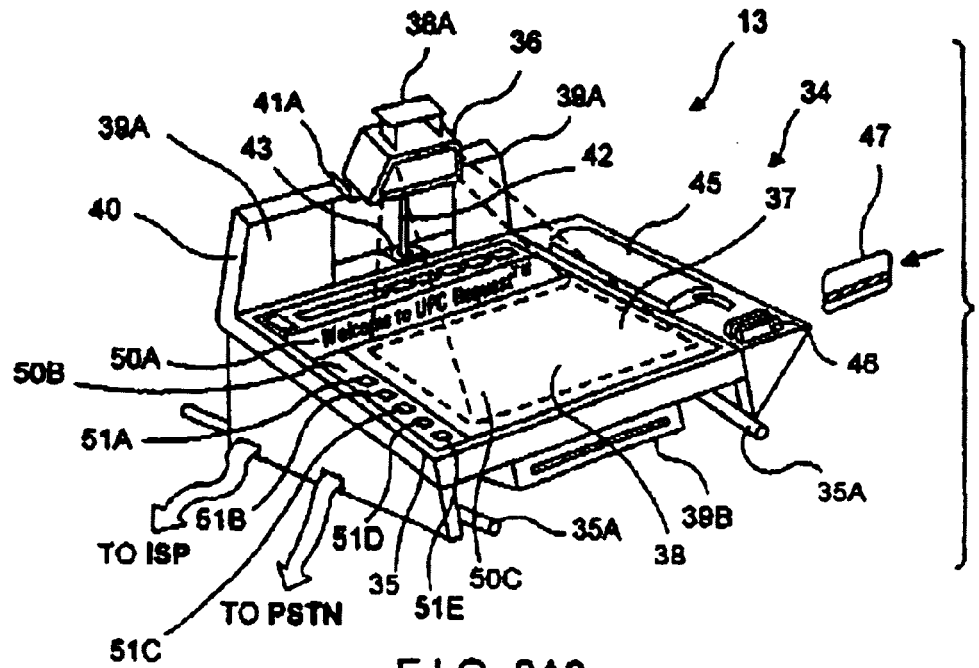
FIG. 3A3
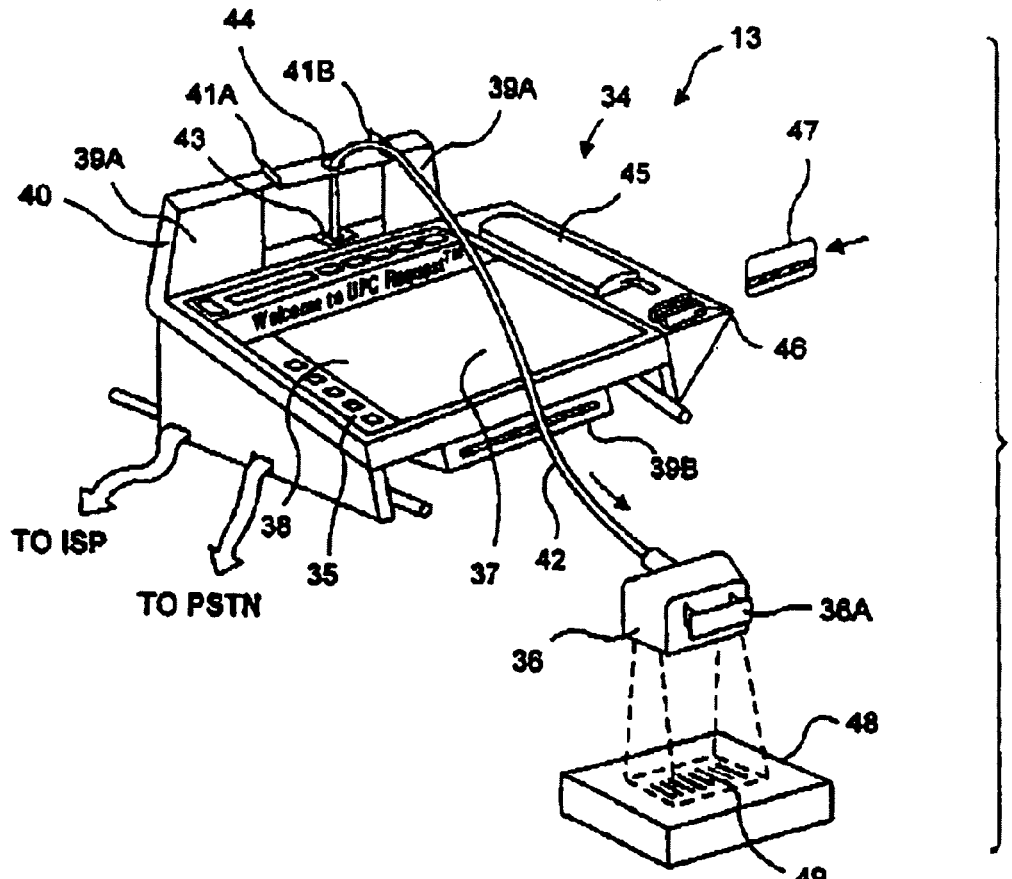
FIG. 3A3'

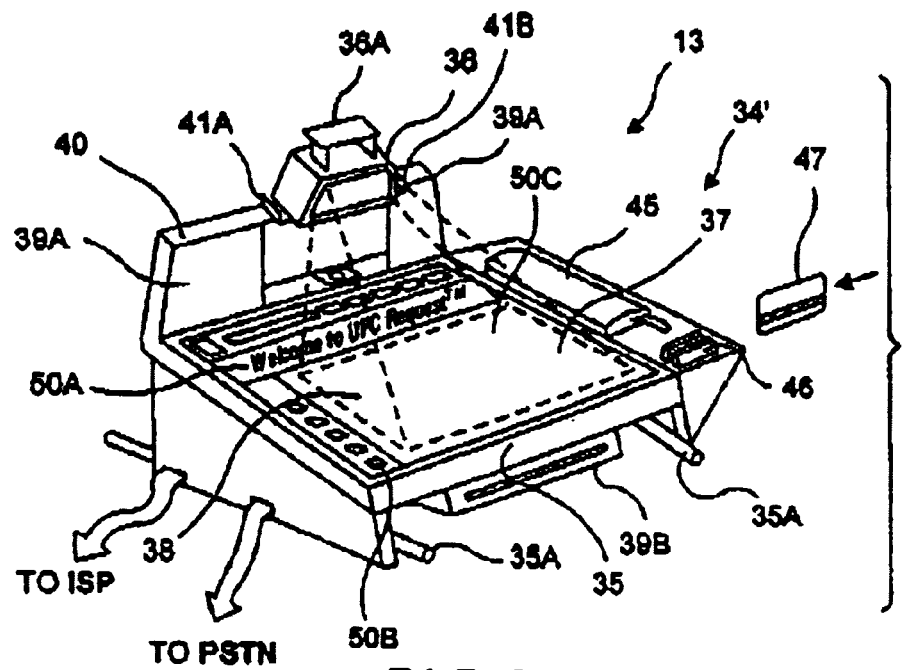
FIG. 3A4
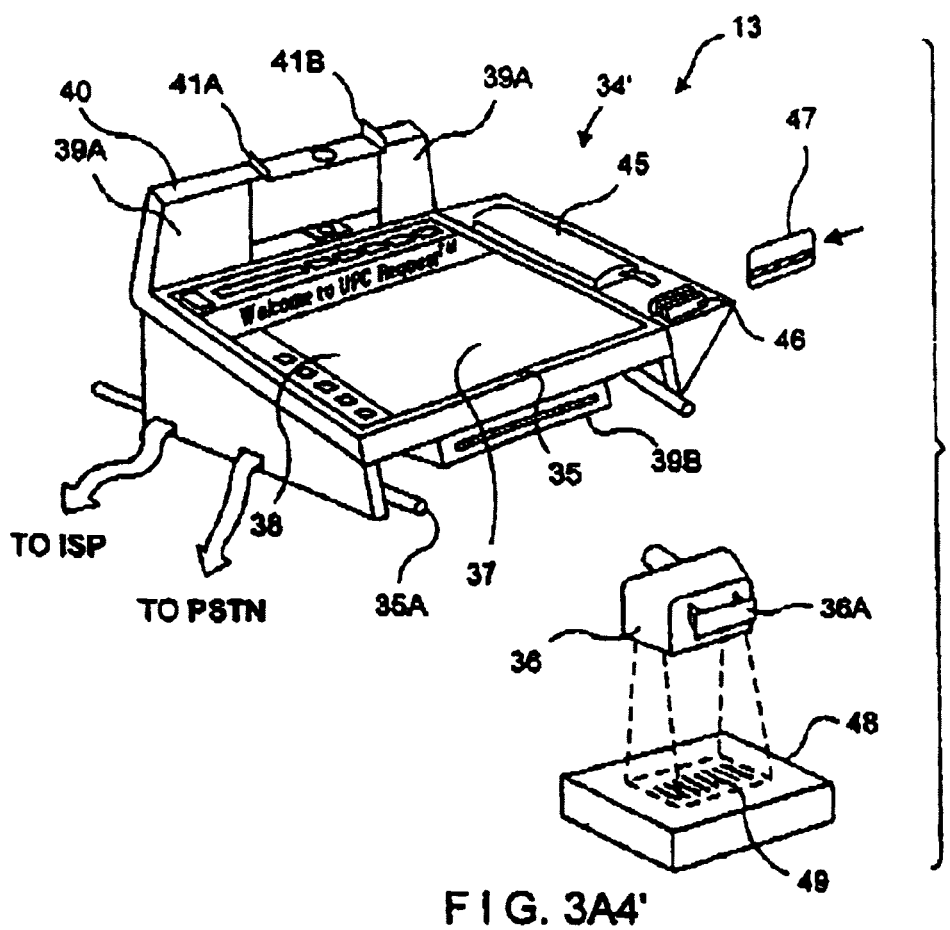
FIG. 3A4'

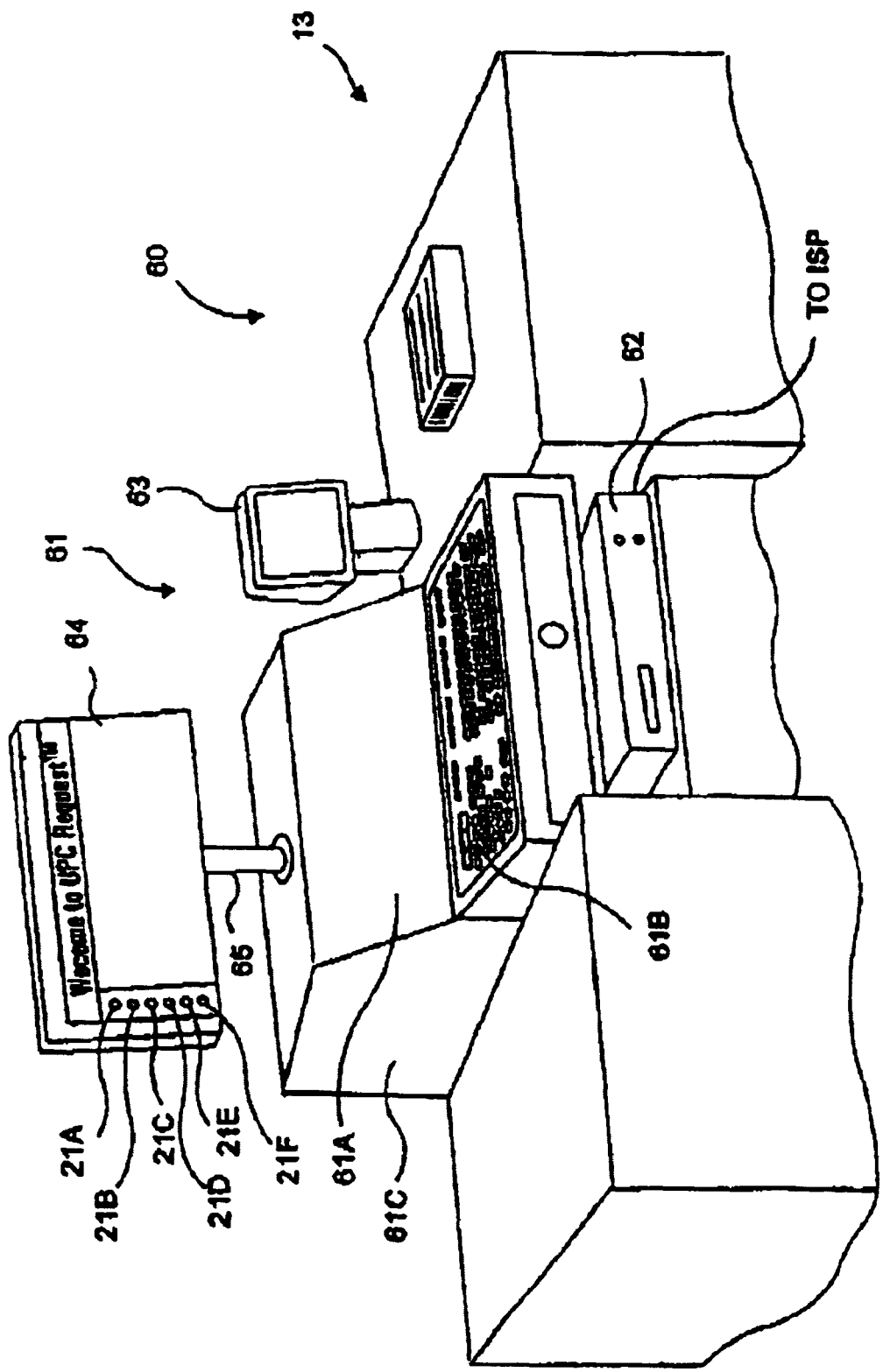
FIG. 3A5

| IP/SN | REGISTRANT'S NAME AND ADDRESS | PRODUCT DESCRIPTION | UNIFORM RESOURCE LOCATOR (URL) | TRADE/ SERVICE MARKS | e-mail Address | Status |
|---|---|---|---|---|---|---|
| 7/189808/17674/0 | APPLE COMPUTER,INC. CUPERTINO,CALIF. | POWER MAC. 7600/120 PERSONAL COMPUTER | http://www.power./pc | POWER MAC. | | |
| 0/373/100/6 | PROCTOR & GAMBLE | TOOTH PASTE | http://www.tooth.p./pc | CREST | | |
| 3/12547/68404/0 | WARNER WELCOME | ACID REDUCER | http://www.zantac./pc | ZANTAC, ZANTAC 75 | | |
| 0/00005/17643/4 | KODAK, INC. | FILM PROCESSING | http://www.kodak./pc | KODAK | | |
| ... | ... | ... | ... | ... | ... | ... |
| 0/27242/510579 | SONY., INC. | PERSONAL COMPUTER | http://www.sony.com./pc | SONY | | |

FIG. 4A1

| URL$_i$ | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLANEOUS INFORMATION FIELD | PRODUCT ADVERTISEMENT INFORMATION FIELD |
|---|---|---|---|---|---|---|---|
| | | | | | | | |
| | | | | | | | |
| | | | | | | | |
| ... | ... | ... | ... | ... | ... | ... | ... |
| | | | | | | | |

FIG. 4A2

| IP/SN | REGISTRANT'S NAME AND ADDRESS | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| 0/30000/01020/4 | QUAKER, INC. | OATMEAL | QUAKER | | |
| 0/496/390/1 | COCA COLA, INC. | COLA SODA | COCA - COLA, COKE | | |
| 0/7699/24245/2 | WARNER BROS. | PAT METHANY AUDIO CD | GEFFEN | | |
| ... | ... | ... | ... | ... | ... |

| Info. Resources on WWW |
|---|
| UPC Number |
| Manufacturer ID Number |
| Manufacturer Product Number |
| Company Name |
| URL For Product Description |
| URL For Product Manual |
| URL For Warranty Service |
| URL For WWW Advertisement |
| URL For WWW Advertisement |
| URL For WWW Advertisement |
| URL For Product Wholesaler |
| URL For Product Wholesaler |
| URL For Product Retailer No.1 |
| URL For Product Retailer No.2 |
| URL For Product Retailer No.3 |
| URL For Direct Product Purchase |
| URL For Complementary Product |
| URL For Complementary Product |
| URL For Complementary Product |
| URL For Company Annual Report |
| URL For Company Stock Purchase |

FIG. 4C3

| Consumer Product |
|---|
| UPC Number |
| Company Name |
| Manufacturer ID Number |
| Manufacturer Product Number |
| Manufacturer Website URL |
| Product Description |
| Primary Trademark |
| Secondary Trademark |
| Package Type |
| UPC Symbol Type |
| Website Marking on Package |
| 800 Consumer Phone Number |

FIG. 4C2

| RETAILER |
|---|
| Company Name |
| Street Address |
| City |
| State |
| Postal Code |
| Country |
| Manufacturer ID Number |
| Contact Person |
| Phone Number |
| E-Mail |
| Domain Name |
| Website Creation Date |
| Website Existence |
| Manufacturer Website URL |
| Manufacturer No. 1 |
| Manufacturer No. 2 |
| Manufacturer No. 3 |
| Manufacturer No. 4 |
| Manufacturer No. 5 |
| Manufacturer No. 6 |
| Manufacturer No. 7 |
| Manufacturer No. 8 |
| Manufacturer No. 9 |
| Manufacturer No. 10 |
| ⋮ |
| Manufacturer No. N |

FIG. 4D

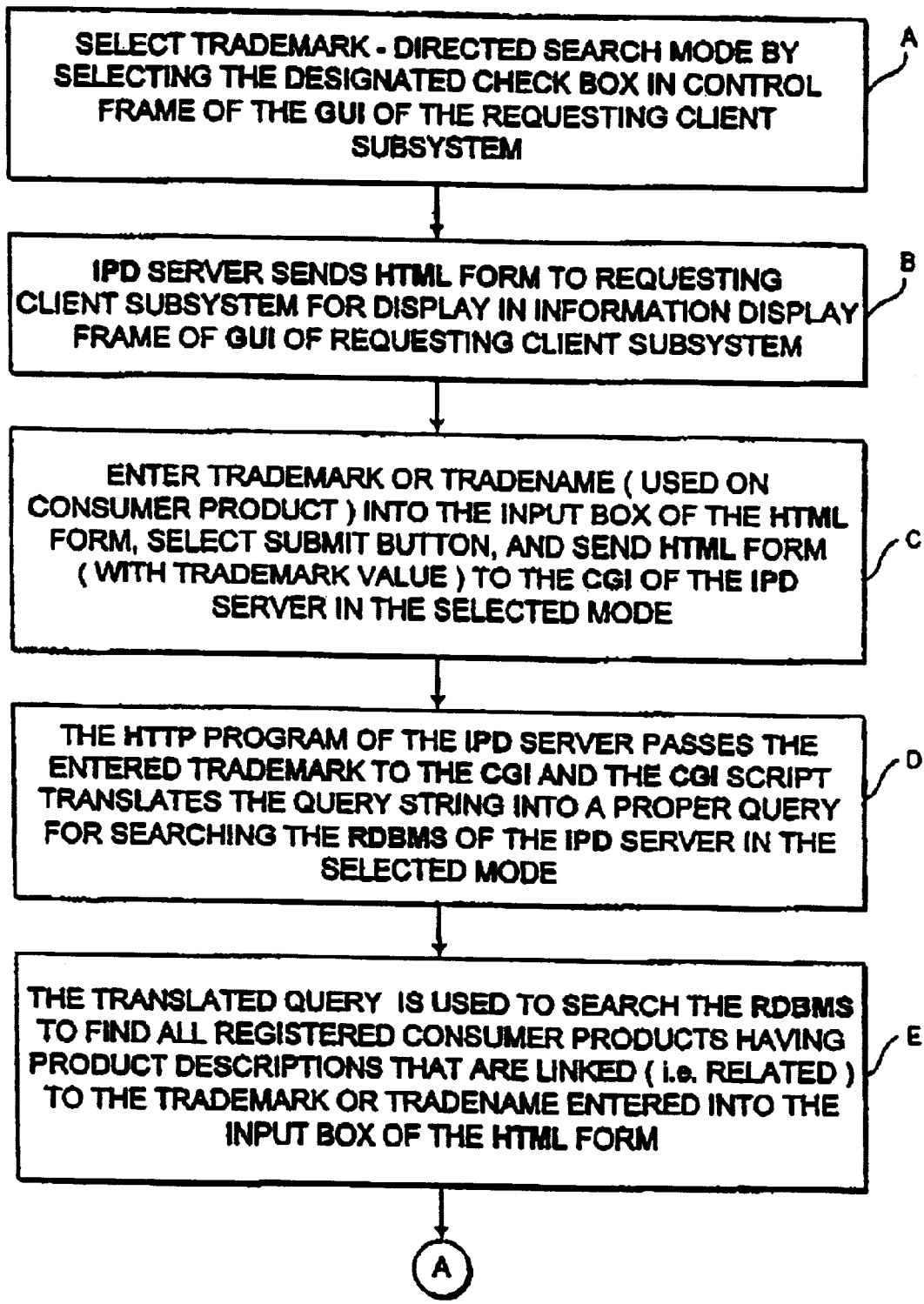
FIG. 6D1

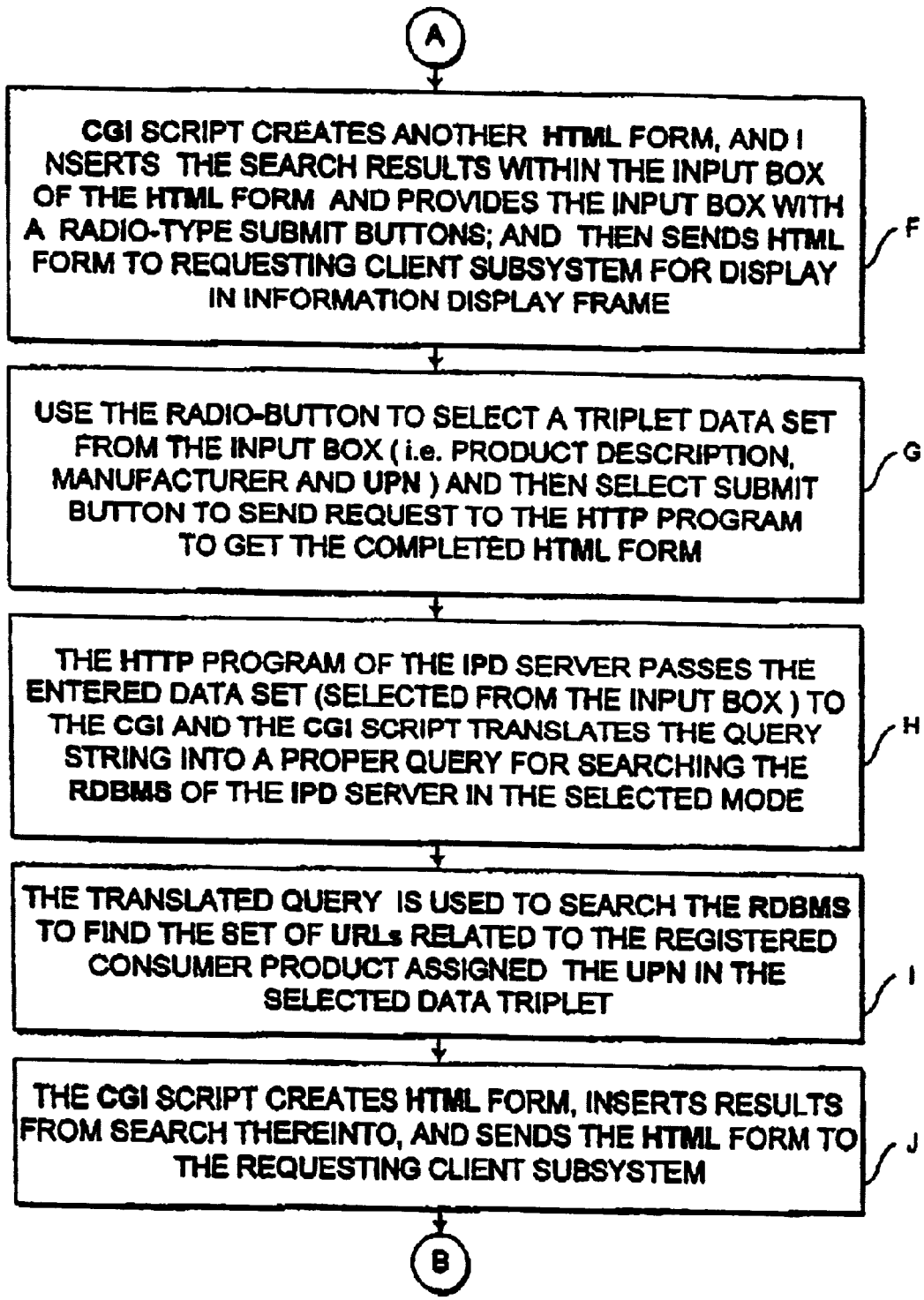
FIG. 6D2

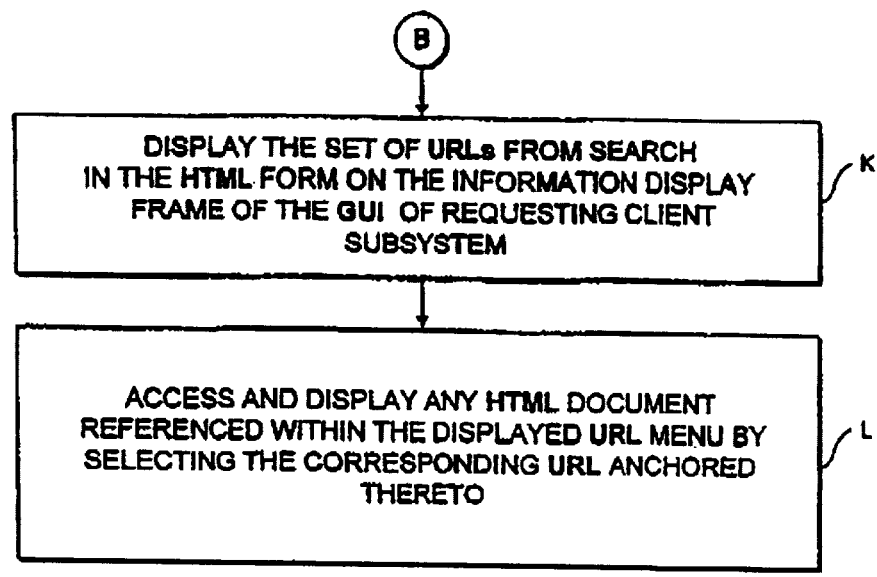
F I G. 6D3

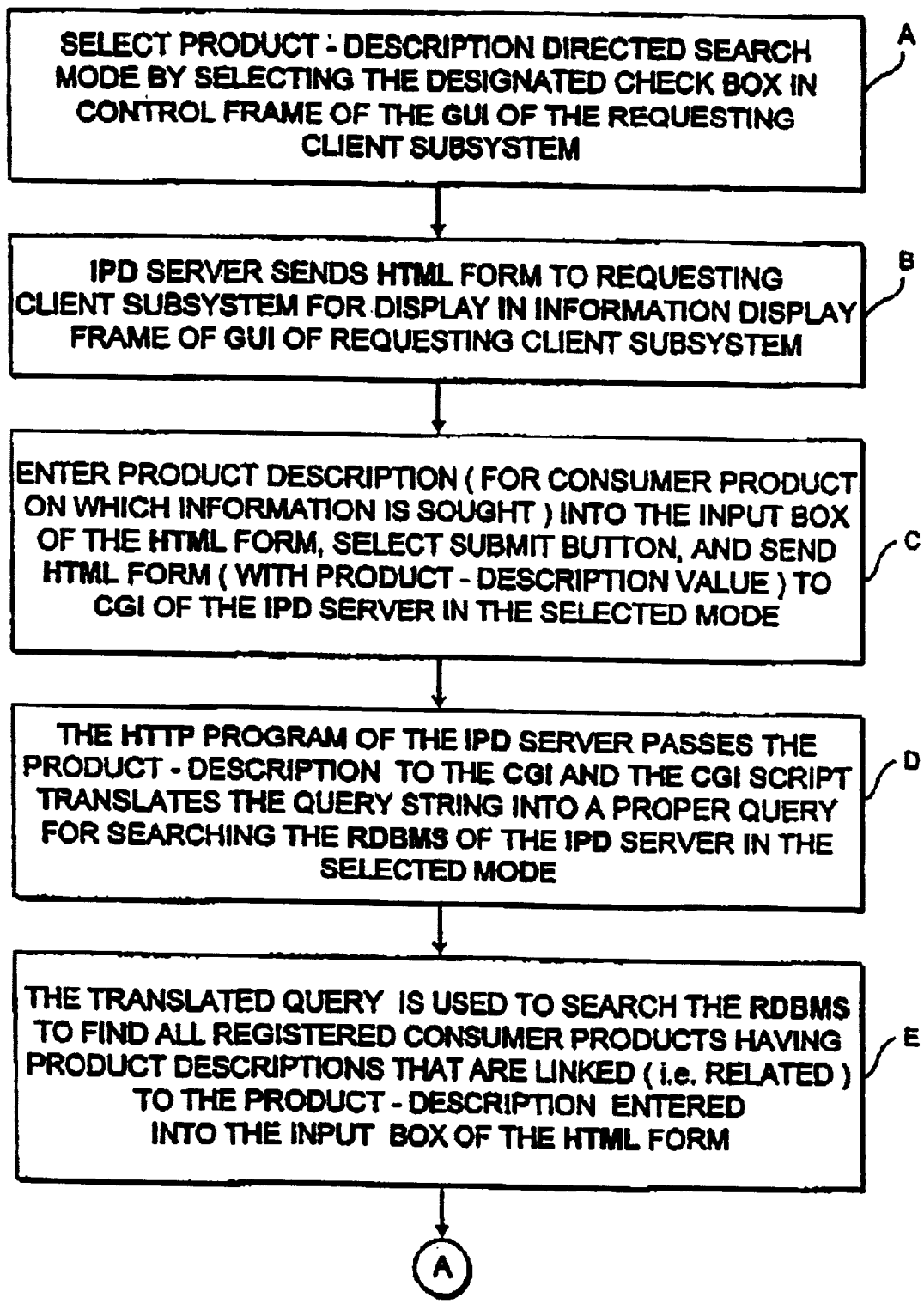
FIG. 6E1

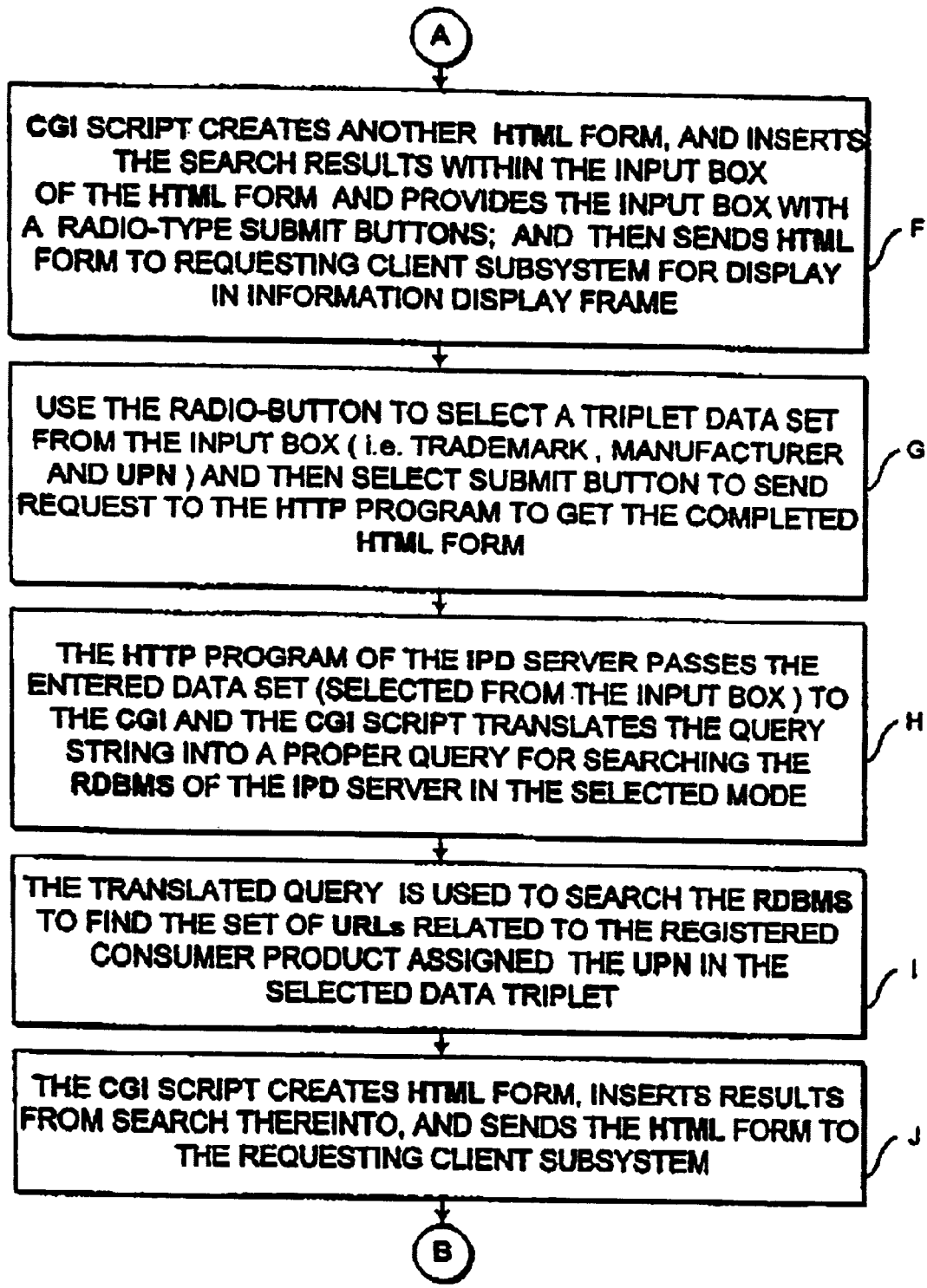
FIG. 6E2

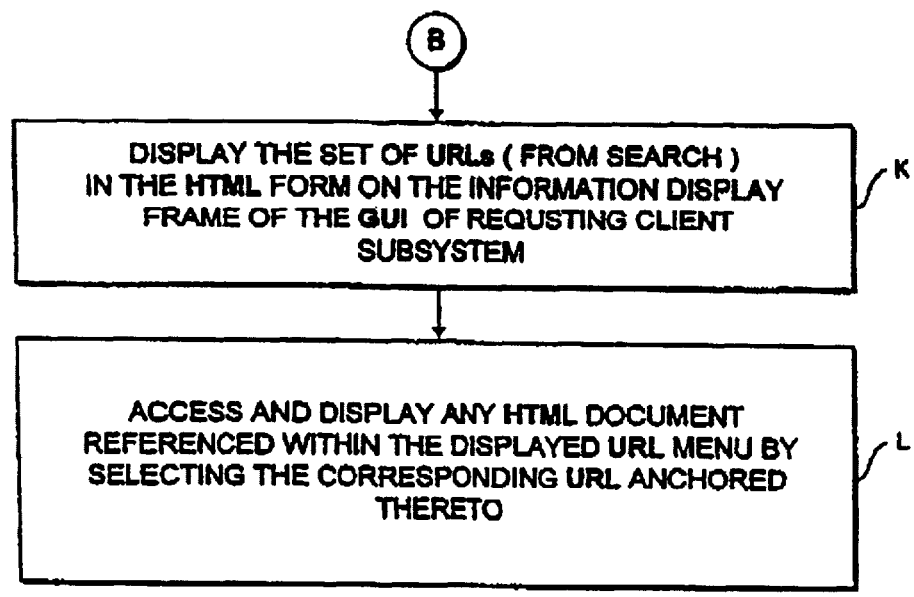
FIG. 6E3

SYSTEM FOR AND METHOD OF MANAGING AND DELIVERING MANUFACTURER-SPECIFIED CONSUMER PRODUCT INFORMATION TO CONSUMERS IN THE MARKETPLACE

RELATED CASES

This Application is a Continuation of application Ser. No. 09/284,917, now abandoned, which was entered into the U.S. on Apr. 21, 1999 and which is a National Phase Entry Application of International Application PCT/US97/19227 filed Oct. 27, 1997, which claims priority to the earlier filed U.S. application Ser. No. 08/736,798 filed Oct. 25, 1996, now U.S. Pat. No. 5,918,914; U.S. application Ser. No. 08/752,136 filed Nov. 19, 1996, now U.S. Pat. No. 6,6064,979; U.S. application Ser. No. 08/826,120 filed Mar. 27, 1997, now abandoned; U.S. application Ser. No. 08/854,877 filed May 12, 1997, now U.S. Pat. No. 9,950,173; U.S. application Ser. No. 08/871,815 filed Jun. 9, 1997; and U.S. application Ser. No. 08/936,275 filed Sep. 9,1997.

BACKGROUND OF INVENTION

1. Field of Invention

The present invention generally relates to a novel system and method for collecting consumer-product related information and transmitting and delivering the same along the consumer-product supply and demand chain using the National Information Infrastructure (e.g. the Internet), and more particularly to a novel system and method for delivering consumer product related information to consumers within retail environments using Internet-based information servers and sales agents.

2. Brief Description of the Prior Art

Dissemination of consumer-product information between manufacturers and their retail trading partners must be accurate and timely. The traditional methods of phone calls and faxes are time consuming and resource intensive. An electronic Universal Product Code (UPC) Catalog (i.e. database system), accessible 24 hours a day, is a solution. In 1988, QuickResponse Services (QRS), Inc. Of Richmond, Calif., introduced the first independent product information database, using the retail industry standard UPC numbering system. Today the QRSolutions™ Catalog contains information on over 52 million products from over 1500 manufacturers. The QRSolutions Catalog is a Windows-based application providing a critical information flow link between the retailers and the manufacturers along the supply and demand chain.

After assigning a UPC number to each item, the manufacturer organizes and sends the data, via an electronic data interchange (i.e. EDI) transmission, or a tape, to QRS, Inc. to be loaded into the UPC Catalog database. Changes to the data can be made on a daily basis. Retailers with access to a manufacturer's data can view and download the data once it has been added or updated. Automatic update capabilities ensure the most recent UPC data will be in the EDI mailbox of each retailer customer quickly.

The effect of a centralized database such as QRS's UPC Catalog improves the flow of merchandise from the manufacturer to the retailer's selling floor and ultimately to the consumer. With the UPC Catalog, accurate, up-to-date product information is available when the retailer needs it, eliminating weeks from the order cycle time.

In addition to the electronic UPC-based product information subsystem (i.e. UPC Catalog) described above, a number of other information subsystems have been developed for the purpose of providing solutions to problems relating to electronic commerce (EC) merchandising and logistics within the global supply chain. Such ancillary information subsystems include, for example: Sales and Analysis and Forecasting Subsystems for producing and providing retailers with information about what products consumers are buying; Collaborative Replenishment Subsystems for determining what products retailer can be buying in order to satisfy consumer demand at any given point of time; and Transportation and Logistics Information Subsystems for producing and providing retailers with information about when products purchased by them (at wholesale) will be delivered to the their stores. Typically, such information subsystems are connected to various value added information networks in order to efficiently offer such information services to retailers on a global basis.

While the above-described information systems collectively cooperate to optimize the process of moving raw materials into finished products and into the hands of consumers, such information systems simply fail to address the information needs of the consumers of retail products who either require or desire product-related information prior to as well as after the purchase of consumer-products.

Presently, an enormous amount of time, money and effort is being expended by companies in order to advertise and sell their products and services, and after product purchase has taken place, to provide product related information, product warranty service and the like. For decades, various types of media have been used to realize such fundamental business functions.

In recent times, there has have been a number of significant developments in connection with the global information network called the "Internet", which has greatly influenced many companies to create multi-media Internet Websites in order to advertise, sell and maintain their products and services. Examples of such developments include, for example: the World Wide Web (WWW) based on the Hypertext Markup Language (HTML) and the Hypertext Transmission Protocol (HTTP) by Tim Berners-Lee, et al.; easy to use GUI-based Internet navigation tools, such as the Netscape® browser from Netscape Communications, Inc., the Internet Explorer™ browser from MicroSoft Corporation and the Mosaic™ browser from Spyglass Corporation; and the Virtual Reality Modeling Language (VRML) by Mark Pecse. Such developments in recent times have made it very easy for businesses to create 2-D Hypermedia-based Home Pages and 3-D VR Worlds (i.e. 3-D Websites) for the purpose of projecting a desired "corporate image" and providing a backdrop for financial investment solicitation as well as product advertising, sales and maintenance operations.

Presently, a person desiring to acquire information about any particular product has a number of available search options. In particular, he or she may attempt to directly contact the manufacturer, wholesaler or reseller by telephone, US mail, e-mail, or through the company's World Wide Website (WWW), if they have one. In the event one decides to acquire product information through the seller's WWW site, he or she must first determine the location of its WWW site (i.e. Internet address) which oftentimes can involve using Internet Search engines such as Yahoo®, AltaVista™, WebCrawler™, Lycos™, Excite™, or the like. This can be a very time consuming process and sometimes leads to a dead end. Once the Internet address is obtained, one must then review the home page of the company's Website in order to find where, if at all, information about a particular product resides on the Website. This search process can be both time consuming and expensive (in terms of Internet time) and may not turn up desired information on the product of interest.

In some instances, product brochures bear a preprinted Internet address designed to direct or point prospective customers to a particular Website where more detailed product information can be found. A recent example of this "preprinted Web Address" pointing technique is the 1996 product brochure published by the Sony Corporation for its Sony® PCV-70 Personal Computer, which refers prospective customers to the Sony Web Address "http://www.sony.com/pc". While this approach provides a direct way of finding product related information on the Internet, it is not without its shortcomings and drawbacks.

In particular, when a company improves, changes or modifies an existing Website which publishes product and/or service advertisements and related information, it is difficult (if not impossible) not to change the Internet locations (e.g. Web addresses) at which such product and/or service advertisements and related information appear. Whenever a company decides or is forced to change any of its advertising, marketing and/or public relations firms, there is a substantial likelihood that new Websites will be created and launched for particular products and services, and that the Web addresses of such new Websites will no longer correspond with the Web addresses on preprinted product brochures currently in circulation at the time. This can result in pointing a consumer to erroneous or vacant Websites, that present either old or otherwise outdated product and/or service information, possibly adversely influencing the consumer's purchasing decision.

Moreover, when a company launches a new Website as part of a new advertising and marketing campaign for a particular product, any preprinted advertising or marketing material relating to such products will not reflect the new Website addresses which the campaign is attempting to get consumers to visit. This fact about preprinted advertising media renders it difficult to unify new and old advertising media currently in circulation into an advertising and marketing campaign having a coherent theme. In short, the inherently static nature of the "preprinted Web address" pointing technique described above is wholly incapable of adjusting to the dynamic needs of advertising, marketing and public relations firms alike.

In addition to the above-described techniques, I-World by Mecklermedia has recently launched a commercial product finding a database on the Internet called "Internet Shopper". Notably, the "Internet Shopper" database is organized by specific types of product categories covering computer and telecommunication related technologies. While this product information finding service may be of help to those looking to buy computer or communication equipment, it fails to provide an easy way to find information on previously purchased products, or on products outside of the field of communication or computer technology. Consequently, the value of this prior art technique is limited to those considering the purchase of products catalogued within the taxonomy of the "Internet Shopper" directory.

In view of the inherent limitations of I-World's "Internet Shopper" and other product finding directories on the Internet, such as "NetBuyer" by Computer Shopper (at "http://www.netbuyer.com"), the National Information Infrastructure Testbed (NIIT) organization has recently formed a "confidential committee of NIIT members" under the title "Universal Product and Service Code Project". The stated problem addressed by this Project is how to locate specific goods and services on the Internet, and compare prices and other critical market information. As publicized in a NIIT Project Abstract, the "Universal Product and Service Code Project seeks to make it easier to electronically locate goods and services on the Internet using universal product and services identifiers and locators. As stated in the Project Abstract, the "NIIT believes that changing the way in which Internet information is organized is fundamental to solving this problem. In the Universal Product and Service Code Project, NIIT members are currently exploring how coding structures can help organize information about products accessible using the Internet. NIT's goal is to inform the development of formalized coding standards that can be used nationally and internationally so that users can locate goods and services through simple searching and browsing methods. In turn, more advanced features, such as comparison shopping, can be added as "intelligent agent" software programs are refined to enable users to search and retrieve products linked to these structures."

While the NIIT's Universal Product and Service Code Project seeks ways of locating specific goods and services on the Internet, all proposals therefor recommend the development of formalized coding standards and searching and browsing methods which are expensive and difficult to develop and implement on a world-wide basis. Moreover, such sought after methods will be virtually useless to consumers who have already purchased products and now seek product related information on the Internet.

In summary, prior art "demand chain management" systems have provided: (i) procurement services consisting of UPC Catalogs accessible through the Internet and EDI networks; (ii) inventory management services consisting of replenishment, sales analysis and forecasting services; and (iii) distribution management services consisting of EDI and logistics management services. However, prior art "demand chain management" systems have failed to address the information needs of the consumers of retail products who either require or desire product-related information prior to as well as after the purchase of consumer-products. Consequently, prior art demand chain management systems operate in an open-loop mode with a "break" in information flow cycle, disabling the manufacturers from communicating with the consumers in an efficient manner to satisfy consumer needs.

Thus, it is clear that there is great need in the art for an improved system and method for collecting product related information and transmitting and delivering the same between the manufacturers and retailers of products to the consumers thereof in various environments, while avoiding the shortcomings and drawbacks of prior art systems and methodologies.

OBJECTS AND SUMMARY OF INVENTION

Accordingly, a primary object of the present invention is to provide a novel method and apparatus for collecting product-related information and transmitting and delivering the same between the manufacturers and retailers of products to the consumers thereof in retail shopping environments as well as at home, work and on the road, while overcoming the shortcomings and drawbacks of prior art systems and methodologies.

Another object of the present invention is to provide such an apparatus in the form of a novel consumer-product information collection, transmission and delivery system.

Another object of the present invention is to provide such a system with an Internet-based product information database subsystem which, for each commercially available consumer-product, stores a number of information elements including: the name of the manufacturer; the Universal Product Code (UPC) assigned to the product by the manufacturer; one or more URLs specifying the location of information resources (e.g. Web-pages) on the Internet relating to the UPC-labeled consumer-product; and the like.

Another object of the present invention is to provide such a system, in which the URLs stored in the Internet-based product information database are categorically arranged and displayed according to specific types of product information (e.g., product specifications and operation manuals; product wholesalers and retailers; product advertisements and promotions; product endorsements; product updates and reviews; product warranty/servicing; related or complementary products; product incentives including rebates, discounts and/or coupons; etc.) that relate to the kind of information required, desired or otherwise sought by consumers, wholesalers, retailers and/or trading partners; product prices at which the products are being offered for sale by a particular retailer; and the like.

Another object of the present invention is to provide such a system, wherein the information maintained within the Internet-based product information database management subsystem provides a manufacturer defined consumer-product directory that can be used by various persons along the retail supply and demand chain.

Another object of the present invention is to provide such a system, wherein the manufacturers of consumer-products are linked to the retailers thereof in the middle of the supply and demand chain by allowing either trading partner access to consumer-product information from the Internet-based product information database virtually 24 hours a day, seven days a week.

Another object of the present invention is to provide such a system, wherein consumer-product manufacturers, their advertisers, distributors and retailers are linked to the consumers of such products at the end of the supply and demand chain, by allowing such parties access to consumer-product information from the Internet-based product information database subsystem virtually 24 hours a day, seven days a week.

Another object of the present invention is to provide such a system and method of using the same, which will accelerate the acceptance of electronic commerce on the Internet and the development of the electronic marketplace, which can be used by consumers and small and large businesses alike.

Another object of the present invention is to provide a novel system and method for finding and serving consumer-product related information on the Internet.

Another object of the present invention is to provide such a system and method, wherein virtually any type of product can be registered with the system by symbolically linking or relating (i) its preassigned Universal Product Number (e.g. UPC or EAN number) or at least the Manufacture Identification Number (MIN) portion thereof with (ii) the Uniform Resource Locators (URLS) of one or more information resources on the Internet (e.g. the home page of the manufacturer's Website) related to such products.

Another object of the present invention is to provide such a system and method, wherein a Web-based document transport subsystem is provided for use by manufacturers as well as their advertisers and agents in registering the UPNs (e.g. UPC numbers) of their products and the URLs of the information resources related to such products.

Another object of the present invention is to provide such a system with an number of different modes of operation, namely: a Manufacturer/Product Registration Mode, wherein manufacturers can register their companies and consumer products (e.g. UPC numbers and URLs) with the system; an UPN-Directed Information Access Mode, wherein consumers can access and display information menus containing UPC numbers linked to URLs pointing Web pages containing consumer product related information by scanning the UPC label on the consumer product or by entering the UPC number thereof into a data-entry screen displayed by the system in this mode; a Manufacturer Website Search Mode, wherein the home page of a manufacturer's Website can be automatically accessed and displayed by scanning the UPC label on any consumer product of the manufacturer or by entering the UPC number thereof into a data-entry screen displayed by the system in this mode; a Trademark-Directed Search Mode enabling consumers to use trademarks and/or trade names associated with consumer products to search for consumer-product related information registered within the system; and a ProductDescription Directed Search Mode enabling consumers to use product descriptors associated with particular consumer products to search for consumer-product related information registered within the system.

Another object of the present invention is to provide such a system, wherein when the system is in its UPN-Directed Information Menu Access Mode, a predesignated information resource (e.g. advertisement, product information, etc.) pertaining to any commercial product registered with the system can be automatically accessed from the Internet and displayed from the Internet browser by simply entering the registered product's UPN into the Internet browser manually or by bar code symbol scanning.

Another object of the present invention is to provide such a system, wherein when the system is in its Trademark-Directed Search Mode, a predesignated information resource (e.g. advertisement, product information, etc.) pertaining to any commercial product registered with the system can be automatically accessed from the Internet and displayed from the Internet browser by simply entering the registered product's trademark(s) and/or associated company name into the Internet browser.

Another object of the present invention is to provide such a system, wherein when the system is in its Product-Description-Directed Search Mode, a predesignated information resource (e.g. advertisement, product information, etc.) pertaining to any commercial product registered with the system can be automatically accessed from the Internet and displayed from the Internet browser by simply entering the registered product's product description into the Internet browser.

Another object of the present invention is to provide such a system, wherein a predesignated information resource pertaining to any commercial product having been assigned a Universal Product Number (UPN) can be accessed from the Internet and displayed from the Internet browser by simply selecting its and then entering the UPN numeric string into an Input Box which pops up on an HTML form displayed by an Internet browser.

Another object of the present invention is to provide such a system in which a relational database, referred to as "an Internet Product Directory (IPD)," is realized on one or more datasynchronized IPD Servers for the purpose of registering product related information, namely: (i) information representative of commercial product descriptions, the trademarks used in connection therewith, the company names providing and/or promoting such products, the E-mail addresses of such companies, and the corresponding URLs on the Internet specifying current (i.e. up-to-date) Internet Website locations providing product-related information customized to such products.

Another object of the present invention is to provide such a product information finding and serving system, wherein the URLs symbolically linked to each registered product in the IPD Servers thereof are categorized as relating primarily to Product Advertisements, Product Specifications, Product Updates, Product Distributors, Product Warranty/Servicing, and/or Product Incentives (e.g. rebates, discounts and/or coupons), and that such URL categories are graphically displayed to the requester by way of easy-to-read display screens during URL selection and Website connection.

A further object of the present invention is to provide a an Internet-based System wherein: (1) manufacturers and their agents are enabled to simply link (i.e. relate), manage and update within a centralized database, the UPC (and/or UPC/EAN) numbers on their products and the Uniform Resource Locators (URLs) of HTTP-encoded document (i.e. Web pages) containing particular kinds of consumer product-related information published on the Internet by the manufacturers, their agents and/or third parties; and (2) consumers, in retail stores, at home, in the office and on the road, are enabled to simply access such consumer product-related information using such UPC (and/or UPC/EAN) numbers and/or by scanning UPC (or UPC/EAN) bar code symbols encoded with such product identification numbers.

Another object of the present invention is to provide a novel method of carrying out electronic-type commercial transactions involving the purchase of products which are advertised on the Internet at uniform resource locations (URLs) that are registered with the IPI system of the present invention.

Another object of the present invention is to provide a novel system and method of finding the UPN or USN associated with any particular registered product, respectively, by simply selecting a GUI button on the Internet browser display screen in order to enter a "Trademark-Directed Search Mode", whereby (i) a dialogue box is displayed on the display screen requesting any known trademarks associated with the product, and/or the name of the company that makes, sells or distributes the particular product, and (ii) the corresponding UPN (i.e. UPC number or EAN number) registered with the IPD Servers is displayed to the user for acceptance, whereupon the Internet Uniform Resource Locators (URLs) are automatically accessed from the IPD Servers and displayed on the display screen of the Internet browser for subsequent URL selection and Website connection.

Another object of the present invention is to provide such a system and method, wherein during the Trademark-Directed Search Mode, the UPN (e.g. UPC or EAN number) associated with any registered product can be found within the database of the IPD Server using any trademark(s) and/or the company name commonly associated with the product.

Another object of the present invention is to provide a novel system and method for serving consumer-product related information to Internet users in retail shopping environments (e.g. department stores, supermarkets, superstores, home-centers and the like) as well as at home, work or on the road.

Another object of the present invention is to provide a consumer product information access terminal located at a point-of-sale (POS) station, wherein the bar code symbol reader integrated with the POS station can be used to read the UPC numbers on consumer products being offered for sale in the store in order to access consumer product related information from hyper-linked Websites on the Internet, for display on an LCD screen located at the POS station and viewable from various viewing positions by the sales clerk as well as consumer shoppers.

Another object of the present invention is to provide a system and method, wherein one or more computer-based kiosks are installed within retail shopping environments and each such kiosk has an automatic bar code symbol reader for reading the UPC numbers on consumer products being offered for sale in the store, and also a LCD touch-type display screen for displaying product-related information accessed from hyperlinked Websites on the Internet.

Another object of the present invention is to provide such a system and method, wherein one or more computer-based kiosks are installed within retail shopping environments and each such kiosk has an automatic bar code symbol reader for reading the UPC numbers on consumer products being offered for sale in the store, and also a LCD touch-type display screen for displaying product-related information accessed from hyper-linked Websites on the Internet.

Another object of the present invention is to provide such a consumer product information kiosk, wherein the laser scanning bar code symbol reader can be easily removed from its support stand to scan large consumer products that might be difficult to present within the scanning field while the bar code symbol reader is supported above the LCD display panel.

Another object of the present invention is to provide such a consumer product information kiosk, wherein the laser scanning bar code symbol reader has a cordless interface with the kiosk so that it may be moved about within a retail store in a portable manner to scan UPC labels and access consumer product related information.

Another object of the present invention is to provide a consumer product information kiosk for use with the system hereof, that is completely transportable within the store by hand, or may be mounted upon a shopping cart or other vehicle for the convenience of shoppers and the like.

Another object of the present invention is to provide "virtual" or "Cyber" sales and service agents within retail shopping environments by installing the computer-based kiosks of the present invention therein.

Another object of the present invention is to provide a Web-based information delivery system and method, wherein the computer-based kiosks employed therein throughout the hosting retailer's store are capable of displaying the price of products offered for sale in the store upon reading the UPC bar code symbol thereon.

Another object of the present invention is to provide a novel method of constructing a relational database for use within the product information finding and serving sub-system of the present invention.

Another method of the present invention is to provide such a method of database construction, wherein the relational database is initially "seeded" with: (i) the Manufacturer Base UPC Numbers based on the six digit UPC Manufacturer Identification Numbers (MIN) assigned to the manufacturers by the UCC and incorporated into the first six characters of each UPC number applied to the products thereof; and (ii) the URLs of the Website home pages of such manufacturers.

Another method of the present invention is to provide such a method of database construction, wherein the "seeded" relational database is then subsequently extended and refined with the participation of each registered manufacturer (and/or agents thereof) by adding to the "seeded" database (iii) the 12 digit UPC numbers assigned to each product sold thereby and the menu of URLs symbolically linked to each such corresponding product.

Another object of the present invention is to provide such a system and method, in which Website-based advertising campaigns can be changed, modified and/or transformed in virtually any way imaginable by simply restructuring the symbolic links between the products and/or services in the campaign using current (i.e. up-to-date) Website addresses at which Website advertisements and information sources related thereto are located on the Internet.

Another object of the present invention is to provide a novel system and method of automatically soliciting companies to register their products within the databases of such IPD Servers in order that product related information of a multimedia nature (e.g. Websites), once registered therewith, can be easily found on the Internet by anyone using the system and method of the present invention.

Another object of the present invention is to provide a novel system and method for finding and serving consumer-product related information on the Internet, accessible from the Websites of each manufacturer who has registered its UPN/URLs with the system's "central" IPD Database.

Another object of the present invention is to provide such a system and method, wherein as part of the consumer product registration process, the manufacturer (or retailer) maintains a limited-version of UPN/URL database which contains a list of categorized URLs for each UPC-encoded product that it sells.

Another object of the present invention is to provide such a system and method, wherein the consumer product related information links contained within the limited-version of the UPN/URL Database of each registered manufacturer (or retailer) can be accessed from the manufacturer's (or retailer's) company Website and served to consumers requesting such information by way of UPC (or EAN) number entry.

Another object of the present invention is to provide such a system and method, wherein input HTML forms for searching the limited-version of the UPN/URL Database of each registered manufacturer (or retailer) can be accessed by selecting a predesignated Check Button on the GUI to a Website providing access thereto.

Another object of the present invention is to provide such a system and method, wherein the limited-version of the UPN/URL Database of each registered manufacturer (or retailer) is used to update a "central" or "master" UPN/URL Database which is continuously maintained and made accessible to consumers (i) through Web-based kiosks installed in licensed retail environments and (ii) through Internet-enabled client subsystems located at home, work and in school.

Another object of the present invention is to provide such a system and method, wherein at the time of registering each manufacturer (or retailer) with the system, an Internet-based registration server automatically transmits a computer program to the manufacturer's (or retailer's) computer system for use in constructing and maintaining the limited-version UPN/URL Database related to the manufacturer's (retailer's) products.

Another object of the present invention is to provide such a system and method, wherein the limited-version UPN/URL Database of each registered manufacturer (or retailer) can be served from the manufacturer's (or retailer's) Internet information server using a Common Gateway Interface program (CGI).

Another object of the present invention is to provide such a system and method, wherein the limited-version UPN/URL database of each registered manufacturer (or retailer) is realized using a cross-platform compatible, relational database management system (RDBMS).

These and other objects of the present invention will become apparent hereinafter and in the Claims to Invention

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, wherein:

FIGS. 2-1 and 2-2 show a schematic diagram of the consumer-product information collection, transmission and delivery system of the illustrative embodiment hereof shown embedded with the infrastructure of the global computer communications network known as the "Internet", and comprising a plurality of data-synchronized Internet Product Directory (IPD) Servers connected to the infrastructure of the Internet, a UPN/URL Database Subsystem (i.e. UPN/URL Database) connected to one or more of the IPD Servers and one or more globallyextensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of Internet Product-Information (IPI) Servers connected to the infrastructure of the Internet for serving consumer-product related information to consumers in retail stores and at home, a plurality of Client Subsystems connected to the infrastructure of the Internet and allowing manufacturers to transmit consumer-product related information to the Web-based Document Server for collection and retransmission to the IPD Servers, and a plurality of Client Subsystems connected to the infrastructure of the Internet and allowing consumers in retail stores and at home to request and receive consumer-product related information from the IPD Servers;

FIG. 2B is a block schematic diagram of the IPD Server of the illustrative embodiment, showing its subsystem components namely the relational database management subsystem (RDBMS), common gateway interface (CGI), and HTTP (http) server;

FIG. 3A1 is a graphical representation of a first illustrative embodiment of the client computer system of the present invention, designed for use in desktop environments at home, work and play;

FIG. 3A2 is a graphical representation of a second illustrative embodiment of the client computer system of the present invention realized in the form of a bar code driven multi-media kiosk, designed for use as a "virtual sales agent" in retail shopping environments such as department stores, supermarkets, superstores, retail outlets and the like;

FIG. 3A3 is a graphical representation of a third illustrative embodiment of the client computer system of the present invention realized in the form of a bar code driven multi-media kiosk, designed for use as a "virtual sales agent" in retail shopping environments such as department stores, supermarkets, superstores, retail outlets and the like, and shown as having an integrated "cord-connected" type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention;

FIG. 3A3' is a graphical representation of the bar code driven multimedia kiosk shown in FIG. 3A3, wherein the laser scanning projection-type bar code symbol reader is removed from its support stand, by pulling its connector cable out of its cable take-up unit, and used to read a bar code symbol on product located a relatively short distance away from the kiosk;

FIG. 3A4 is a graphical representation of a fourth illustrative embodiment of the client computer system of the present invention realized in the form of a bar code driven multi-media kiosk, designed for use as a "virtual sales agent" in retail shopping environments such as department stores, supermarkets, superstores, retail outlets and the like, and shown as having an integrated "cordless" type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention;

FIG. 3A4' is a graphical representation of the bar code driven multi-media kiosk shown in FIG. 3A4, wherein the laser scanning projection-type bar code symbol reader is removed from its support stand and used to read a bar code symbol on product located a relatively short distance away from the kiosk;

FIG. 3A5 is a graphical representation of a fifth illustrative embodiment of the client computer system of the present invention realized in the form of a consumer product information access terminal, designed for use as a "sales agent's tool" at a point-of-sale (POS) station in retail shopping environments, wherein the information access terminal has a bar code symbol reader integrated with the POS station for reading the UPC numbers on consumer products being offered for sale in the store, and also a LCD screen capable of being mounted in various viewing positions for displaying consumer product-related information accessed from a centralized database interconnect to the Internet;

FIG. 4A1 is a schematic representation of the relational-type IPI Registrant Database maintained by each IPD Server configured into the system of the illustrative embodiment of the present invention, showing the information fields for storing (i) the information elements representative of the UPN (e.g. UPC data structure, EAN data structure, and/or National Drug Code (NDC) data structure), URLs, trademark(s) ($TM_i$), Company Name (CNi) and company address, Product Description ($PD_i$) and E-Mail Address ($EMA_i$) thereof symbolically-linked (i.e. related) for a number of exemplary IPI Registrants listed (i.e. registered) with the IPI Registrant Database maintained by each IPD Server;

FIG. 4A2 is a schematic representation of the information subfield structure of the URL Information Field of the IPI Database of FIG. 4A1, showing the Product Advertisement Information Field, the Product Specification (Description/Operation) Information Field, the Product Update Information Field, the Product Distributor/Reseller/Dealer Information Field, the Product Warranty/Servicing Information Field, the Product Incentive Information Field thereof, the Product Review Information Field, the Related Products Information Field, and Miscellaneous Information Fields detailed in greater detail hereinafter;

FIG. 4B is a schematic representation of the relational-type Non-IPI Registrant Database maintained by each IPD Server that is configured into the IPI Finding and Serving Subsystem of the illustrative embodiment of the present invention, showing the information fields for storing (i) the information elements representative of the Company Name (CNi) and Company Address, Trademark(s) ($TM_i$) registered by the associated Company, and E-Mail Address ($EMA_i$) thereof symbolically-linked for a number of exemplary Non-IPI registrants listed within the Non-IPI Registrant Database maintained by each IPD Server;

FIG. 4C1 is a schematic representation illustrating the information fields of the table entitled "Manufacturer" used in the RDBMS shown in FIGS. 4A1 and 4A2 hereof;

FIG. 4C2 is a schematic representation illustrating the information fields of the table entitled "Consumer Product" used in the RDBMS shown in FIGS. 4A1 and 4A2 hereof;

FIG. 4C3 is a schematic representation illustrating the information fields of the table entitled "Information Resources on the WWW" used in the RDBMS shown in FIGS. 4A1 and 4A2 hereof;

FIG. 4D is a schematic representation illustrating the information fields of the table entitled "Retailer" used in the RDBMS shown in FIGS. 4A1 and 4A2 hereof;

FIGS. 6D1 through 6D3, taken together, provide a high level flow chart illustrating the steps involved in carrying out the communication protocol shown in FIG. 5C when the IPI Finding and Serving Subsystem is in its Trademark-Directed Search Mode of operation;

FIG. 6E1 through 6E3, taken together, provide a high level flow chart illustrating the steps involved in carrying out the communication protocol shown in FIG. 5E when the IPI Finding and Serving Subsystem is in its Product-Description Directed Search Mode of operation;

DETAILED DESCRIPTION OF THE ILLUSTRATIVE EMBODIMENTS OF THE PRESENT INVETION

Figure 1:
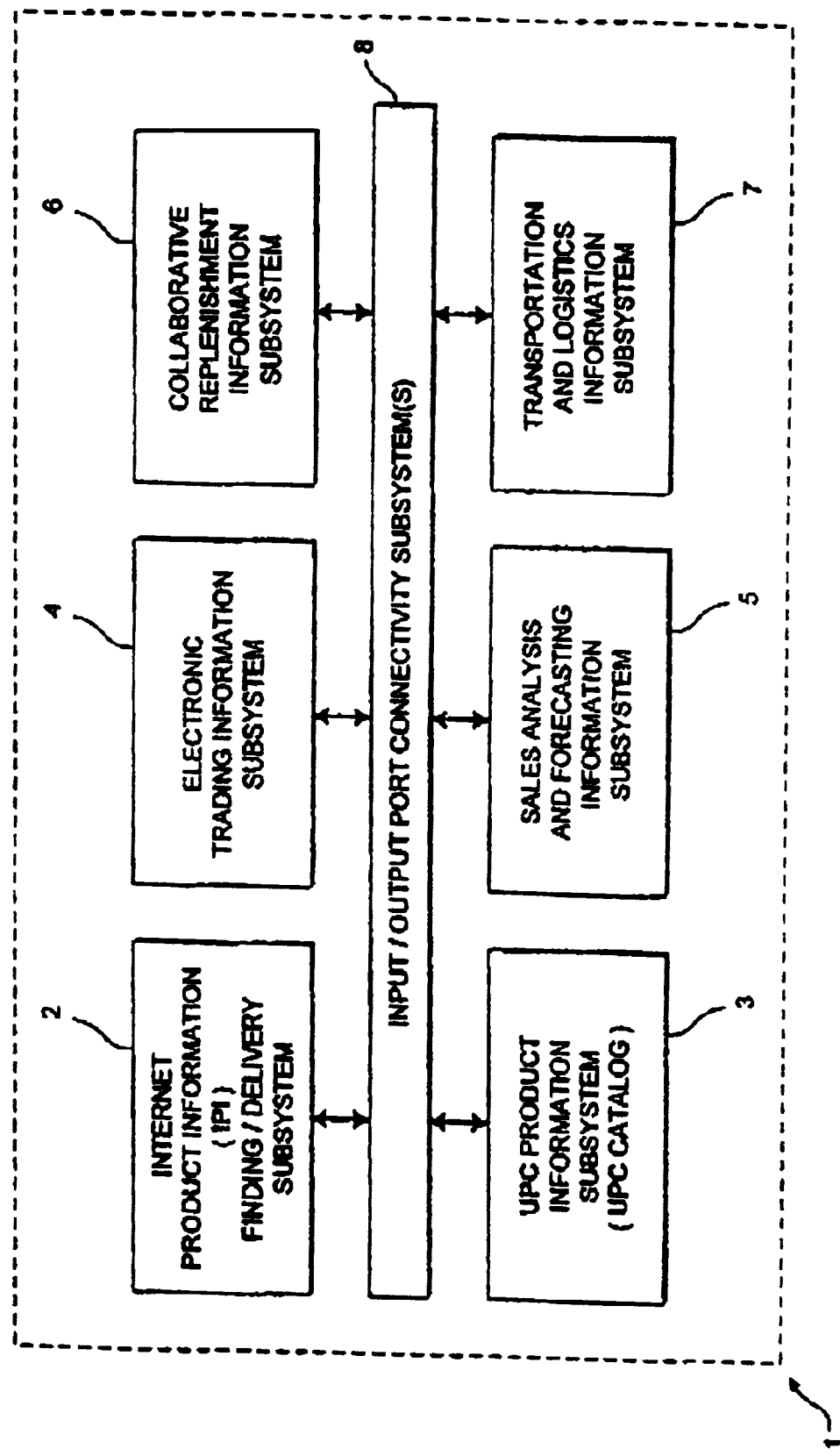
FIG. 1 is a schematic diagram illustrating the various information subsystems provided by the consumer-product information collection, transmission and delivery system of invention along the consumer-product demand chain, namely an Internet-based Product-Information (IPI) Finding and Serving Subsystem, a UPC-based Product-Information Subsystem ("UPC Catalog"), an Electronic Trading Information Subsystem, a Sales Analysis and Forecasting Information Subsystem, Collaborative Replenishment Information Subsystem, and a Transportation and Logistics Information Subsystem.

Referring to the accompanying Drawings, like structures and elements shown throughout the figures thereof shall be indicated with like reference numerals.

Overview of the System of the Present Invention

As illustrated in FIG. 1, the consumer-product information collection, transmission and delivery system of the present invention is generally indicated by reference numeral 1 and comprises an integration of information subsystems, namely: an IPI finding and serving subsystem 2 for allowing consumers to find product related information on the Internet (e.g. WWW) at particular Uniform Resource Locators (URLs), using UPC numbers and/or trademarks and trade names symbolically-linked or related thereto; a UPC Product-Information Subsystem ("UPC Catalog") 3 for providing retailers with accurate up-to-date product information on numerous consumer-products offered for wholesale to retailers by manufacturers registering their products therewith; a Electronic Trading Information Subsystem 4 for providing trading partners (e.g. a manufacturer and a retailer) to sell and purchase consumer goods by sending and receiving documents (e.g. purchase orders, invoices, advance slip notices, etc.) to consummate purchase and sale transactions using either Value Added Network (VAN) based EDI transmission or Internet (e.g. HTTP, SMTP, etc.) based electronic document communications; a Sales Analysis and Forecasting Information Subsystem 5 for providing retailers with information about what products consumers are currently buying at retail stores or expect to be buying in the near future; Collaborative Replenishment Information Subsystem 6 for determining what products retailers can be buying in order to satisfy consumer demand at any given point in time; a Transportation and Logistics Information Subsystem 7 for providing retailers with information about when ordered products (purchased by retailers at wholesale) will be delivered to the retailer's stores; and Input/Output Port Connecting Subsystems 8 for interconnecting the input and output ports of the above-identified subsystems through the infrastructure of the Internet and various value-added EDI networks of global extent. Notably, unlike prior art supply chain management systems, the consumer-product information collection, transmission and delivery system of the present invention embraces the manufacturers, retailers, and consumers of UPC-encoded products, and not simply the manufacturers and retailers thereof. As will become apparent hereinafter, this important feature of the present invention allows manufacturers and retailers to deliver valuable product related information to the consumers of their products, thereby increasing consumer purchases, consumer satisfaction and consumer loyalty. Prior art supply chain management systems simply have no way or means of providing such information services to the consumers of UPC-encoded products along the consumer-product supply and demand chain.

Figures 1, 2:
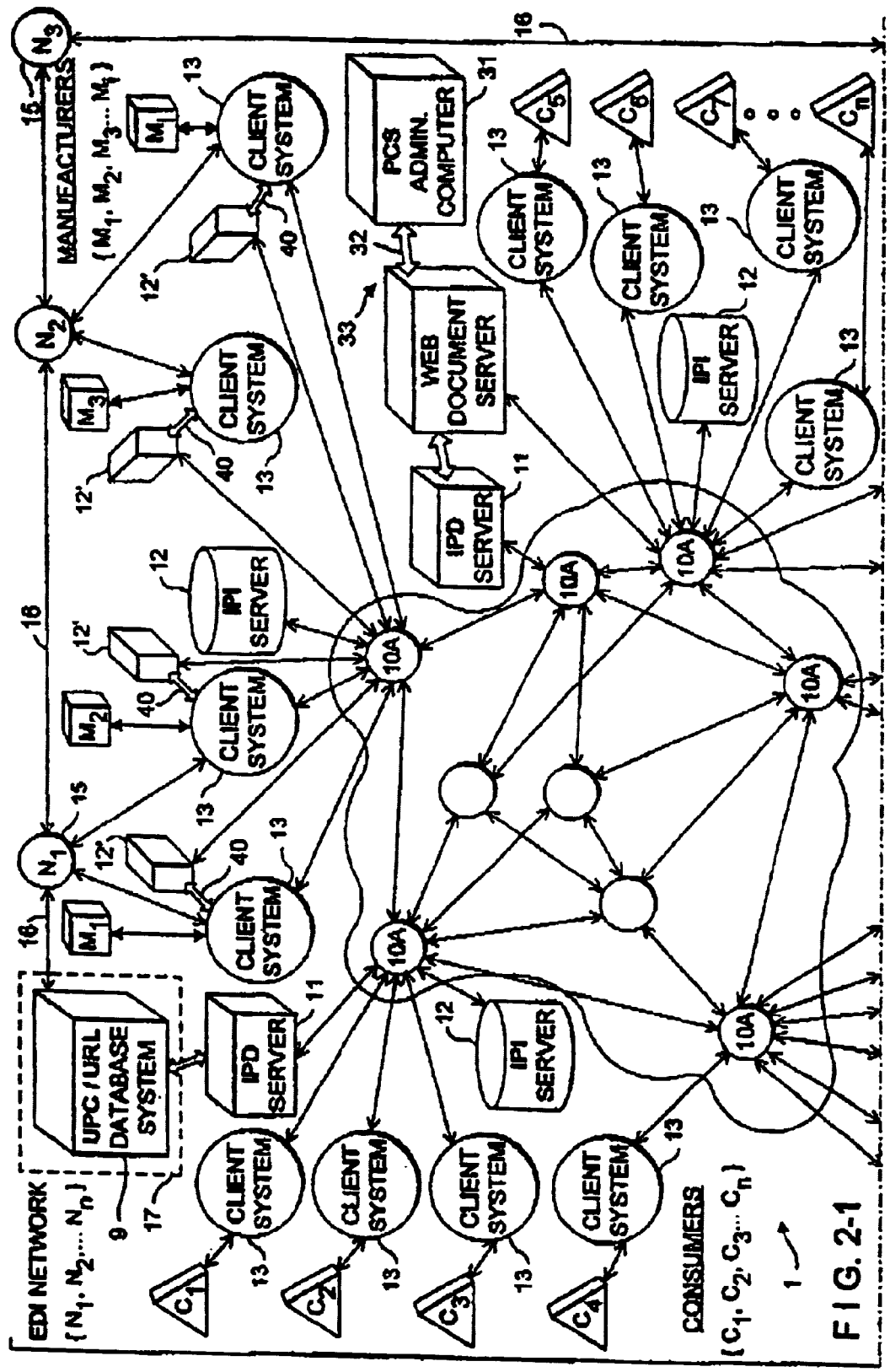
Figure 2:
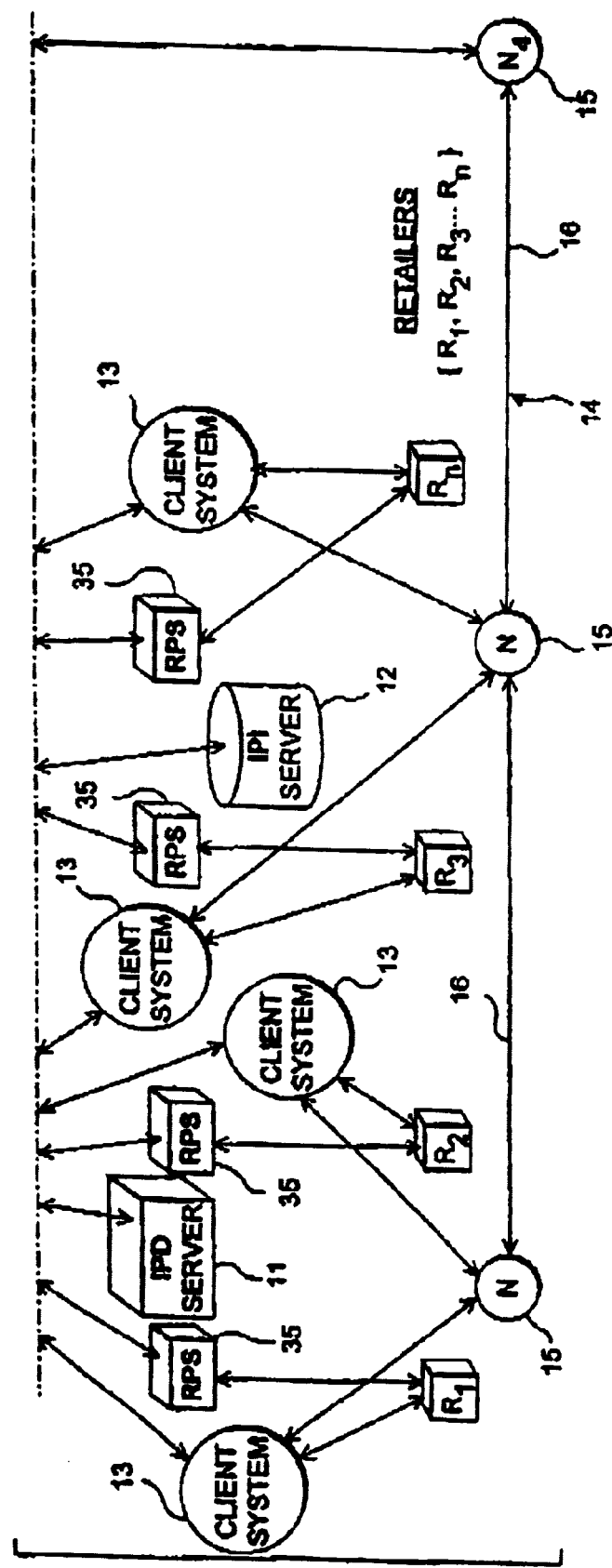
Figure 4C:
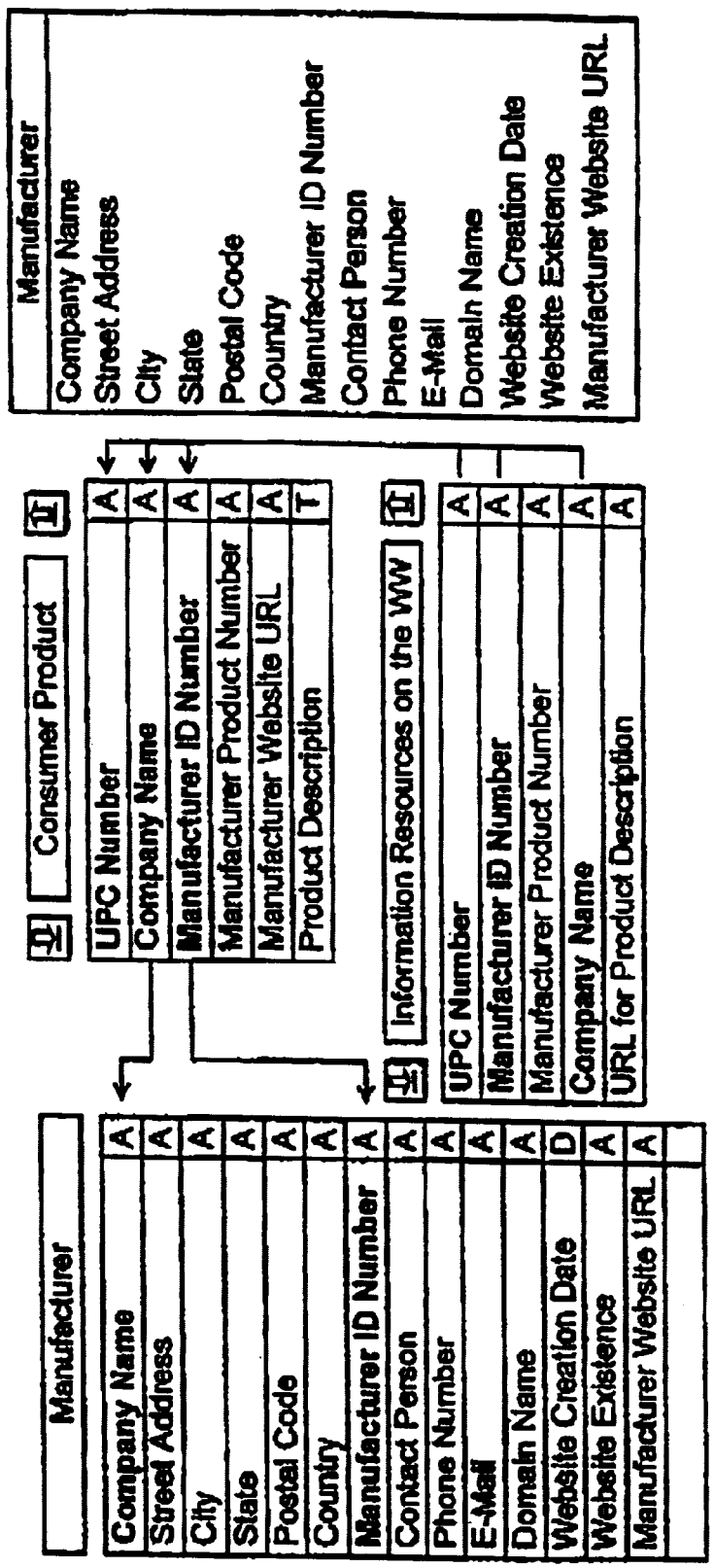
FIG. 4C is a schematic representation of the structure of a relational database management subsystem (RDBMS) used to carry out a best-mode embodiment of the IPI Registrant Database represented in FIGS. 4A1 and 4A2 hereof.

As shown in FIGS. 2-1 and 2-2, the consumer-product information collection, transmission and delivery system of FIG. 1 is realized as an arrangement of system components, namely: a central UPN/URL Database Management Subsystem 9 for storing and serving various types of consumer-product information to retailers, manufacturers and consumers alike (e.g., the name of the product's manufacturer; the Universal Product Code (UPC) or European Article Number (EAN) assigned to the product by the manufacturer; one or more URLs specifying the location of information resources on the Internet at which particular kinds of information relating to the consumer-product can be found; merchandise classification; style number; trade name; information specifying the size, color and other relevant characteristics of the consumer-product, where applicable; ordering criteria; availability and booking dates, etc.); a globally-based (packet-switched) digital telecommunications network (such as the Internet) 10 having an infrastructure including Internet Service Providers (ISPs), Network Service Providers (NSPs), routers, telecommunication lines, channels, etc., for supporting packet-switched type digital data telecommunications using the TCP/IP networking protocol well known in the art; one or more Internet Product Finding Directory (IPD) Servers, each indicated by reference numeral 11 and being connected to the Internet at strategically different locations via the Internet infrastructure 10 and data-synchronized with each other in order that each such Server maintains mirrored a relational-type database structure as represented in FIGS. 4A and 4B; a plurality of Internet Product-Information (IPI) Servers, each indicated by reference numeral 12 and being connected to the Internet via the Internet infrastructure; a plurality of User (or Client) Computers, each indicated by reference numeral 13, being connected to the Internet via the Internet infrastructure and available to consumers (C1, C2, C3, . . . , Ci); one or more data communication (i.e. EDI) networks 14, comprising data collection nodes 15 and communication links 16, operably connected to the centralized UPN/URL Database Management Subsystem 9, each Client Computer 13 available to a Manufacturer (M1, M2, M3, . . . , Mj) and Retailer (R1, R2, R3, . . . , Rk) within the retail supply and demand chain; a Web-based Document Server 30 connected to at least one of the IPD Servers 11 and the Internet infrastructure, for transferring documents and messages to remote Client Computer Systems during the registration of manufacturers and consumer products with the system hereof and periodically updating product-related information with the IPD Servers 11 in an automatic manner; and a Web-based Document Administration Computer 31 connected to the Web-based Document Server 30 by way of a TCP/IP connection 32, for administrating the registration of manufacturers and products with the system, initiating the transfer of consumer product related information (e.g. menu of URLs) between the remote Client Computer Systems and Web-Based Document Server 30, transferring such information to the IPD Servers 11, and maintaining local records of such information transfers and the like. As will become apparent hereinafter, Web-based Document Server 30 and Web-based Document Administration Computer 31 provide a subsystem for (i) managing the process of registering qualified manufacturers and their consumer products and related Web pages (e.g. UPC numbers and URLs), and (ii) updating the product-related information with the IPD Servers 11 in an automatic manner to ensure accurate links between UPNs and URLs within the UPN/URL Database Management Subsystem. The subsystem comprising the Web-based Document Server 30 and Web-based Document Administration Computer 31 shall be referred to as the Manufacturer/Product Registration Subsystem of the consumer product information finding and delivery subsystem 2 and indicated by reference numeral 33 throughout the figure drawings hereof.

Preferably, the centralized UPN/URL Database Management Subsystem 9 and at least one of the IPD Servers 11 are located at a secured information storage/processing center 17, along with a multiprocessor (or mainframe) computer system, information servers, routers, data communication lines, disk storage devices (e.g. RAIDs), tape drives and tape-library system, uninterrupted power supplies (UPS), and other peripheral technology to provide on-line, batch and back-up operations. However, the IPI Servers, the Client Computers and the other IPD Servers (if provided for database mirroring purposes), typically will be located throughout the world, as the distribution of manufacturers, retailers and consumers who are encouraged to use the system are scattered across the planet.

In the illustrative embodiment, the Web-based Document Server 30 is a Windows NT Server running WebDox™ Server software from Premenos Corporation of Concord, Calif. The Windows NT Server can be realized using a suitable computer system having a Pentium® or higher CPU, 64 MB of RAM or higher, running (i) Microsoft Windows NT Server 4.0 or higher Operating System software from Microsoft Corporation, (ii) Microsoft Internet Information Server 2.0 or higher from Microsoft Corporation, and (iii) Microsoft SQL Server 6.5 or higher software from Microsoft Corporation. Also, the WebDox™ Server is provided with a dedicated Internet connection (i.e. ISDN or better) to the Internet infrastructure 10.

The EDI administration computer 31 is either a Windows 95 or Windows NT Computer system running WebDox Admin™ software from Premenos Corporation of Concord, Calif. The Windows 95 or Windows NT computer system 31 can be realized using a suitable computer system having an Intel 486 or higher CPU, 12 MB of RAM or higher, running Microsoft Windows 95 or Windows NT 4.0 or higher, and having a TCP/IP connection 31 to the WebDox™ Server 30.

In order to use the WebDox™ system, each remote Client Computer System 13 includes either a Windows 95 or Windows NT Computer system running WebDox Remote™ software from Premenos Corporation of Concord, Calif. The Windows 95 or Windows NT computer system 13 can be realized using a suitable computer system having a Intel 486 or higher CPU, 16 MB of RAM or higher, and a VGA monitor or better, and running (i) Microsoft Windows 95 or Windows NT 3.51 or higher Operating System (OS) software, and (ii) Microsoft Internet Explorer 3.0 or higher from Microsoft Corporation. Also, the WebDox Remote™ Server is provided with a dial-up Internet connection (i.e. 14,400 bps or better) to the Internet infrastructure. The function of the Web-based Document Server 30, Web-based Administration System 31 and remote client subsystems 13 running the Premenos® WebDox Remote™ software is to provide a Web-based Document Transport System for automatically transferring information (e.g. UPN/URLs) from manufacturers to the IPD Servers of the system in order to periodically update the same. While the illustrative embodiment of this Web-based Document Transport System has been described in terms of its implementation using the WebDox™ system from Premenos, it is understood that other commercially available electronic document transport systems (e.g. COMMERCE:FORMS™ Electronic Business Forms Package from Sterling Commerce, Inc., http://www.stercomm.com) can be used to carry out this subsystem. The operation of this Web-Based Document Transport System will be described in detail hereinafter with respect to the collection and delivery of consumer product-related information to the IPDs hereof.

The major subsystem components comprising the consumer-product information collection, transmission and delivery system of the present invention will be described in greater detail below.

In the illustrative embodiment of the present invention, the UPC Product-Information Subsystem 2 is realized using the UPN/URL Database Management Subsystem 9 and data communication networks 14 shown in FIGS. 2—2 and 2—2. Preferably, the product procurement services delivered by the UPN/URL Database Management Subsystem 9 are provided by modifying the prior art QRSolutions UPC Catalog currently implemented by QuickResponse Services, Inc., so that this subsystem includes the database structures (i.e. information fields and data elements) of the IPD Database Server 11 which are neither found in nor suggested by the prior art QRSolutions UPC Catalog. The structure and operation of the UPN/URL Database Management Subsystem and IPD Server of the present invention will be described in greater detail hereinafter. The information services supported by the UPC Product-Information Subsystem 3 include those provided by the prior art QRSolutions UPC Catalog, and also a number of additional information services that can be used to carry out Product Registration within the IPI Finding and Serving Subsystem of the present invention. These additional information services will be described in greater detail hereinafter with reference to FIG. 2A.

The Electronic Trading Information Subsystem 4 is realized using the UPN/URL Database Management Subsystem 9, Client Computer Systems 13 and data communication networks 14 of the enabling technology platform shown in FIG. 2. Preferably, the inventory procurement services delivered by the Electronic Trading Subsystem 4 are provided by the prior art QRSolutions Econnect and Electronic Data Interchange Services currently being implemented by QuickResponse Services, Inc.

Sale Analysis and Forecasting Information Subsystem 5 is realized using information storage/processing center 1, Client Computer Systems 13, and the data communication networks 14 of the enabling technology platform shown in FIG. 2. Preferably, the product inventory management services delivered by the Sale Analysis and Forecasting Information Subsystem 5 are provided by the prior art QRSolutions Sale Analysis and Forecasting Information Services currently being implemented by QuickResponse Services, Inc.

The Collaborative Replenishment Information Subsystem 4 is realized using information storage/processing center 17, Client Computer Systems 13 and the data communication networks 114 of the enabling technology platform shown in FIG. 2. Preferably, the product inventory management services delivered by the Collaborative Replenishment Information Subsystem 6 are provided by the prior art QRSolutions Replenishment Services currently being implemented by QuickResponse Services, Inc.

The Transportation and Logistics Information Subsystem 7 is realized using information storage/processing center 17, Client Computer Systems 13, and the data communication networks 14 of the enabling technology platform shown in FIG. 2. Preferably, the product distribution management services delivered by the Transportation and Logistics Information Subsystem 7 are provided by the prior art QRSolutions EDI and Logistics Management Services currently being implemented by QuickResponse Services, Inc.

Figure 3B:
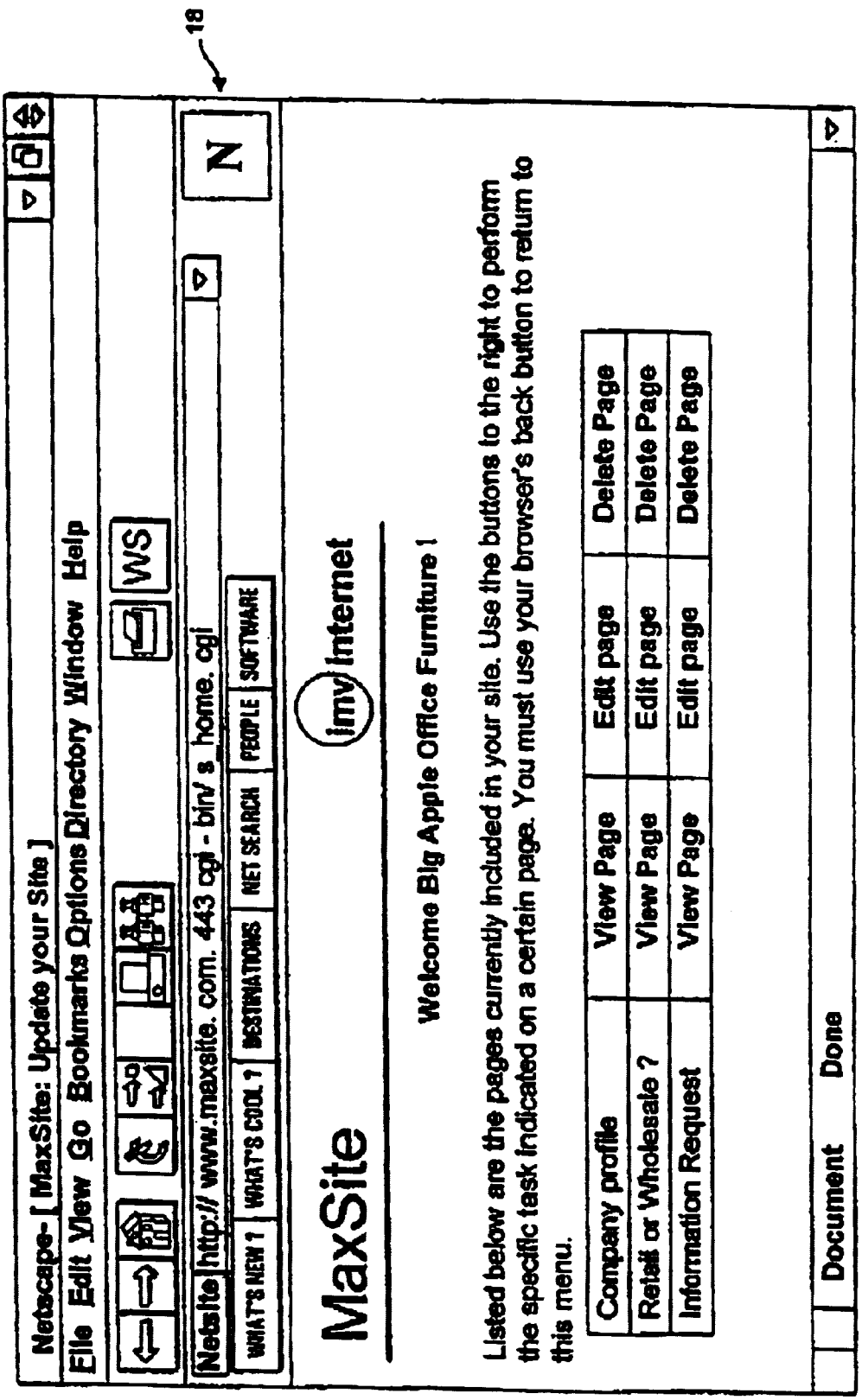
FIG. 3B is a schematic representation of an exemplary display screen produced by a (graphical user interface) GUI-based web browser program running on a client subsystem and providing an on-screen IPD Website Find button (e.g. UPC REQUEST™ Central Website Find button) for instantly connecting to the IPD Website (e.g. UPC REQUEST™ Central Website) and carrying out the consumer product information finding and serving method of the present invention.
Figure 3C:
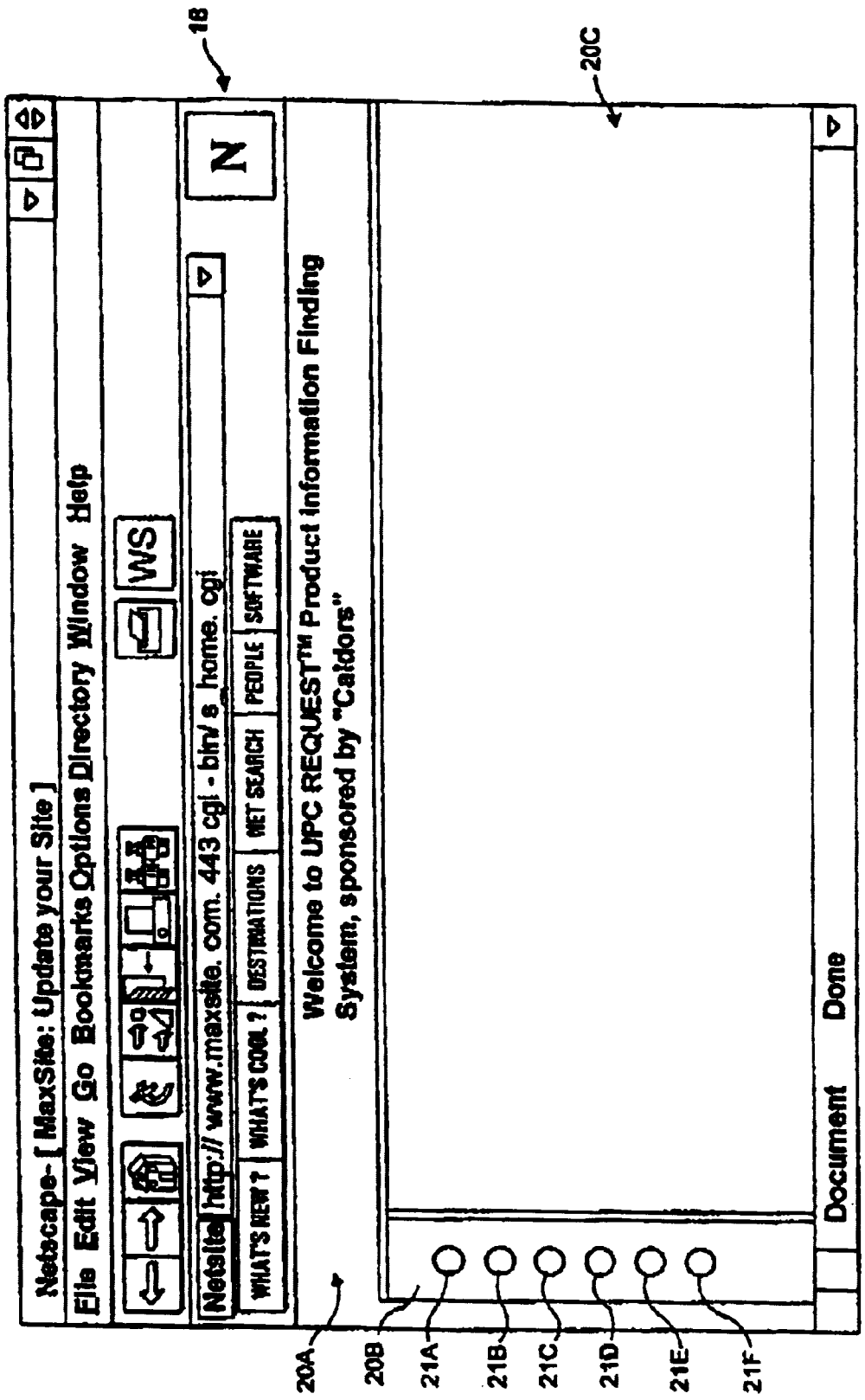
FIG. 3C is a schematic representation of an exemplary display screen produced by a GUI-based Internet browser or communication program running on a client subsystem and displaying a Netscape-style browser "display framework", served from the IPD Website (e.g. UPC REQUEST™ Central Website), and supporting a providing a sponsor frame for sponsor advertisement, a control frame with Check-Box type buttons for activating any mode of the IPI finding and serving subsystem, and an information frame for displaying HTML documents (instructions, forms, and the like) in accordance with the principles of the present invention.

In the illustrative embodiment of the system of the present invention, each Client Computer 13 has a conventional GUI-based web browser program (e.g. Netscape, Internet Explorer, Mosaic, etc.) with a plug-in type module, such as CyberFinder™ navigational software by Aladdin Systems, Inc., of Watsonville, Calif., that provides an on-screen graphical icon for a "IPI Website Find" function. An exemplary display screen 18 produced by such a GUI-based web browser program is set forth in FIG. 3B. Alternatively, the URL of the home page of the IPI Website can be recorded as a browser "bookmark" for easy recall and access through a conventional GUI-based Internet browser. Once at the home page of the IPI Web-site, an Internet user can find product-related information on the Internet in essentially the same way as when using the web browser program of FIG. 3B. As shown, the on-screen radio button 19 functions as an "IPI Website Find" Button (or Consumer Product Information Button) for instantly connecting the client subsystem to a particular IPI Website (i.e. hosted on each mirrored IPD Server) and especially adapted for carrying out the IPI finding and serving method of the present invention. In general, each IPI Website can be sponsored by a retail store subscribing to the consumer product information service hereof, or by one or manufacturers and/or service providers. The URL for the home page of any particular IPI Website can be selected with marketing considerations in mind, for example, "http://www.ipf.com" or "http://www.upcrequest.com" similar in form with the URLs of other information search-engines and directories currently available on the Internet. Upon selecting the IPI Website Find Button 19 (e.g. by a clicking of the mouse thereon shown in FIGS. 3B and 3C), the user is automatically connected to the home-page of the IPI Website (hosted on each mirrored IPD Server) which, as shown in FIGS. 3B and 3C, supports a Netscape-style "framework", within which web-pages accessed through the IPI Website are displayed. An excellent tutorial on "framing" entitled "The Netscape Frames Tutorial™ (2nd edition)" by Charlton D. Rose set forth at the URL: "http://www.newbie.net/frames/", last visited by Applicant on Mar. 26, 1997.

As shown in FIG. 3C, the IPI Web-site of the illustrative embodiment has a framework characterized by three-display fields, namely: a sponsor frame 20A; a control frame 20B; and an information display frame 20C for displaying web pages. In alternative embodiments, there many be more or fewer display frames than that shown in FIG. 3C. Each frame acts as a separate display screen where variables such as web-pages, scrolling, page colors, etc., are independently controllable. In practice, it is suggested that the physical layout of the Netscapestyle browser "framework" be designed to simultaneously accommodate the needs of the consumers using the particular Client Subsystems of the present invention, as well as the needs of the retailers who typically will host client subsystems hereof either (1) physically within their stores, and/or (2) electronically on their WWW sites using Web browser framing techniques as well.

In the case of Client Subsystems physically hosted (i.e. located) within the environment of retail stores, a three-field browser framework as shown in FIG. 3C will be highly effective in meeting the needs of the retailer, consumer, and business organization delivering the IPI Finding and Serving Subsystem of the present invention (hereinafter the "IPI Provider"). As shown in FIG. 3C, the first (top-most) display field, the sponsor frame 20A, can be used to display to the consumer, a Web page (e.g. HTML-encoded document) containing a message that the IPI Finding and Serving Subsystem is being delivered to the consumer by the IPI Provider under, for example, the sponsorship of either: (1) the hosting retailer; (2) one or more advertisers posting advertising "banners" in the display frame 20A; or (3) the consumer him or her self by paying a subscription fee or the like. Understandably, the method of sponsorship employed will vary from embodiment to embodiment of the present invention. An exemplary message for this display screen might read, for example, as follows:

"Welcome to the UPC Request™ Consumer Product-Information Finding and Serving System sponsored by THE HOME DEPOT for your shopping convenience and pleasure."

The height of the sponsor frame 20A need only be a small fraction of the consumer's display screen (e.g. ¾ inches) to convey this message to the consumers during use of the IPI Finding and Serving Subsystem of the present invention within the retailer's real (or virtual) shopping environment.

As shown in FIG. 3C, the second (left-most) display field, the control frame 20B, is used to display a HTML-encoded document containing a GUI-based "control panel" 21 for the consumer product information finding and serving subsystem of the present invention. In the illustrative embodiment, this control panel 21 includes five Check Box type buttons, namely: a first Check Box type button 21A which, when selected, automatically activates the Manufacturer/Product Registration Mode of the subsystem; a second Check Box type button 21B which, when selected, automatically activates the Manufacturer Website Search Mode of the subsystem; a third Check Box type button 21C which, when selected, automatically activates the UPN-Directed Information Access Mode of the subsystem; a fourth Check Box type button 21D which, when selected, automatically activates the Trademark-Directed Search Mode; and a fifth Check Box type button 21F which, when selected, automatically activates the Product-Description Directed Search Mode of operation of the subsystem. Each of these Check Box type buttons is hot-linked to a particular HTML-encoded document residing on the IPD Server(s) 11 of the subsystem hereof.

As illustrated in FIG. 2B, each IPD Server 11 comprises a relational-database management subsystem (RDBMS) 11A, a HTTP Server 11C, and a common gateway interface program (CGI) 11B for interfacing the RDBMS 11A with the HTTP Server 11C. In the illustrative embodiment, each synchronized IPD Server 11 can be realized by, for example, the PowerMac® 8550/200 Internet Server from Apple Computer, Inc., the Origin 200 Server or the $O_2$ Desktop Workstation from Silicon Graphics, Inc, or any other suitable computing machine. Each such computing machine also comprises: relational-database management software and Website development software for realizing RDBMS 11A; CGI scripting software for realizing CGI 11B; and HTTP software for realizing HTTP Server 11C in the web-based, client-server type computer system architecture of the illustrative embodiment. The RDBMS 11A has several functions, namely: (i) to maintain the IPI Websites hereof; and (ii) to maintain the IPI Registrant Database and the Non-IPI Registrant Database schematically illustrated in FIGS. 4A and 4B, respectively. The function of the CGI 11B is to provide an interface between the HTTP Server 11C and the RDBMS 11A while enabling the five primary modes of operation of the consumer product information finding and delivery subsystem hereof. The function of the HTTP Server 11C is to (i) support HTTP and (ii) serve HTML-encoded pages from IPI Websites and database requests from the IPI and Non-IPI Registrant Databases. The relational database management system (RDBM) 11A can be constructed using a database programming language such as the 4th Dimension® SQL Language, the Sybase language, or any other suitable database language which allows for database programming and database connectivity over the Internet. A suitable development program for creating dynamic Websites with the integrated database structures of FIGS. 4A and 4B is the "4D Web SmartServer" or 4D Version 6.0, both from ACI, Inc. It is understood, however, that database development programs such as Oracle, Sybase SQL, Powersoft, Microsoft Access 97, etc. can be used to construct and maintain the relational database management subsystems of the type illustrated in FIGS. 4A and 4B.

As shown in FIG. 1, each IPD Server 11 is interfaced with an ISP 10A in a conventional manner. The actual number of IPD Servers 11 used in any particular application will depend on various factors including, for example, user demand, Internet traffic conditions, network router capacity and performance, etc. Each such IPD Server 11 is assigned a static IP address and a common domain name on the Internet according to the Domain Name System (DNS) well known in the art. Data synchronization among such databases can be achieved using conventional data synchronization techniques well known in the art. In addition, a backup and mirroring program can be used to maintain data security. Preferably, the synchronized IPD Servers are maintained by a team of network managers under supervision of one or more webmasters.

Notably, the three-field Netscape-style display framework served from the IPD Servers 11 hereof to client subsystems 13 employed within the IPI Finding and Serving Subsystem provides a unique and effective way of satisfactorily addressing the needs of consumers, hosting retailers, manufacturers and the IPI Provider(s) alike. It is understood, however, that in alternative embodiments of the present invention, it may be desirable or necessary to refrain from serving "framed" browser display screens from the IPD Servers 11 to the client subsystems 13 without detracting from the present invention.

Each IPI Server 12 can be realized by, for example, the PowerMac® 8550/200 Internet Server from Apple Computer, Inc., the Origin 200 Server or 02 Desktop Workstation from Silicon Graphics, Inc., or any other computing machine that can perform the function of a Server in a web-based, client-server type computer system architecture of the illustrative embodiment. As shown in FIG. 1, each IPI Server 12 is interfaced with an ISP 10A in a conventional manner. Each such IPI Server 12 is assigned a static IP address and a unique domain name on the Internet. Each IPI Server 12 is also provided with (i) Website development software for creating HTML-encoded multi-media pages for Website development, and (ii) Website server software for supporting HTTP and serving HTML-formatted pages of hypermedia-type Websites containing product related information of a multi-media nature. Such Websites can be expressed in HTML and/or VRML or any other suitable language which allows for Website construction and Website connectivity. Website management software, such as Adobe® SiteMill™, can be used to maintain correct hyperlinks for any particular. Preferably, the IPI Servers 12 are maintained by a team of network managers under supervision of one or more webmasters.

Each Client Computer Subsystem (hereinafter "client subsystem") 13 can be realized by any computing system employing operating system (OS) software (e.g. Macintosh, Windows 95, Windows NT, Unix, etc.) which supports an Internet browser program (e.g. Netscape Navigator, MicroSoft Internet Explorer, NCSC's Mosaic, etc.). The operating system should also include: (1) Internet networking software that supports the TCP/IP networking protocol (required by HTTP, FTP and the like) and provides a GUl-based Web browser interface; and (2) Electronic Data Interchange (EDI) networking software that supports EDI between two or more client subsystems over the VAN-based EDI network 14 illustrated in FIG. 2. Alternatively, client subsystems may also be realized by any of the following systems: (i) a Newton MessagePad 130 (running the Newton 2.0 Operating System and NetHopper™ Internet Software); (ii) a Pippin™ computer system from Apple Computer, Inc.; (iii) a network computer (NC) that supports the Java™ programming language and Java applets expressed therewith; (iv) a Sony® WebTV Internet Terminal (supported by the WebTV Service provided by WebTV Network, Inc.); or the like. As shown in FIG. 1, each Client Computer is interfaced with an ISP 10A in a conventional manner. Each such client subsystem may be assigned a static IP address and a unique domain name on the Internet, or one may be dynamically assigned thereto by way of its ISP depending on its connectivity. Optionally, any client subsystem may include Website server software for creating and maintaining one or more hypermedia-type Websites in a manner well known in the art.

Typically, each client subsystem 13 will be maintained by either present or future manufacturers, retailers and/or consumers of products, about which information can be found on the Internet. As shown in FIG. 3A1, any client subsystem of the present invention may be realized as a desktop computer workstation comprising: a processor and memory 19; a visual display monitor 20; a keyboard 21; a GUI mouse 22; and a bar code symbol reader 23 for reading UPC and other types of bar code symbols printed on products, brochures, documents, and the like.

As shown in FIG. 3A2, any Client Computer 13 may also be realized in the form of a Web-based multi-media kiosk, designed for use as a "virtual sales agent" within retail shopping environments. As shown, the Web-based kiosk of the present invention comprises: a floor, wall or ceiling supported housing 25; an omnidirectional laser bar code symbol reader (e.g. Metrologic MS 6720 Laser Scanner) 26 for reading UPC (and other type of) symbols printed on products, brochures, documents and the like; an active-matrix LCD-type visual display screen 27 for viewing product related information automatically displayed thereon in response to the entry of the UPC numbers scanned into the UPC Number Entry Window 21D below the IPI Finder button 21 A of Control Strip 20B displayed on the client subsystem, as shown in FIG. 3C; a touch-screen type keyboard and pointing device 28 for clicking on anchored links on Web pages, entering information into client subsystem during its use; audio-speakers 29A for supporting multimedia Website that may be visited when using the client subsystem; a color or black/white printer for printer 29B for printing out Web pages under consumer command during an information finding session using the system; and also, one or more floppy-disc (or otherwise removable) drive units 29C, accessible to the consumer for recording promotional and trial versions of information-based consumer products (e.g. video an audio recordings, computer software products, and the like) on removable information storage media (e.g. 1.44 MB floppy discs, 100 MB Zip® floppy discs, 1 GB Jazz® floppy discs, etc.) supplied by either the retailer or consumer. Optionally, the kiosk can be provided with a stereoscopic micropolarizing LCD panel from Vrex, Inc. of Elmsford, NY so that micropolarized spatiallymultiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, any Client Computer 13 within the system hereof may be realized in the form of the Web-based multi-media kiosk 34, also designed for use as a "virtual sales agent" within retail shopping environments. As shown, the Web-based kiosk 34 comprises: an ultra-compact housing 35 capable of being supported upon a pair of support rods (35A), a vertical support surface (e.g. wall), a horizontal support surface (e.g. countertop), or supported from a ceiling or pedestal; an omnidirectional laser bar code symbol reader (e.g. Metrologic MS 6720 Laser Scanner) 36, modified with handle 36A, for reading UPC (and other type of) symbols printed on products, brochures, documents and the like; an active-matrix LCDtype visual display screen 37 for viewing product related information automatically displayed thereon in response to the entry of the UPC numbers scanned into the UPC Number Entry Window 21D displayed on the client subsystem; a touch-screen type keyboard and pointing device 38 for clicking on anchored links on Web pages, entering information into client subsystem during its use; audio-speakers 39A for supporting multimedia Website that may be visited when using the client subsystem; a color or black/white printer 39B for printing out Web pages under consumer command during an information finding session using the system; a scanner support stand 40 with guide flanges 41A and 41B, for guidably receiving and supporting the scanner 36 as shown in FIG. 3A3; a recoilable scanner cable 42, dispensed from cable cartridge 43 and guided through hole 44 in a scanner support bridge 40; a telephone handset 45 and associated communication apparatus for making telephone calls over a public telecommunications switching network (PSTN) independent of the operation of the Web-browser of the kiosk; and a mag-stripe card reader 46 and associated credit transaction terminal for automatically dialing up consumer credit and like databases over the PSTN (or Internet) upon scanning mag-stripe card 47 through reader 46. Optionally, the kiosk may also include one or more floppy-disc (or otherwise removable) drive units (not shown) accessible to the consumer for recording promotional and trial versions of information-based consumer products (e.g. video an audio recordings, computer software products, and the like) on removable information storage media (e.g. 1.44 MB floppy discs, 100 MB Zips floppy discs, 1 GB Jazz® floppy discs, etc.) supplied by either the retailer or consumer. Also, the kiosk can be provided with a stereoscopic micropolarizing LCD panel from VRex, Inc. of Elmsford, N.Y. so that micropolarized spatially-multiplexed spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, the bar code symbol reader is supported within its support stand/bridge 40. In this configuration, the laser scanning field of the reader is projected downwardly upon the surface of the LCD touch screen display panel. By virtue of the angle of tilt of the display panel 37 relative to the ground surface of the retail store, and the projection angle of the laser scanning field relative to the display panel surface, will enable the consumer to easy read the bar code symbol on most consumer product by simply presenting the bar code symbol to the scanning window. In the event the product is too large to lift from the floor to the scanning window, the consumer can simply remove the bar code symbol reader 36 from its support stand 40, as shown in FIG. 3A3', by pulling cord 42 out of its takeup compartment 43 so that the reader is positioned to read the bar code symbol 49 on the retail consumer product 48. When symbol scanning is completed, the bar code symbol reader is lifted back into its stand support position, between support guides 41A and 41B, white the cord 42 is automatically recoiled back into storage compartment 43, as shown in FIG. 3A3. While the consumer uses the kiosk to scan UPC (or UPC/EAN) symbols on products, to find, access and display consumer product-related information on the display panel 37, he or she may choose or need to use telephone 45 to speak with a manufacturer's representative and engage in electronic commerce, and/or use the magstripe card reader 46 to read magstripe cards (e.g. credit cards) to pay for consumer purchases made over the Internet using the kiosk of the present invention. Where the Web-browser of the client subsystem 13 is provided with a bar code symbol reader, the consumer may at particular EC-oriented Websites scan UPC (and/or UPC/EAN) numbers on products with his or her home (e.g. in the pantry) in order to remotely order products for purchase and direct shipment to the consumer's home by a particular delivery service. The consumer product information delivery system of the present invention shall enable an infinite array of applications with regard to electronic commerce and home shopping, now made possible by the present invention.

As shown in FIG. 3A4, the Web-enabled kiosk of FIG. 3A3 is modified to include a bar code symbol reader having a "cordless-type" scanner interface, thereby eliminating the need for the communication/scanner cable 42 shown in FIG. 3A3. RF-based wireless interfaces, as disclosed in US Letters Patents and Published International Patent Applications, incorporated herein by reference, can be used to realize this cordless-type scanner interface arranged between the bar code symbol reader 36 and the Web-enabled access terminal integrated within the information kiosk. In all other respects, the kiosk shown in FIGS. 3A4 and 3A4' is similar to the kiosk shown in FIGS. 3A3 and 3A3' and described above.

In FIG. 3A5, a fifth illustrative embodiment of the client computer system hereof is realized in the form of a consumer product information access terminal integrated within a point-of-sale (POS) station in retail shopping environments. While this embodiment of the client computer system hereof is particularly adapted for use by sales clerks at POS stations, as well as by store employees behind retail information/service counters, it may also be used by consumers and shoppers alike provided the necessary accommodations are made as described hereinbelow.

As shown in FIG. 3A5, a client subsystem 13 hereof is realized as consumer product information access terminal 60 comprising: a POS station 61 having a cash register computer 61A and keyboard 61B, and a price/UPC database 61C containing price and UPC number information tables; an Web-enabled computer terminal 62 connecting the POS station 61 to the Internet infrastructure 10 through an ISP 10A; a bar code symbol reader 63 connected to the POS station 61; a 15' diagonal active-matrix LCD panel 64, operably connected to the output of the Web-enabled computer system 62 and the output of the cash register computer 61 A, and having a swivel-base 65 that allows the LCD panel to be oriented in various viewing positions for displaying consumer product-related information accessed from the IPI Registrant Database shown in FIGS. 4A1 and 4A2, as well as price information accessed from the price/UPC Database 61C. The advantage of this client computer subsystem is that enables a retails sales clerk check out customer purchases in a conventional manner, and conveniently access the IPI Finding and Serving Subsystem when check-out business is relatively slow, to answer any questions that consumers may have regarding a particular product in the retail store. This system will be ideal in retail environments having a high level of customer service and large retail service staff. In such instances, the IPI Finding and Serving Subsystem hereof empowers retail sales clerks, at the POS counters as well as customer service counters, by enabling them to quickly access any item of product related information linked to products in their stores by manufacturers and their agents.

In alternative embodiments, any Client Computer 13 can be realized as a network computer (NC), a Web-TV™ type Internet Terminal, a Newton MessagePad® PDA, or any other device providing Internet access to the IPI Website (i.e. mirrored IPD Servers) of the present invention. Notably, the same functionalities provided within the Web-based kiosk described above can be embodied with such alternative embodiments of client computer system.

The Database Structure of the IPD Server

In the illustrative embodiment of the present invention, each data-synchronized IPD Server 11 of the preferred embodiment maintains at least two different relational-type databases, namely: a IPI Registrant Database for storing information about manufacturers whose products are registered with the system; and a Non-IPI Registrant Database for storing information about manufacturers whose products are not registered with the system. A schematic representation of the IPI Registrant Database is shown in FIG. 4A1, whereas a schematic representation of the Non-IPI Registrant Database is shown in FIG. 4B.

As shown in FIG. 4A1, the relational-type IPI Registrant Database maintained by each IPD Server comprises a plurality of labeled information fields for each product "registered" therewith, namely: an IPN Information Field for storing information (e.g. numeric or alphanumeric string) representative of the Universal Product Number (e.g. twelve-digit UPC Version A number, eight-digit UPC Version E number, thirteen-digit UPC/EAN number, or twelve-digit UPC Version A number plus five-digit Add-On Code Segment number frequently used in the publishing industry) assigned to the consumer product; a Company Name Information Field for storing information (e.g. numeric or alphanumeric string) representative of the name of the company making, selling or distributing the corresponding product; a URL Information Field(s) for storing information (e.g. numeric or alphanumeric string) representative of the Universal Resource Locator (URL) or Universal Resource Locators (URLs) at which information resource(s) of a multimedia type (e.g. containing both graphical and sound information) can be found on the Internet relating to the corresponding consumer product; a Trademark Information Field for storing information (e.g. text and/or alphanumeric strings) representative of each trademark (or Domain Name) used in connection with the promotion, sale, distribution and/or use of the corresponding product, and preferably registered with the United States Patent and Trademark Office (USPTO) or other governmental or quasi-governmental agency (e.g. INTERNIC or Network Solutions, Inc.); a Product Description Information Field for storing information (e.g. text strings) descriptive of the corresponding product; an E-mail Address Information Field for storing information (e.g. numeric or alphanumeric string) representative of the e-mail address of the corresponding company (e.g. manufacturer) on the Internet; and a Status Information Field for storing information (e.g. numeric or alphanumeric string) representative of whether the company (e.g. manufacturer) associated registered product has paid their monthly, quarterly or annual registration fees associated with registration within the IPD Servers of the information finding and serving subsystem hereof. Notably, each information item contained with the information field shown along the same horizontal line of FIG. 4A1 is related or linked.

In general, the URL stored in the URL Information Field specifies the address of an information resource on the Internet (e.g. Web), and thus may point to any one of the following types of information resources: a HTML document or file on the World Wide Web (expressed in the HyperText Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mail to", and specifies the type of resource that the URL is pointing (i.e. connecting) to; a Host Indicator, represented by double slashes "//" if the URL is requesting information from a Web Server; Server Name comprising a Internet Domain Name (e.g. "www."), the address of the Web Server (e.g. "ibm."), and a an designator (e.g. "corn", "edu", "int", "mil", "net", "org", etc.) identifying who owns the server or where it is located; a Path Name, such as "Products/Computers/", indicating a path to the destination information file on the identified Server; and a Resource Name (including file extension, e.g. ".html"), such as "aptiva.htrnl", identifying the actual named information file that contains actual information resource specified by the URL.

As used herein as well as in the Claims to Invention, the term "registered" and the variants thereof shall be understood to mean listed or having an entry within a database. Such listing or entry can be achieved in a variety of ways including, but not limited to: (i) by specific request of the associated company or business; or (ii) by the system administrator without a request and/or authorization of the corresponding company or business linked to the product.

Notably, each information item contained within the information field shown along the same horizontal line of FIG. 4A1 is automatically provided URLs which are assigned to related products of the registrant which may satisfy the goals or objectives of a particular advertising and/or marketing campaign or product promotion program of the registrant company. As it may be desired to relate particular products at particular points in time, the relationships therebetween can be dynamically changed within the IPI Registrant Database by a straightforward database updating operation carried out by a system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve-digit numeric string (for UPC Version A) or eight-digit numeric string (for UPC Version E) will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit "number system" number and a five digit manufacturer code; (ii) a five digit "product" number assigned to the product by the manufacturer; and (iii) a one digit modulo check digit (mathematically calculated) and added to each UPC number to check that the code has been read correctly by the bar code symbol reader.

In order to provide the requester greater control over what information is actually displayed on its client subsystem, the URL Information Field of the IPI Database shown in FIG. 4A1 contains a number of information subfields. As shown in FIG. 4A2, these information subfields comprise: a Product Advertisement Information Field for storing information representative of URLs pointing to information on the Internet relating to advertising and/or promotion of the product; a Product Specification (i.e. Description) Information Field for storing information representative of URLs pointing to information on the Internet relating to specifications on the product; a Product Update Information Field for storing information representative of URLs pointing to information on the Internet relating to product updates, recalls, notices, etc; a Product Distributor (e.g. Wholesaler and/or Resaler) Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field(s) for storing information representative of URLs pointing to information on the Internet relating to miscellaneous aspects of the product (e.g., direct product sales on the WWW, product installation/set-up and operating manuals, company reports (10Ks, annual reports, etc.), and the like. Each URL symbolically linked to a UPC-labeled product registered in the Registered IPI Database is categorized within one or more of these URL categories.

The list of URLs recordable in the IPI Registrant Database for each registered UPC-labeled product is virtually unlimited. Below are just a few examples of how the IPI Finding and Serving Subsystem hereof can be used as a virtual sales agent that provides value-added services to consumers, retailers and the like.

For each CD sound recording, the URL list may contain a URL that points to a promotional QuickTime® video recording or the like on the WWW for reviewing and evaluation by the consumer. The promotional song can be by a commissioned or endorsing artist, as is typically done in conventional advertising programs. The same can be done for video recordings on tape and digital video discs (DVDs). The URL may also provide the consumer with a down-loadable trial version of the product for a limited time period.

For each computer software product, the URL list may contain a URL that points to a multi-media clip on the WWW that provides a demonstration of the solutions that the software product provides, as well as the functions and development tools that it enables. It may also provide the consumer with a down-loadable version of the software product for a time-limited trial period.

For electronic consumer products, the URL list may contain a URL that points to a multi-media clip on the WWW that provides an audio-visual demonstration of the product in various user environments. Also, the URL can contain a URL that points to a Web-based Specification Sheet that can printed out in a retail environment, at home, work or on the road.

For groceries and like articles, the URL list may contain a URL that points to a multi-media clip on the WWW that provides a QuickTime® video recording or the like of the product, illustrating various cooking recipes and uses to which the product can be put. Also, the URL can contain a URL that points to a Web-based Discount Coupon that can be printed out in the store, at home or work.

For toys, the URL list may contain a URL that points to a multi-media clip on the WWW that provides an audio-visual demonstration of the toy along with promotional endorsements by the various characters used in its advertising campaign.

For clothing, garments, or accessories (e.g. wearing apparel), the URL list may contain a URL that points to a multi-media clip on the WWW that provides an Quick-Time® video recording or the like of the clothing, garments, and/or accessories being modeled by stunning fashion models. Ideally, such video recordings, linked to particular articles of wearing apparel by their UPC number, can be used to extend and augment the advertising campaign being carried out in other forms of media (e.g. Television, radio, print, billboards, etc.).

Preferably, the manufacturer, its marketing personnel and advertising agents will actively participate in the creation of the product related information resources, as well as the placement of their URLs into the above-defined (or like) URL categories maintained within the Database of the IPI Finding and Serving Subsystem hereof. Also, using the Manufacturer/Product Registration Subsystem hereof, manufacturers and/or their agents can easily link their UPNs (e.g. UPC and/or EANs) with such URLs and manage the same in a dynamic manner to ensure that product related information on the Internet is accurately linked to the UPNs of the manufacturer's products. Through such active participation, the business objectives of any particular manufacturer or retailer can be promoted by way of the IPI Finding and Serving Subsystem of the present invention. In this way, the information requesting consumer requesting information is provided with only the kinds of product-related information which he or she seeks.

As shown in FIG. 4B, the Non-IPI Registrant Database maintained by each IPD Server comprises a plurality of labeled information fields for each product that is not currently registered with the IPD Server, namely: an IPSN (i.e. IPN) information Field for storing information (e.g. numeric or alphanumeric string) representative of the Universal Product Number (e.g. a UPC number from a UPC numbering system, or an EAN numbering system) assigned to the non-registered product; a Company Name Information Field for storing information (e.g. numeric or alphanumeric string) representative of the name of the company making, selling or distributing the corresponding non-registered product; a Trademark Information Field for storing information (e.g. text and/or alphanumeric strings) representative of each trademark used in connection the promotion, sale, distribution and/or use of the corresponding product, and preferably registered with the USPTO or other governmental agency; a Product Description Information Field for storing information (e.g. text strings) descriptive of the corresponding product; and an E-mail Address Information Field for storing information (e.g. numeric or alphanumeric string) representative of the e-mail address of the corresponding company (e.g. manufacturer) on the Internet; a Status Information Field for storing information (e.g. numeric or alpha-numeric string) representative of whether the company associated non-registered product has been solicited by the IPD Server, and on what dates registration solicitation has occurred. Notably, each information item contained with the information field shown along the same horizontal line of FIG. 4A1 is related or linked. The information required to construct the Non-IPI Registrant Database shown in FIG. 4B can be readily obtained from a number of commercially or publicly available information sources (e.g., the Universal Code Council, Inc., Dayton, Ohio; QuickResponse Services, Inc. of Richmond. Calif.; General Electric Information Services (GEIS) of Delaware, Md.; etc.

Constructing the IPI Registrant Database within the IPI Finding and Serving Subsystem Hereof The utility of the product finding functionalities of the IPI Finding and Serving Subsystem hereof depends in large part of the number of consumer-products registered with its RDBMS 11A, illustrated in FIG. 2B. In principle, numerous techniques may be employed separately and in combination with each other in order to construct the IPI and Non-IPI Registrant Databases supported by the network of IPD Servers of the present invention. Six such techniques will be detailed below.

According to a first database construction technique, the administrator of the IPI Registrant Database would transmit Product Registration Requests (PRRs) in the form of electronic documents to each and every the manufacturer having been issued, for example, a six digit UPC Manufacturer Identification Number (MIN) by the UCC, Inc. Such electronic documents can be transmitted using conventional MIME protocols such as, for example, STMP. The Product Registration Request document would seek to ascertain from the manufacturers the various information items (including the menu of URLs) identified in the IPI Registrant Database of FIG. 4A1. In response to the Product Registration Request, each solicited manufacturer would send back to the administrator of the IPI Registrant Database (for each of its consumer products) its UPC number and a menu of URLs indicating the location of the information resources identified in the Product Registration Request document. This information can then be used to readily construct the IPI Registrant Database of the illustrative embodiment.

According to a second database construction technique, a global advertising campaign would be launched (over various media) in order to solicit the various information elements identified in the IPI Registrant Database of FIG. 4A1 and thus register the products of the manufacturers selling UPC-labeled products. Preferably, such information would be collected by way of an electronic document transfer subsystem set-up to cooperate with the system of the present invention in order to facilitate database construction operations.

According to a third database construction technique, the IPI system itself would continuously solicit consumer product registrations over time in order to collect information from companies responding favorably to the solicitations. While such solicitation efforts can involve the issuance of product registration requests using various types of media, it is preferred that the information collection operations are carried out using electronic document transfer techniques described hereinabove.

According to a fourth database construction technique, a number of commercial on-line Internet search engines, such as Altavista™, Yahoo™, WebCrawler™, Lycos™, Excite™, as well as powerful off-line parallel-processing search engines, would be enlisted to analyze (i.e. mine) information on the World Wide Web in order to collect and link the information elements specified in the IPI Registrant Database of FIG. 4A1.

Once an "initial" IPI Registrant Database has been constructed using any one or more of the four database construction techniques described hereinabove, manufacturers registered therewith can be periodically contacted using Web-based electronic document (i.e. message) transfer techniques in order to request updating and confirmation of the UPN/URL listings contained within the database of the IPI subsystem of the present invention.

According to a fifth database and preferred construction technique of the present invention, the Registrant IPI Database of the system would be initially "seeded" with several items of information obtained and related without the assistance of manufacturers of UPC-labeled products. Such information items include: (1) the six digit UPC Manufacturer Identification Numbers encoded in the UPC symbols (and numbers) applied to the products of such UCC-registered manufacturers; and (2) the URLs of the Web home pages of such manufacturers.

The first step of this database construction method involves obtaining the six digit Manufacturer Identification Numbers (MINs) uniquely issued to manufacturers by the Uniform Code Council, Inc. of Dayton, Ohio. Such MINs can be obtained from various commercial sources including GE Information Services, QuickResponse Services, Inc., as well as the UCC. At present, about 180,000 Manufacturer Identification Numbers have been issued to manufacturers by the UCC. A string of six zeros (i.e. 000000) may be added to each one of these 180,000 or so six digit Manufacturer Identification Numbers in order to produce 180,000 or so 12 digit numbers (i.e. hereinafter referred to as "Manufacturer's Reference Numbers) for the 180,000 or so manufacturers listed in the IPI Registrant Database under construction. As each such Manufacturer Reference Number has the same length as a UPC number of its manufacturer, this number can be conveniently thought of as the "Manufacturer Reference UPC Number" which can be stored in the UPN Information Field of the Database along with the corresponding manufacturers name being stored in the Company Name Information Field.

The second step of the method involves finding the URL of the Web home page of each of the 180,000 manufacturers who have been assigned a Manufacturers Identification Code and are listed in the Database. Such URL information can be found using a number of available techniques: (i) using a commercially available search engine to search the WWW in order to find the URL of the home page of each manufacturer's Website, if it has one, using the name and address thereof obtained during the first step above; or (ii) using a commercially available (INTERNIC-enabled) Domain Name search service that uses the names and addresses of the manufacturers (obtained during the first step above) in order to determine whether a particular manufacturer has a registered domain name on the Internet, and if so, is the domain name being actively used in a URL that points to the home page of the manufacturer's Website. Once obtained, such URLs are then added to the IPI Database, along with the e-mail and/or other address of the manufacturer symbolically linked thereto (if available).

Having constructed the "seeded" Database, it can then be used to connect the client subsystem of users to the home page of Websites of manufacturers of particular products. Initially, when an Internet user provides the UPC number of a particular product as input to the Input Box of the HTML form displayed in the information display frame of the client subsystem (e.g. when operated in its Manufacturer Website Search Mode), then the IPD Server need only compare the first six digits of the entered UPC number against the first six-digits of the Manufacturer Reference UPC Numbers (i.e. Manufacture Identification Numbers) listed in the "seeded" Database. The corresponding (home-page) URL of the matching manufacturer is returned to the client subsystem $C_a$ for display. In instances of an initially seeded Database, in which only the "Manufacturer Reference UPC Numbers" are listed therein, the requesting client subsystems are provided with the URLs of the home pages of the symbolically linked manufacturers. Then as manufacturers begin to register their consumer products with the system (e.g. in response to mass e-mailings, advertisements and/or marketing and promotional efforts, etc.), the IPD Database will return a menu of "hot-linked" URLs, for each registered product, pointing to various types of product-related information resources on the Internet (described above) that can be easily accessed by simply clicking thereon in a conventional manner. Over time, Manufacturer Reference UPC Numbers and the URLs of the "home pages" of such manufacturers will become replaced by the UPC numbers of registered products and the menu of URLs on the WWW symbolically linked thereto by the manufacturers, thereby allowing consumers and users of the system to precisely pinpoint consumer product-related information on the WWW which has been specified by the manufacturer, its marketing department and/or advertising agency. With manufacturer's and advertiser's participation and feedback, the initially seeded Database described hereinabove will quickly grow into a robust relational database richly filled with the various information items described in FIGS. 4A1 and 4A2, including the symbolically linked UPCs and URLs that point to very specific consumer product related information resources (i.e. files) stored within IPI Servers of the system located across the global expanse of the Internet.

According to a sixth database construction technique of the present invention, the Registrant IPI Database of the system would be constructed by allowing each manufacturer to construct a limited or restricted version of the master UPN/URL Database (i.e. Registrant IPI Database) of the system, wherein only UPC-encoded products of the registered manufacturer and Web-based information items related thereto are entered into the database. As will be described in greater detail herebelow in connection with the third method of Product Registration in the subsystem hereof, the creation of such limited-version UPN/URL databases can be carried out by providing each registered manufacturer with a computer program that allows its administrators to construct and manage a limited UPN/URL database in a "turn-key" manner. Also, from its Website, the manufacturer can serve the limited UPN/URL database over the Internet to consumers. As part of the registration process, each registered manufacturer transmits its limited UPN/URL database to Webserver 30 which then integrates all such databases in order to update the master UPN/URL Database (IPI Registrant Database) of the system.

Overview of Modes of Operation for IPI Finding and Serving Subsystem

In order to enter a primary mode of operation of the IPI Finding and Serving Subsystem, the consumer or retail sales clerk selects a particular mode activation button (e.g. 21A, 21B, 21C, 21D or 21E) displayed in the control frame 21B of the GUI browser program at the requesting client subsystem 13. Upon making the selection, the Web browser at the client subsystem 13 automatically requests a particular HTML-encoded form (typically residing on the IPD Server(s) 11). This HTML form corresponds to the selected mode of operation, and is displayed within the information display frame 20C of the Web browser of the requesting client subsystem. The HTML-encoded form corresponds to the selected mode and is linked to a CGI-script related to the selected mode and possibly to other HTML forms required to carry out the database-access and/or management process associated therewith. The requesting client subsystem then enters the information requested by the HTML form displayed within the information display frame 20C of the Web browser's GUI interface. Information entry into the HTML form can be carried out using bar code symbol reading equipment, keyboard or keypad, speech dictation equipment (by Dragon Systems, Inc. of Newton, Massachusetts), and the like.

In general, the particular messages which will be displayed within the HTML forms during any particular mode of operation will depend upon several factors namely: whether the IPI Website is intended for access by bar code driven kiosks (i.e. client subsystems 13) as shown, for example, in FIGS. 3A2, 3A3, 3A4, and 3A5 located within retail environments; or whether the IPI Website is intended for access by desktop, laptop and palmtop client computer systems 13 as shown, for example, in FIG. 3A1 located at home, in the office or on the road.

For example, if the IPI Website supported by the IPI Finding and Serving Subsystem hereof is intended for access by bar code driven kiosks, then the HTTP documents related to the IPI Website will be particularly adapted to facilitate the use of bar code symbol reader at the client subsystem. This way UPNs (e.g. UPC or EAN symbols) can be easily entered into the subsystem without manual key-entry operations. In contrast, if the IPI Website supported by the IPI Finding and Serving Subsystem hereof is intended for access by client subsystems not having bar code symbol readers (e.g. Web-enabled computer systems at home, in the office or on the road), then the HTTP documents related to the IPI Website will be particularly adapted to facilitate the use of data-entry display screens at the client subsystem. This way, UPNs (e.g. UPC or EAN symbols) can be easily entered into the subsystem using bar code symbol scanners avoiding manual key-entry operations. In the illustrative embodiment, bar code-code driven and manual data-entry IPI Websites are served from a "framed" GUI interface, in which the control strip 21B has five (5) Check Boxes 21A through 21E described above which enables the consumer, retail sales/service personnel as well as manufacturers to select the particular mode of operation that suits his or her consumer product information needs at any particular instance in time.

Manufacturer/Product Registration Mode Of Operation

Figure 5A:
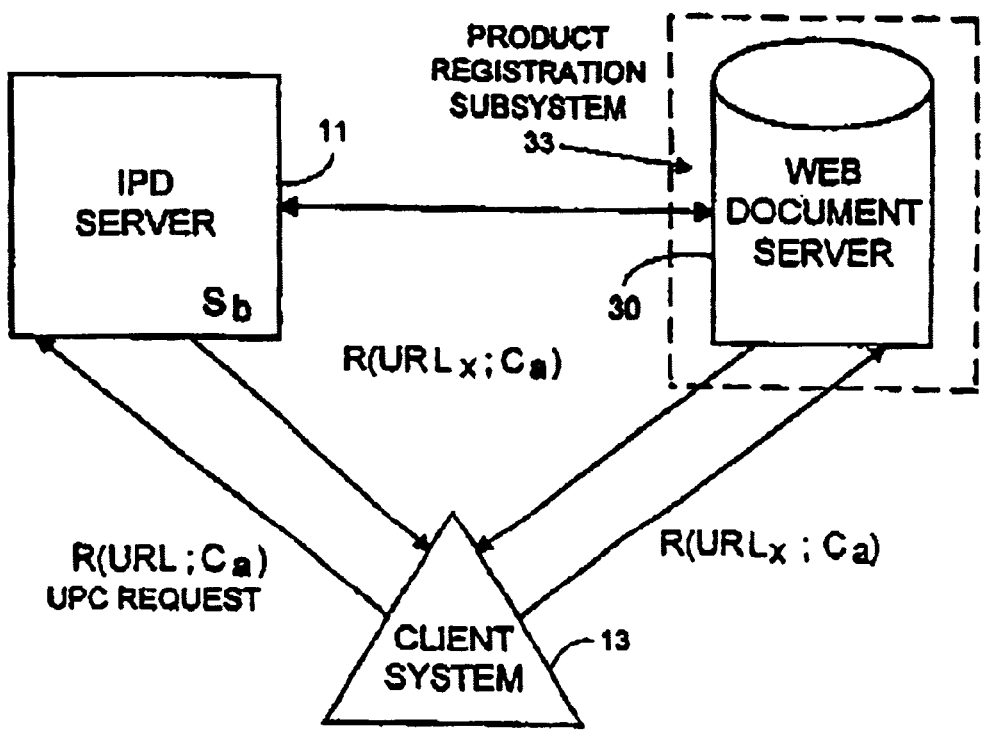
FIG. 5A is a schematic diagram illustrating the high level structure of communication protocol that can be used among the client subsystem Ca, the IPD Server Sb, and the Web-based Document Server SWD (30) of the IPI Finding and Serving Subsystem hereof when, from any particular client subsystem, the subsystem engaged is in Manufacturer/Product Registration Mode of operation, requesting as input a URL which automatically connects the client subsystem to the Web Document Server associated with the Manufacturer/Product Registration Subsystem of the present invention.
Figure 6A:
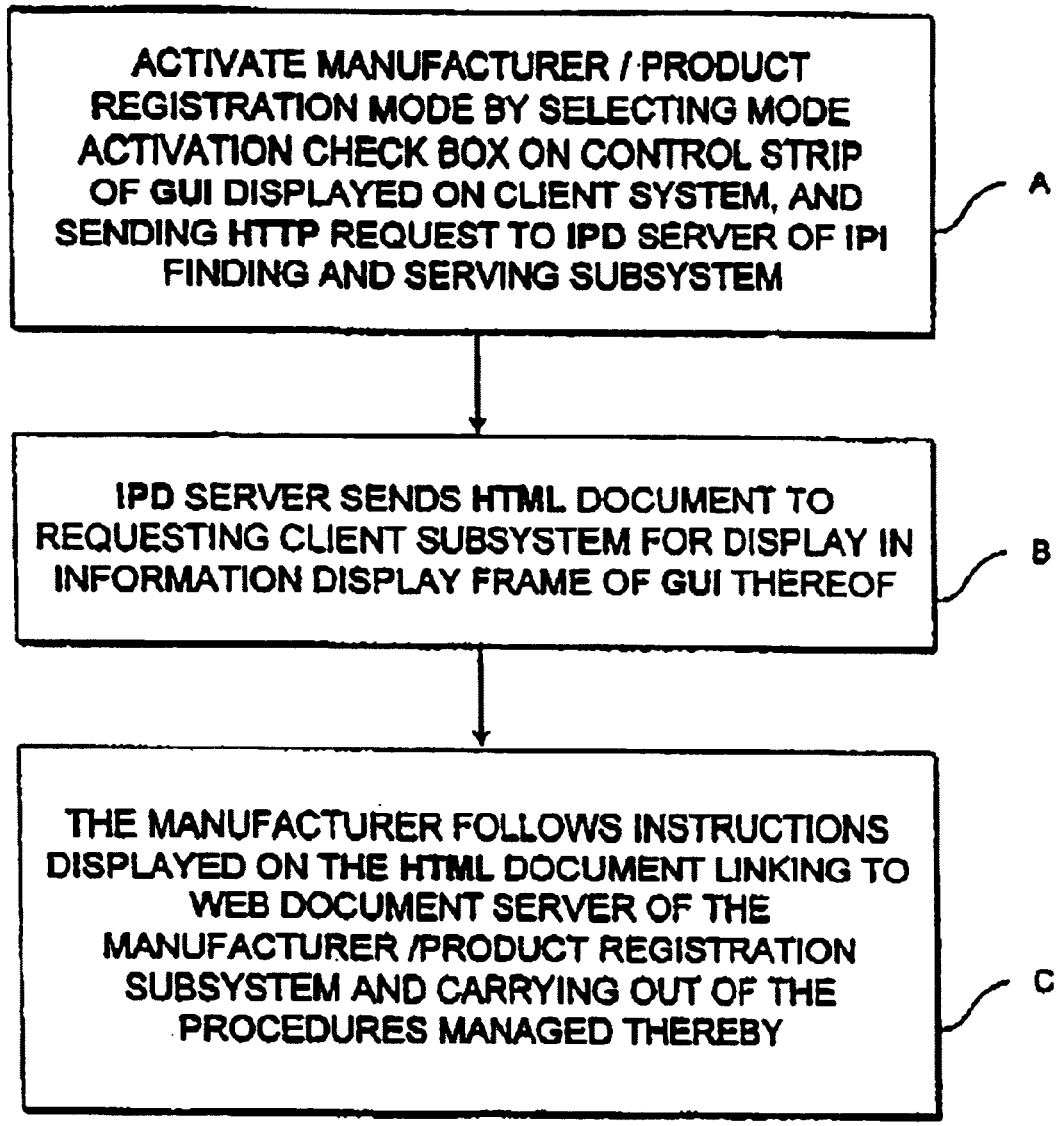
FIG. 6A provides a high level flow chart illustrating the steps involved in carrying out the communication protocol shown in FIG. 5A when the IPI Finding and Serving Subsystem is in its Manufacturer/Product Registration Mode of operation.

Referring to FIG. 5A, the high level structure is shown for a communication protocol that can be used among a client subsystem $C_a$, an IPD Server Sb, and an IPI Server Sc of the IPI finding and serving subsystem hereof when it is induced into the Manufacturer/Product Registration Mode of operation from the point of view of the depicted client subsystem. FIG. 6A provides a high level flow chart illustrating the steps involved in carrying out this communication protocol when the IPI Finding and Serving Subsystem is in its Manufacturer/Product Registration Mode of operation.

As indicated at Block A in FIG. 6A, when selected from the user-interface of an IPI Website, the first Check Box type button 21A automatically activates the Manufacturer/Product Registration Mode of the IPI Finding and Serving Subsystem by sending an HTTP request to the IPD Server(s) 11 based on a URL hot-linked to the selected Check Box. As indicated at Block B in FIG. 6A, this causes a HTML-encoded document residing on the IPD Server(s) 11 to be served from the HTTP Server thereof to requesting client subsystem for display on the information display frame 20C thereof. The HTML document of the illustrative embodiment displays several types of information relevant to the Manufacturer/Product Registration Mode, namely: eligibility requirements (i.e. qualifications) for a manufacturer to register with the IPI Finding and Serving Subsystem; optional ways of registering consumer products and product-related information with the Manufacturer/Product Registration Subsystem hereof 33; ways of acquiring computer software necessary for managing consumer product-related information (e.g. UPNs, URLs, trademarks and product descriptors) on a particular computing platform using EDI techniques supported by the Manufacturer/Product Registration Subsystem 33; etc; and one or more Check Boxes embodying links (i.e. anchors) to HTML documents, CGI scripts and the like designed to facilitate this mode of operation. Notably, at least one of these HTML documents will be located on the Web Document Server 30 of the Manufacturer/Product Registration Subsystem 33, providing manufacturers (and/or their designated information-managers and agents) with a point of entry into the manufacturer/product registration process hereof. As indicated at Block C in FIG. 6A, the manufacturer and or its agent follow the instructions displayed on the HTML document, linking to the Web Document Server 30 of the Manufacturer/Product Registration Subsystem 33 and filling out the various HTML forms transmitted to the requesting client subsystem, downloading Web-based EDI software for UPN/URL management; and the like. While carrying out registration of manufacturers with the subsystem is relatively straightforward, there are a number of different ways of carrying out the Product Registration Mode of the subsystem. These alternative techniques will be described below.

The first method illustrated in FIG. 2 involves by carrying out FTP between a client subsystem of the registering manufacturer (or its agent) $M_i$ and an IPD Server in order to update the IPI Registrant Database associated therewith. This can be carried out by the manufacturer's officer or agent surfing to the IPI Website, selecting the "Product Registration Mode" from the control strip, and then following the instructions displayed on the various screens of the Website in this mode. When using the first method, product UPCs, URLs and other information elements can be formatted within suitable Product Registration Forms and transmitted by FTP from the client subsystem or Database Server of a registering manufacturer to the IPD Server 11 so that the IPI Registrant Database thereof can be updated accordingly. The first method will be desirable typically when registering a few consumer-products.

Figure 2A:
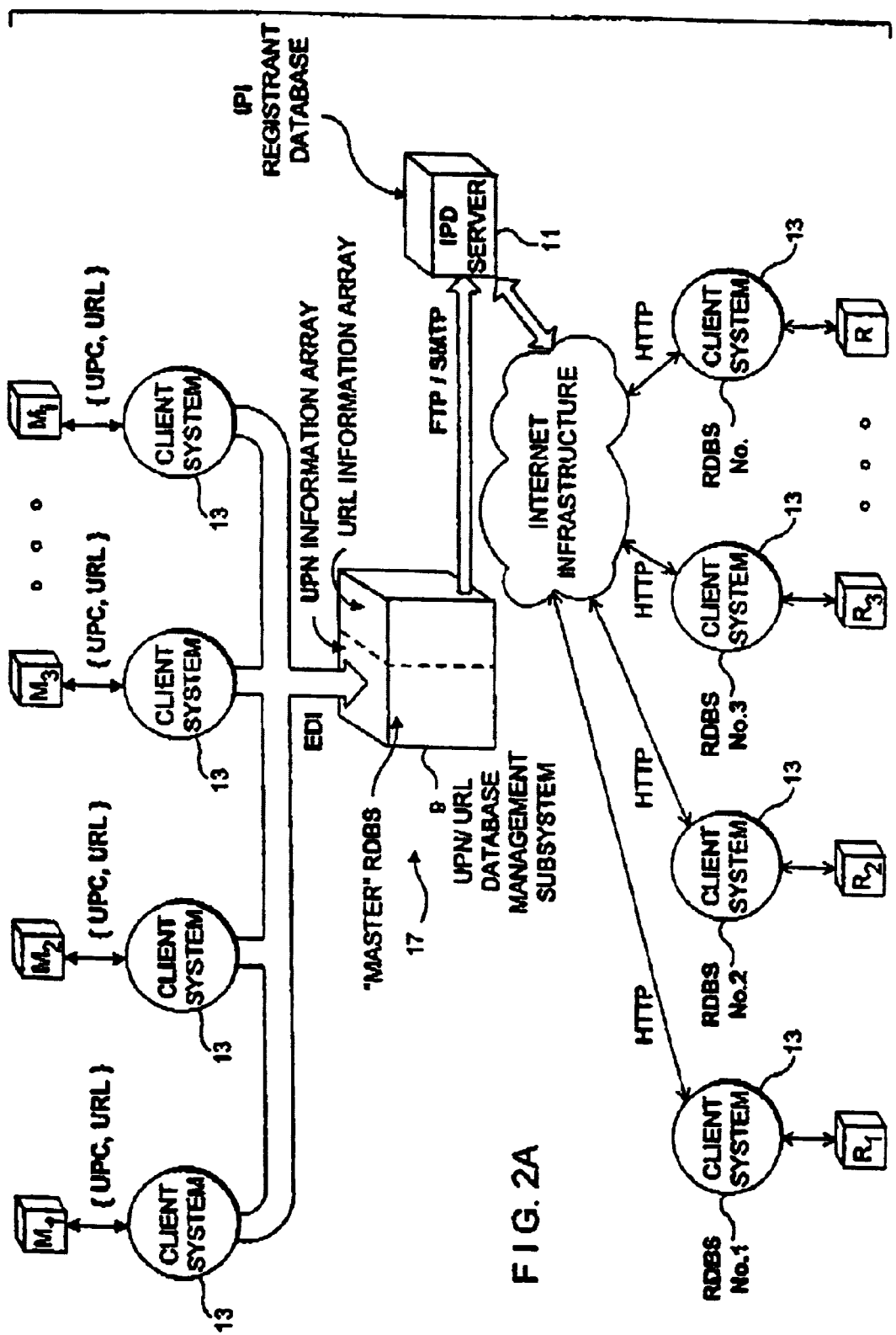
FIG. 2A is a schematic diagram illustrating the flow of information along the consumerproduct supply and demand chain, including (i) the communication link extending between the information subsystems of manufacturers of UPC-encoded products and the centralized (or master) UPN/URL Database Management Subsystem 9 of the consumer-product information collection, transmission and delivery system of the present invention, (ii) the communication link extending between the UPN/URL Database Subsystem and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, and (vi) the communication link extending between the IPI Servers and the Client Subsystems of consumers.

The second method illustrated in FIG. 2A, involves first carrying out EDI between a client subsystem of the registering manufacturer (or its agent) and the UPN/URL Database Subsystem 9, and then carrying out FTP or SMTP between the client subsystem and an IPD Server in order to update the IPI Registrant Database maintained therein. The second method will be desirable when a manufacturer needs or desires to register a large number of consumer-products. The details of these information transmission methods will be described below.

When using the second method, conventional EDI protocols can be used to transmit product UPCs, URLs and other information elements from client subsystems or Database Servers of manufacturers to the UPN/URL Database Subsystem 9 of the present invention. FTP can be used to transmit UPCs and URLs from the UPN/URL Database Subsystem to each IPD Server in the system so that the IPI Registrant Database thereof can be updated accordingly. Once registered with the system using either of these methods in the Product Registration Mode, such consumer-products can be easily found on the Internet by anyone wishing to use the product finding techniques of the present invention.

The third method involves by carrying out electronic document interchange over the Internet between the WebDox Remote™ Computer System 13 and the WebDox™ Server 30 of the system of the present invention, and communication between the WebDox™ Server 30 and the WebDox™ Admin computer system 31 of the system hereof. The various steps involved in this embodiment of the consumer product registration process will be described in detail below.

When the manufacturer selects the "Product Registration Mode" of the system, a Manufacturer Registration Form is automatically downloaded from the WebDox™ Server 30 to the Manufacturer's client computer system 13 (i.e. the WebDox Remote™ Computer System). At the end of the downloading process, a Manufacturer Registration Form is presented (i.e. displayed) and the manufacturer then enters some requested identification information (e.g. Manufacturer's Company Name, Address, Name of CEO and President, phone number, 6-digit Manufacturer Identification Number assigned by the UCC, etc.) and presses the "Send" button on the Manufacturer Registration Form. The form is then transmitted immediately via the Internet and received by the WebDox™ Server 30. At the WebDox™ Server 30, an automated process takes the information in the Manufacturer Registration Form and registers the Manufacturer with the system.

Upon registering the manufacturer with the system, the manufacturer is asked to select which version of "customized" WebDox Remote™ software (i.e. the UPN/URL Registration Application) the manufacturer would like downloaded to its client computer system 13 (e.g. WebDox Remote with UPN/URL Database and CGI for MacOS WebServer, WebDox Remote with UPN/URL Database and CGI for UNIX Web Server, or WebDox Remote with UPN/URL Database and CGI for NT Web Server). Once the manufacturer makes its selection, the customized WebDox Remote software is automatically downloaded to the manufacturer's client computer system 13. This downloaded software includes a computer program that automatically generates (on the manufacturer's) client subsystem, a relational database management system (RDBMS) which allows the manufacturer (or its agents) to easily construct and maintain a UPN/URL database (akin to that specified in FIG. 4A1) but restricted to containing information relating only to the manufacturer's products. Thus, when the manufacturer attempts to enter a UPC number into the manufacturer's UPN/URL database that does not contain the 6-digit Manufacturer Identification Number assigned to the manufacturer by the UCC, the RDBMS automatically blocks all such information entries. Consequently, the UPN/URL database can only maintain information pertaining to the registered manufacturer's products and information relating thereto on the Internet. As the manufacturer adds or removes products from its retail or wholesale line, the database administrator simply adds or removes the UPC and URL information relating thereto from the RDBMS. As will be described in greater detail hereinafter, such database changes are periodically transmitted to the WebDox™ Server 30 so that the IPI Registrant Database (i.e. master UPN/URL database) of the system (maintained on the IPD Servers thereof) can be updated in a timely manner.

Preferably, the limited or restricted version of the UPN/URL database maintained by each registered manufacturer on its client subsystem 13 is connected to the manufacturer's Internet Server 12' by a Common Gateway Interface program (CGI) 40, or other suitable means, as shown in FIG. 2. In this way, the manufacturer's limited version of the UPN/URL database can be made accessible to consumers world-wide from the manufacturer's Website which, in the illustrative embodiment, is assumed hosted on an Internet information server 12' that is similar to an IPI Server 12 described in detail hereinabove. In order to simply the process of serving of the manufacturer's limited-version of the UPN/URL database on the WWW, it is preferred that the CGI 40, and input and output forms and methods for searching and the displaying the results from the limited-version UPN/URL database are predesigned for use with manufacturer's Internet Server 12' (taking into consideration its operating system and the like). This way, prior to registration the manufacturer need only make a selection of the type of customized WebDox Remote software it needs for its computing and Internet serving platform(s). Then, during software download, the WebDox Server 30 simply transmits the suitable version of the customized WebDox Remote software to the manufacturer so that it can create, maintain and serve (on the WWW) its limited version of the UPN/URL database in a "turn-key" manner.

In the illustrative embodiment of the present invention, the homepage of each registered manufacturer's Website will display a visually conspicuous radio button labeled "UPC Request™ Product Finder" or the like. Moreover, whenever a consumer attempts to search the manufacturer's limited-version UPN/URL database for products not registerable to the manufacturer (i.e. using UPC numbers not containing the manufacturer's 6-digit UCC Manufacturer Identification Number), the limited-version of the UPN/URL database will automatically display an HTML-encoded message from the manufacturer's Website, urging the consumer to surf to the IPI Registrant Database of the system (maintained on the network of IPD servers 11). Preferably, such HTML-encoded messages will have a hot-linked URL (i.e. anchor) to Website(s) providing consumer access to the "master" UPN/URL database.

The WebDox Remote™ computer system 13 available to each registered manufacturer has both online and offline modes of operation. In the offline mode, the manufacturer responds to a UPN/URL Registration Request from the WebDox™ Server in the following manner. First the WebDox Remote™ software analyzes the limited-version of the UPN/URL database that it has been currently created and maintained by the manufacturer or its designee. Thereafter, the WebDox software automatically creates a UPN/URL Registration Response document which contains a set of currently active URLs specifying the address location of Web-based information resources associated with each UPC-encoded product of the manufacturer. Then, WebDox Remoter program establishes an Internet connection with the WebDox™ Server, through a "Get/Send Mail" option. This delivers the UPN/URL Registration Response (document) to the WebDox™ Server 30 and retrieves any documents which are waiting thereat for the manufacturer. These new documents are listed by WebDox Remote™ program and presented in the In basket of the manufacturer's WebDox Remote™ computer system 13.

In the online mode, WebDox Remoter (under the control of the Form Application) can also send UPN/URL Registration Request documents immediately. For very sensitive applications (i.e. Just-in-Time), this ensures that the UPN/URL Registration Response document is received at the WebDOX™ Server 30 the moment that the manufacturer completes the document.

In general, the WebDox™ Server 30 provides a high-volume document processing and mailboxing environment between the WebDox Server and the WebDox Remote™ system of each registered manufacturer. WebDox™ Server 30 performs: permanent storage and tracking of all UPN/URL Registration Request documents sent and UPN/URL Registration Response documents received; automatic reconciliation of acknowledgments from WebDox Remoter™ program; Automatic creation of user-friendly receipt messages to the manufacturer; "mailboxing" of outbound UPN/URL Registration documents for retrieval by manufacturer; and automatic manufacturer and profile creation based on forms received from manufacturers. The WebDox™ Server 30 consists of online components that run as extensions to Microsoft's Internet Information Server (IIS) using the ISAPI interface. This provides higher performance and lower hardware requirements than a conventional CGI Web Interface. Processing intensive tasks are performed asynchronously from the Web server. An integrated queuing and dispatching system manages the processing of documents and interaction with the corresponding application. For large volume situations, the WebDox™ Server components can be deployed on different machines, the WebDox™ Server components (ISAPI extensions) on one machine, the processing components and database on another machine.

Data for UPN/URL Registration Request documents to be sent to manufacturers is extracted from the IPI Registrant Database using an interface or utility program. The document data (e.g. information fields associated with UPN/URL registration) can then be accepted by WebDox in a direct manner after formatting. The UPN/URL Registration Request document should be formatted to a file structure created during the design of the UPN/URL Registration Application. The WebDox™ Server 30 then converts the application data into a UPN/URL Registration request document (i.e. data package). The data package for each manufacturer is then stored (as a message) in an assigned Mailbox of the WebDox™ Server 30. These messages are then available to be retrieved by the registered manufacturers using WebDox Remote's™ "Get/Send Mail" feature.

As discussed above, the WebDox Remote™ program transmits messages (e.g. UPN/URL Registration Response documents) to the WebDox™ Server 30, where, after passing security checks, they are placed in the WebDox Mailbox system. Incoming (document) messages are received from the Mailbox, processed, and converted into data files for direct transfer to the database management system handling the IPI Registrant Database.

For each document received, the WebDox™ Server 30 will return a message to the manufacturer confirming receipt of the document. WebDox Remote™ system also returns delivery confirmations to the WebDox Server. These messages are used by the WebDox™ Server to track the status of messages. WebDox™ Server 30 maintains Mailbox Files for all inbound and outbound messages. The status of messages is updated on an ongoing basis as acknowledgement messages are received allowing timely and precise audits.

WebDox Admin™ Computer system 31 provides an easy-to-use tool to manage the community of manufacturers, review the status of documents, and configure the WebDox™ Server 30, including: ad hoc maintenance of manufacturer information; online display of the Mailbox permitting inquiry into document status or document activity for particular manufacturers, and the ability to reset document status; creation and maintenance of UPN/URL Registration Profiles; preparation of "releases" of new and updated UPN/URL Registration Applications; Distribution of new and updated UPN/URL Registration Applications; and automatic inventory and tracking of UPN/URL Registration Applications distributed to manufacturers.

In the preferred embodiment, UPN/URL Registration Application design and development is carried out on a Windows 95 or NT workstation. The UPN/URL Registration Application is developed, tested, and then fully implemented for production with manufacturers. New or updated UPN/URL Registration Applications are registered with the WebDox Admin™ computer system 31 and are then distributed to the manufacturers as described herein above.

In the preferred embodiment, UPN/URL Registration Applications are developed using Microsoft Visual Basic™ and related software tools. These products provide rapid design and creation of the screen-based forms that the manufacturer uses. In addition, the "intelligence" behind the form, in the UPN/URL Registration Application, can be very powerful, making the manufacturer's work easier while ensuring that the user and Server application receive high quality data.

The WebDox Admin™ system handles the distribution of UPN/URL Registration Applications to manufacturers. New UPN/URL Registration Applications can be sent to some or all of the existing manufacturers assigned UPC Manufacturer Identification Numbers. Updates to UPN/URL Registration Applications can be sent to manufacturers who are currently using that UPN/URL Application. The actual update is distributed by sending a small notification message to each manufacturer, which then results in the remote site downloading the new forms from the WebDox™ Server 30, as hereinbefore described above.

Manufacturer Website Search Mode Of Operation

Figure 5B:
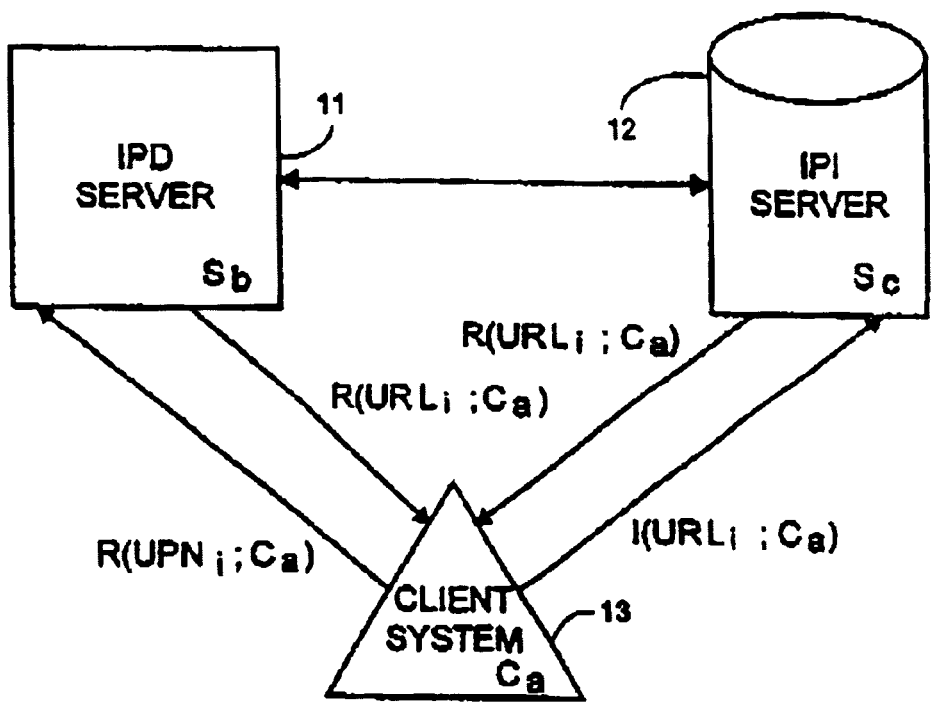
FIG. 5B is a schematic diagram illustrating the high level structure of a communication protocol that can be used among the client subsystem $C_a$, the IPD Server $S_b$, and the IPI Server $S_c$ of the IPI Finding and Serving Subsystem hereof when the subsystem is in its Manufacturer Website Search Mode of operation, requesting as input a UPN (e.g. UPC or EAN) associated with a manufacturer's product, and providing as output the URL of the home page of the manufacturer's Website and automatically displaying the same.
Figure 6B:
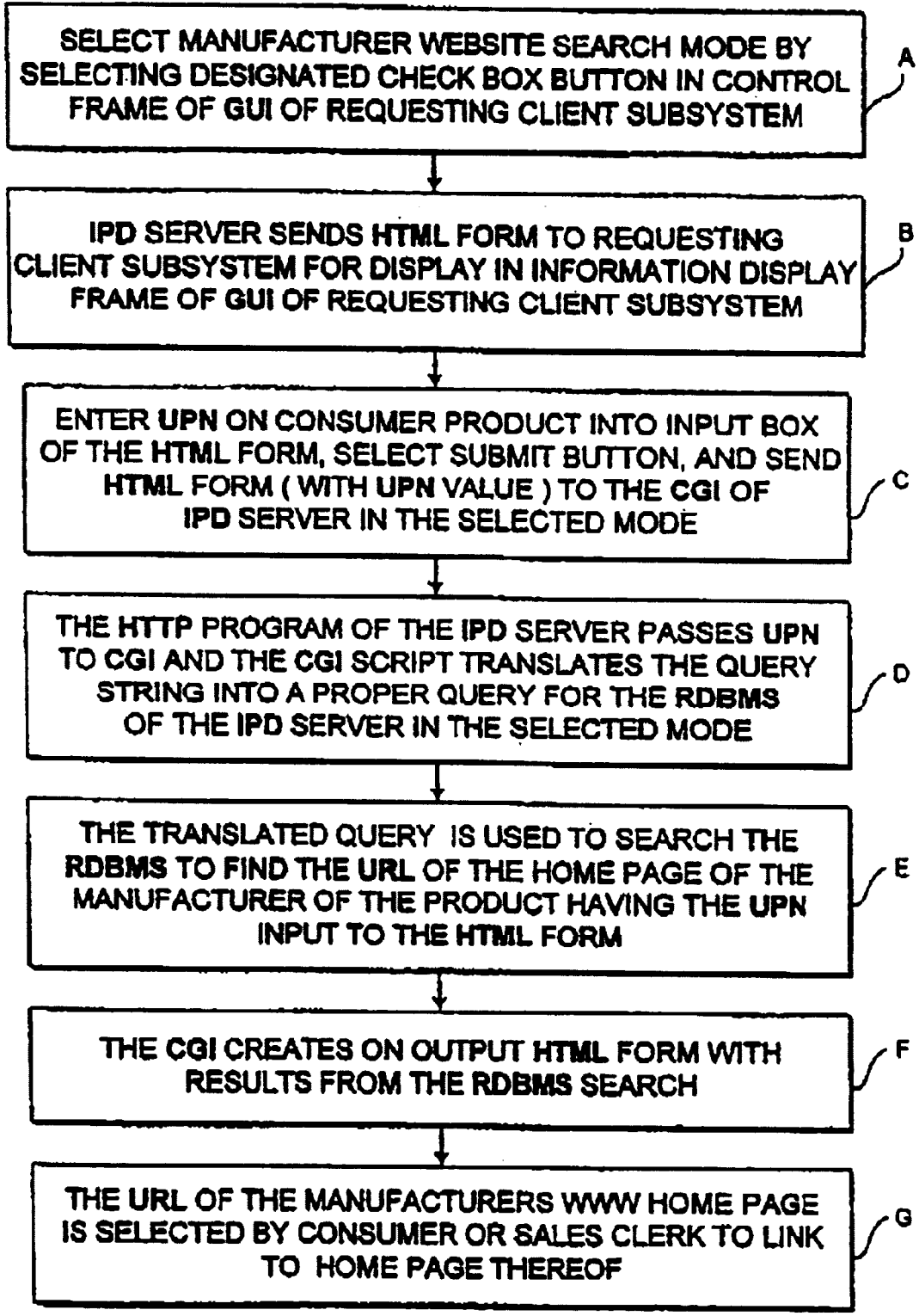
FIG. 6B provides a high level flow chart illustrating the steps involved in carrying out the communication protocol shown in FIG. 5B when the IPI Finding and Serving Subsystem is in its Manufacturer Website Search Mode of operation.

Referring to FIG. 5B, the high level structure is shown for a communication protocol that can be used among a client subsystem $C_a$, an IPD Server Sb, and an IPI Server Sc of the IPI finding and serving subsystem hereof when it is induced into the Manufacturer Website Search Mode of operation from the point of view of the depicted client subsystem. FIG. 6B provides a high level flow chart illustrating the steps involved in carrying out this communication protocol when the IPI Finding and Serving Subsystem is in its Manufacturer Website Search Mode of operation.

As indicated at Block A in FIG. 6B, when selected from the user-interface of a bar-code driven IPI Website, the second Check Box type button 21B automatically activates the Manufacturer Website Search Mode of the IPI Finding and Serving Subsystem by sending an HTTP request to the IPD Server(s) 11 based on a URL hot-linked to the selected Check Box.

As indicated at Block B in FIG. 6B, this causes a particular type of HTML-encoded document (i.e. called an "HTML form" or "Web form document") residing on the IPD Server(s) 11 to be sent to the Web browser of the requesting client subsystem 13 and displayed on the information display frame 20C thereof (requesting this mode of service). As in the Manufacturer Website Search Mode described above, the HTML form sent in the Manufacturer Website Search Mode may also use any HTML format commands, such as headers, paragraphs, and lists, but must include three unique items, namely: the METHOD by which the user input is to be sent; the ACTION, which specifies a URL to which the user input is to be sent, presumably, a CGI script within CGI 11B that will act upon the request appropriately; and a SUBMIT button, to send the completed form over the Internet via HTTP. In the illustrative embodiment, user input (i.e. a UPC or EAN number associated with a particular consumer product) is obtained by an Input Box, which allows the user (i.e. retail sales clerk or consumer) to type in or scan in a UPC or EAN number assigned to a consumer product on which product related information is sought.

As indicated at Block C in FIG. 6B, the consumer or retail clerk scans the bar coded consumer product, or enters the UPC or EAN number thereon into the Input Box of the HTML form, and selects the SUBMIT button thereon. In response thereto, the Web browser on the client subsystem 13 sends a GET request to the HTTP Server 11C of the IPD Server 11. When selecting the SUBMIT button on the HTML form, the Web browser executes the METHOD associated with the HTML form and sends the stored UPC (or EAN) value to the URL specified by ACTION associated with the HTML form (i.e. the Web browser performs the action specified in the ACTION). The ACTION of the HTML form specifies the URL of the CGI script within CGI 11B that will process the request from the HTML form. This amounts to the Web browser constructing a GET request for that URL, with the arguments (the query string) being attached to the end of the URL. The arguments of the HTML form are specified by the INPUT items of the HTML form (i.e. the UPC or EAN number on the consumer product on which information is sought).

In general, the HTTP and HTML protocols provide three ways to pass the input (e.g. UPC or EAN number) from the users to scripts on the IPD Server 11 (i.e. HTTP Server). All three methods accomplish the same thing: they allow the Web browser to pass information to a script on the IPD Server 11. A script may use any of the three methods, and some really robust Web gateways (CGI) 11B are able to deal with Web clients 13 that use any of the three methods. The way these methods are implemented on the HTTP Server 11 depends on the specific operating system that it uses, and is defined as part as the system-specific CGI 11B. The same HTML form used in this mode might cause completely different things to happen on two different servers, but it would produce the same result for the user.

The first method, used in the illustrative embodiment, passes the scanned UPC or EAN number (input) as part of a GET request, attached to the end of the URL after a question mark "?". This convention means that what follows the "?" is a query, and (on a UNIX-based server) is copied into the environment variable QUERY_STRING onto the HTTP Server 11C before calling the CGI script. When the script executes, it gets the query string from this environment variable. The query string consists of a series of terms, each of which is a name and a value, e.g. EAN=9781558603769, having a single term and single value. In the case where the query string consists of two or more terms, then each term is separated by the character :"&".

The second way that the scanned UPC or EAN number can be sent from the Web browser of the client subsystem 13 to the HTTP Server 11C is with a path extension. In this convention, the client subsystem sends a GET request for the URL of the Web script 11B, with the extra information attached to the URL as if it were part of a longer name. The HTTP (http) program 11B discovers this extra path and calls the script with the environment variable PATH_INFO set to the extra characters.

The third way to pass information to the server is through the POST method. When used with a script, the input UPC or EAN number from the HTML form is sent from the Web browser of the client subsystem 13 to the HTTP Server 11C as an HTTP object. This means that the client subsystem may send information to the HTTP Server 11C in the same way as the HTTP server sends the information to the client subsystem, which could be a full HTML document. When the POST method is used on a UNIX-based system, the information from the Web browser of the client subsystem is passed to the Web script 11B through standard input, rather than an environment variable.

The above three ways of passing information from users of client subsystems 13 to the CGI scripts 11B on the IPD Server 11 of the system hereof are specified in the HTML, HTTP and CGI standards, and depend on the specific operating system that the HTTP Server 11B. The details of how the CGI script must be written and how the input UPC or EAN number from the HTML form is received are drastically different for Macintosh, Microsoft Windows NT, and the UNIX platforms. All of the events described above must happen on each of these platforms, but the way they happen is completely different on different computing platforms. These differences are specified in the CGI standard for each operating system. These differences should not be apparent to the Web browser program of the client subsystems or the users thereof, but will matter to the creators of the CGI script 11B.

Figure 6C:
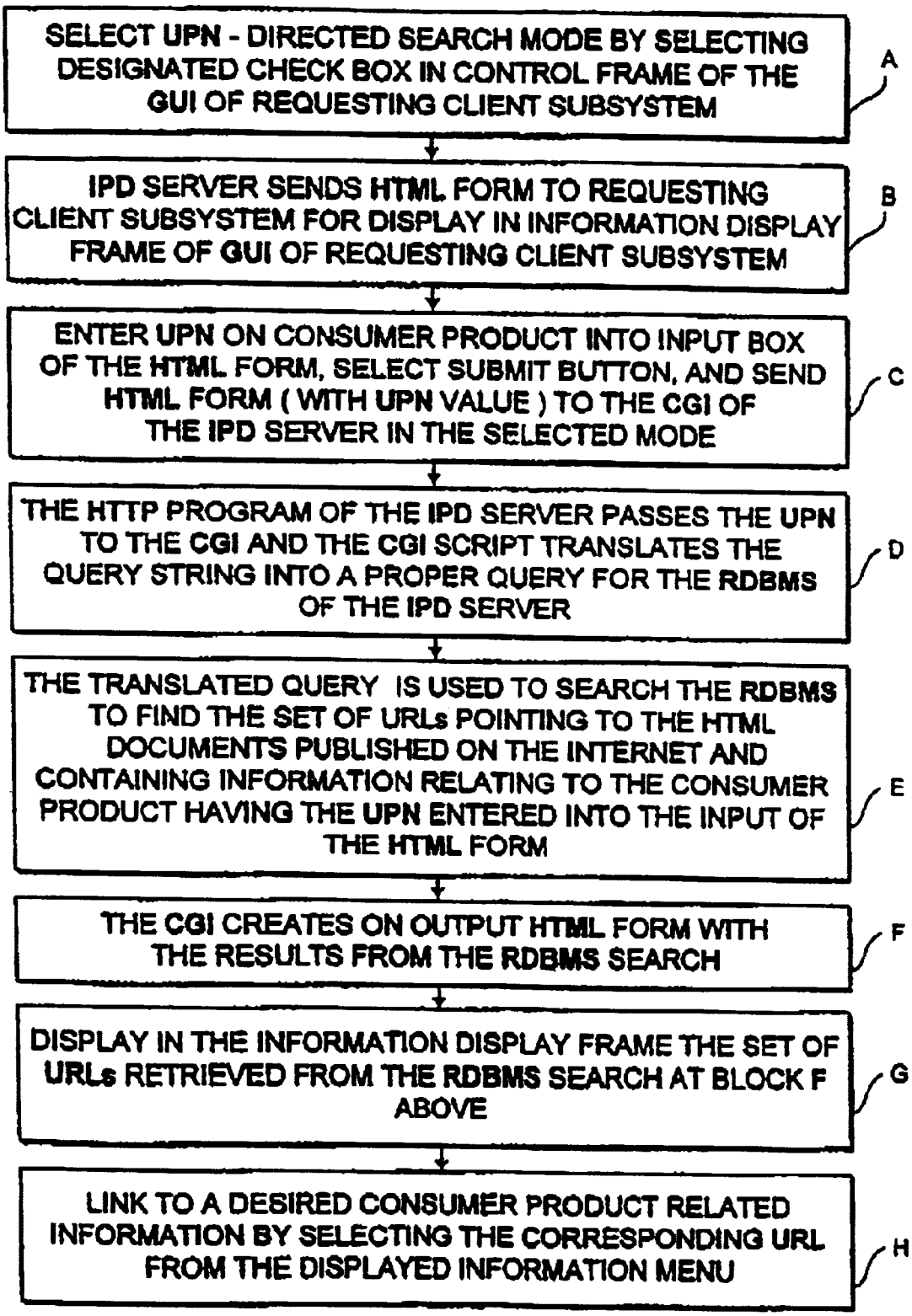
FIG. 6C provides a high level flow chart illustrating the steps involved in carrying out the communication protocol shown in FIG. 5D when the IPI Finding and Serving Subsystem is in its UPN-Directed Information Access Mode of operation.

As indicated at Block D in FIG. 6C, the HTTP (http) program 11C passing the arguments (the UPC or EAN numbers in the query string) to the CGI program 11B and the CGI script translates the query string into a proper query for use in searching the RDBMS 11A of the IPD Server 11.

As indicated at Block E in FIG. 6C, the translated query is used to search the RDBMS 11A in order to find the set of URLs pointing to HTML documents (i.e. Web Pages) published on the Internet and containing information relating to the consumer product having the input UPC or EAN number. The result returned from the RDBMS 11A is an ASCII record specifying the set of URLs pointing to HTML documents published on the Internet and containing information relating to the consumer product having the input UPC or EAN number entered into the HTML form. In order for the Web browser of the requesting client subsystem to display the results of the database search using the UPC or EAN input, the ASCII record must be converted into a HTML document (i.e. output HTML form).

As indicated at Block F in FIG. 6B, the CGI 11C creates the elements of an output HTML form (Web output form), inserts the result from the RDBMS 11A into the output form, and sets the content-type to be text/html. The CGI script may translate, filter, augment and reformat the result from the database search in any way so long as the result is an HTML document or some format that the Web browser of the client subsystem can display.

As indicated at Block G, the menu of URLs retrieved from the database search is displayed in the Web output form. At Block H, the consumer or retail sales clerk can link to a desired consumer product related information resource (HTML document) by selecting from the information menu, the URL anchored to the information resource in the displayed information menu.

UPN-Directed Information Access Mode of Operation

Figure 5C:
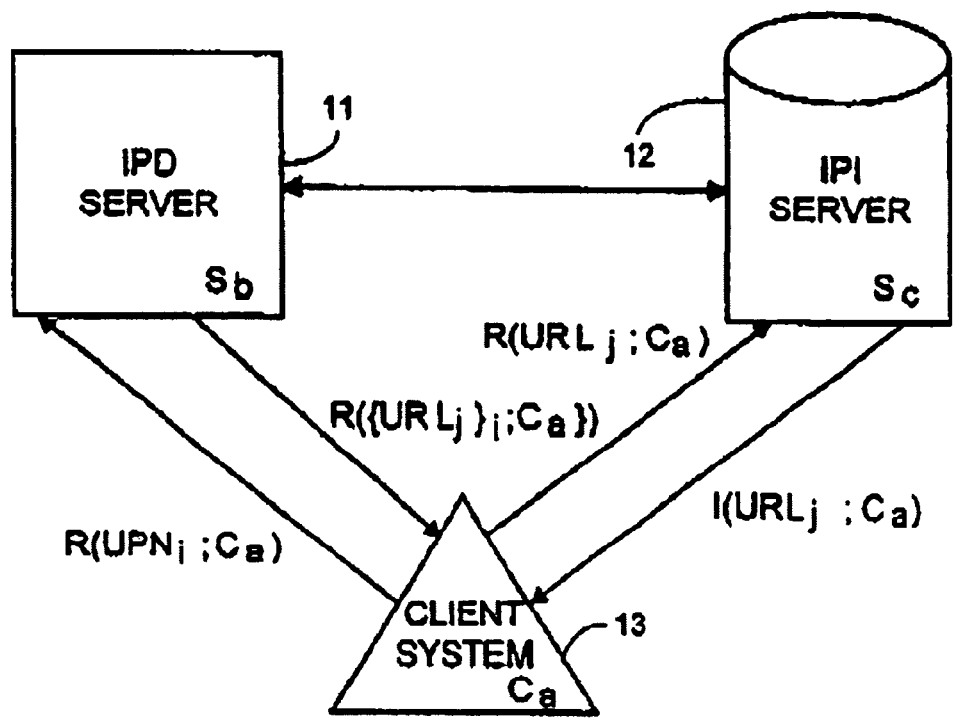
FIG. 5C is a schematic diagram illustrating the high level structure of a communication protocol that can be used among the client subsystem $C_a$, the IPD Server $S_b$, and the IPI Server $S_c$ of the IPI Finding and Serving Subsystem hereof when the subsystem is in its UPN-Directed Information Access Mode of operation, requesting as input a UPN associated with the consumer product, and providing as output the set of URL(s) registered with the consumer product identified by the UPN within the database of the system and pointing to HTTP-encoded documents containing particular types of product-related information.

Referring to FIG. 5C, the high level structure is shown for a communication protocol that can be used among a client subsystem $C_a$, an IPD Server Sb, and an IPI Server Sc of the IPI finding and serving subsystem hereof when it is induced into the UPN-Directed Information Access Mode of operation from the point of view of the depicted client subsystem. FIG. 6C provides a high level flow chart illustrating the steps involved in carrying out this communication protocol when the IPI Finding and Serving Subsystem is in its UPN-Directed Information Access Mode of operation.

As indicated at Block A in FIG. 6C, when selected from the user-interface of an IPI Website, the third Check Box type button 21C automatically activates the UPN-Directed Information Access Mode of the IPI Finding and Serving Subsystem by sending an HTTP request to the IPD Server(s) 11 based on a URL hot-linked to the selected Check Box.

As indicated at Block B in FIG. 6C, this causes a particular type of HTML-encoded document (i.e. called an "HTML form" or "Web form document") residing on the IPD Server(s) 11 to be sent to the Web browser of the requesting client subsystem 13 and displayed on the information display frame 20C thereof (requesting this mode of service). As in the Manufacturer Website Search Mode described above, the HTML form sent in the UPN-Directed Information Access Mode may also use any HTML format commands, such as headers, paragraphs, and lists, but must include three unique items, namely: the METHOD by which the user input is to be sent; the ACTION, which specifies a URL to which the user input is to be sent, presumably, a CGI script within CGI 11B that will act upon the request appropriately; and a SUBMIT button, to send the completed form over the Internet via HTTP. In the illustrative embodiment, user input (i.e. a UPC or EAN number associated with a particular consumer product) is obtained by an Input Box, which allows the user (i.e. retail sales clerk or consumer) to type in or scan in a UPC or EAN number assigned to a consumer product on which product related information is sought.

As indicated at Block C in FIG. 6C, the consumer or retail clerk scans the bar coded consumer product, or enters the UPC or EAN number thereon into the Input Box of the HTML form, and selects the SUBMIT button thereon. In response thereto, the Web browser on the client subsystem 13 sends a GET request to the HTTP Server 11C of the IPD Server 11. When selecting the SUBMIT button on the HTML form, the Web browser executes the METHOD associated with the HTML form and sends the stored UPC (or EAN) value to the URL specified by ACTION associated with the HTML form (i.e. the Web browser performs the action specified in the ACTION). The ACTION of the HTML form specifies the URL of the CGI script within CGI 11B that will process the request from the HTML form. This amounts to the Web browser constructing a GET request for that URL, with the arguments (the query string) being attached to the end of the URL. The arguments of the HTML form are specified by the INPUT items of the HTML form (i.e. the UPC or EAN number on the consumer product on which information is sought).

As indicated at Block D, the HTTP (http) program 11C passes the arguments (the UPC or EAN numbers in the query string) to the CGI program 11B and the CGI script translates the Web query string into a proper query to the RDBMS 11A of the IPD Server 11.

As indicated at Block E, the translated query is used to search the RDBMS 11A and find the set of URLs (i) linked to the registered consumer product (by the manufacturer or agent thereof) assigned the UPC or EAN number entered into the Input Box of the HTML form, and (ii) pointing to HTML (or FTP) documents on the WWW containing particular types of consumer product related information. The result returned from the RDBMS 11A is an ASCII record specifying the set of URLs satisfying the above criteria. In order for the Web browser of the requesting client subsystem to display the results of the database search during this mode, the ASCII record must be converted into a HTML document (i.e. Web output form).

As indicated at Block F, the CGI script 11B creates the elements of an HTML document (Web output form), inserts the result from the RDBMS 11A into the Web output form, and sets the content-type of this HTML document to text/html. In the illustrative embodiment, when the Web output form is displayed by the requesting client subsystem, a set of URLs categorized by particular product information types is displayed on the information display frame 20C Notably, this set of URLs points to particular types of consumer product related information registered within the RDBMS 11A of the system.

As indicated at Block G, the consumer or retail sales clerk can then access and display any HTML document (Web page) located at a particular URL within the information menu by selecting the same using a touch screen, mouse, or other input selection device.

Trademark-Directed Search Mode of Operation

Figure 5D:
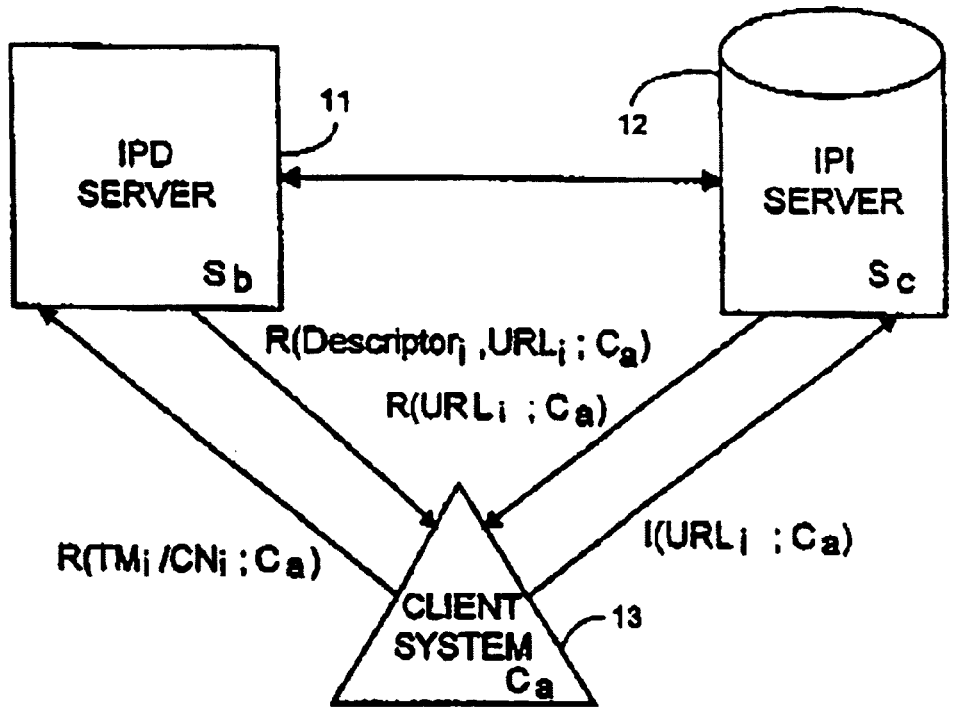
FIG. 5D is a schematic diagram illustrating the high level structure of a communication protocol that can be used among the client subsystem $C_a$, the IPD Server $S_b$, and the IPI Server $S_c$ of the IPI Finding and Serving Subsystem hereof when the subsystem is in its Trademark-Directed Search Mode of operation, requesting as input a trademark and/or company name, and providing as output the product descriptor(s) and a UPN (or set thereof) related to the trademark within the database of the system and pointing to HTTP-encoded documents containing particular types of product-related information.

Referring to FIG. 5D, the high level structure is shown for a communication protocol that can be used among a client subsystem $C_a$, an IPD Server Sb, and an IPI Server Sc of the IPI finding and serving subsystem hereof when it is induced into the Trademark-Directed Search Mode of operation from the point of view of the depicted client subsystem. FIGS. 6D through 6D23, taken together, provide a high level flow chart illustrating the steps involved in carrying out this communication protocol when the IPI Finding and Serving Subsystem is in its Trademark-Directed Search Mode of operation.

As indicated at Block A in FIG. 6D1, when selected from the user-interface of an IPI Website, the fourth Check Box type button 21D automatically activates the Trademark-Directed Search Mode of the IPI Finding and Serving Subsystem by sending an HTTP request to the IPD Server(s) 11 based on a URL hot-linked to the selected Check Box.

As indicated at Block B in FIG. 6D1, this causes a particular type of HTML-encoded document (i.e. called an "HTML form" or "Web input form document") residing on the IPD Server(s) 11 to be sent to the Web browser of the requesting client subsystem 13 and displayed on the information display frame 21C thereof (requesting this mode of service). As in the UPN-Directed Information Access Mode described above, the HTML form sent in the Trademark-Directed Search Mode may also use any HTML format commands, such as headers, paragraphs, and lists, but must include three unique items, namely: the METHOD by which the user input is to be sent; the ACTION, which specifies a URL to which the user input is to be sent, presumably, a CGI script within CGI 11B that will act upon the request appropriately; and a SUBMIT button, to send the completed form over the Internet via HTTP. In the illustrative embodiment, user input (i.e. the trademark or trade name used with a particular consumer product on which information is sought) is obtained by an Input Box, which allows the user (i.e. retail sales clerk or consumer) to type in the trademark or trade name believed or otherwise known to be used in connection with a particular consumer product on which information is sought.

As indicated at Block C in FIG. 6D1, the consumer or retail clerk enters the trademark or trade name into the Input Box of the HTML form, and selects the SUBMIT button thereon. In response thereto, the Web browser on the client subsystem 13 sends a GET request to the HTTP Server 11C of the PD Server 11. When selecting the SUBMIT button on the HTML form, the Web browser executes the METHOD associated with the HTML form and sends the stored trademark value to the URL specified by ACTION associated with the HTML form (i.e. the Web browser performs the action specified in the ACTION). The ACTION of the HTML form specifies the URL of the CGI script within CGI 11B that will process the request from the HTML form. This amounts to the Web browser constructing a GET request for that URL, with the arguments (the query string) being attached to the end of the URL. The arguments of the HTML form are specified by the INPUT items of the HTML form (i.e. the trademark or trade name used in connection with the consumer product on which information is sought).

As indicated at Block D in FIG. 6D1, the HTTP (http) program 11C passes the arguments (the trademark or trade name in the query string) to the CGI program 11B and the CGI script translates the Web query string into a proper query to the RDBMS 11A of the IPD Server 11.

As indicated at Block E in FIG. 6D1, the translated query is used to search the RDBMS 11A in order to find all registered consumer products having product descriptions (PD) registered within the RDBMS that are related to the trademark or trade name entered into the Input Box of the HTML form. The result returned from the RDBMS 11A is an ASCII record specifying each triplet data set (Product Description, UPN and Manufacturer) which satisfies the above trademark search criteria (to a particular degree) entered into the Input Box of the HTML form. In order for the Web browser of the requesting client subsystem to display the results of the database search during this mode, the ASCII record must be converted into another HTML form for use in refining the consumer product information search.

At Block F in FIG. 6D2, the CGI script 11B creates the elements of another HTML document (Web auxiliary input form), inserts the preliminary search result from the RDBMS 11A into the Web auxiliary input form, and sets the content-type of this HTML document to text/html. In the illustrative embodiment, the Web auxiliary-input form has an ACTION which specifies the URL of a CGI script within CGI 11B that will act upon the request appropriately as if the system were in the UPN-Directed Information Access Mode. The Web auxiliary input form includes an Input Box listing all triplet data sets (i.e. Product Description, Manufacturers and UPN number) satisfying the input trademark search criteria entered in the primary Web input document, described hereinabove. The qualifying triplets listed in the Input Box are provided with a Radio-Button to allow the consumer or retail sales clerk to select one of the triplets from the list thereof for use in a subsequent refined search of the RDBMS 11A. The Web auxiliary-input form also has a SUBMIT button for sending the HTML form back to the HTTP Server 11C for processing.

As indicated at Block G in FIG. 6D2, when the consumer or retail sales clerk makes a selection with the Radio-Button and then selects the SUBMIT button, the Web browser on the client subsystem 13 sends a request to the HTTP program 11C of the IPD Server 11 to get the completed HTML form.

As indicated at Block H in FIG. 6D2, the HTTP (http) program 11C passes the arguments (the trademark or trade name in the query string) to the CGI program 11B, and the CGI script translates the Web query string into a proper query for use in searching RDBMS 11A of the IPD Server 11.

At Block I in FIG. 6D2, the query is used to search the RDBMS 11A in order to find the set of URLs (i) related to the registered consumer product (by the manufacturer or agent thereof) assigned the UPN, (Product Description and Manufacturer) entered into the Input Box of the HTML (auxiliary) form, and (ii) pointing to HTML (or FTP) documents on the WWW containing particular types of consumer product related information. The result returned from the RDBMS 11A is an ASCII record specifying the set of URLs satisfying the above criteria. In order for the Web browser of the requesting client subsystem to display the results of the database search during this mode, the ASCII record must be converted into a HTML document (i.e. Web output form).

At Block J in FIG. 6D2, the CGI script 11B creates the elements of an HTML document (Web output form), inserts the result from the RDBMS 11A into the Web output form, sets the Content-type of this HTML document to text/html, and sends the HTML form to the requesting client subsystem.

At Block K in FIG. 6D3, the set of URLs categorized by particular product information types is displayed within the output HTML form on the information display frame 20C. Notably, this set of URLs points to particular types of consumer product related information registered within the RDBMS 11A of the system by the manufacturer of the product or its agent(s) thereof using the UPN/URL management tools accessible during the Manufacturer/Product Registration Mode hereof.

As indicated at Block L in FIG. 6D3, the consumer or retail sales clerk can access and display any HTML document (Web page) located at a particular URL within the displayed information menu by selecting the same using a touch screen, mouse, or other input selection device available at the requesting client subsystem 13.

Product-Description Directed Mode of Operation

Figure 5E:
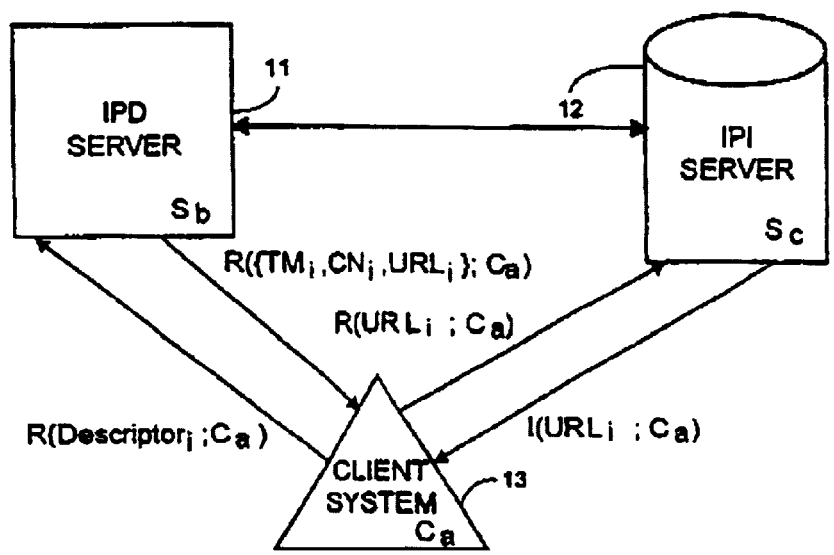
FIG. 5E is a schematic diagram illustrating the high level structure of a communication protocol that can be used among the client subsystem $C_a$, the IPD Server $S_b$, and the IPI Server $S_c$ of the IPI Finding and Serving Subsystem hereof when the subsystem is in its Product-Description Directed Search Mode of operation, requesting as input a product descriptor related to the consumer product on which information is sought and providing as output the trademark, company name and URL(s) related to the product descriptor within the database of the system and pointing to HTTP-encoded documents containing particular types of product-related information.

Referring to FIG. 5E, the high level structure is shown for a communication protocol that can be used among a client subsystem $C_a$, an IPD Server Sb, and an IPI Server Sc of the IPI Finding and Serving Subsystem hereof when it is induced into the Product-Description Directed Mode of operation from the point of view of the depicted client subsystem. FIGS. 6E1 through 6E3 provides a high level flow chart illustrating the steps involved in carrying out this communication protocol when the IPI Finding and Serving Subsystem is in its ProductDescription Directed Mode of operation.

As indicated at Block A in FIG. 6E1, when selected from the user-interface of an IPI Website, the fifth Check Box type button 21E automatically activates the Product-Description Directed Search Mode of the IPI Finding and Serving Subsystem by sending an HTTP request to the IPD Server(s) 11 based on a URL hot-linked to the selected Check Box.

As indicated at Block B in FIG. 6E1, this causes a particular type of HTML-encoded document (i.e. called an "HTML form" or "Web input form document") residing on the IPD Server(s) 11 to be sent to the Web browser of the requesting client subsystem 13 and displayed on the information display frame 21C thereof (requesting this mode of service). As in the Trademark-Directed Search Mode described above, the HTML form sent in the Product-Description Directed Search Mode may also use any HTML format commands, such as headers, paragraphs, and lists, but must include three unique items, namely: the METHOD by which the user input is to be sent; the ACTION, which specifies a URL to which the user input is to be sent, presumably, a CGI script within CGI 11B that will act upon the request appropriately; and a SUBMIT button, to send the completed form over the Internet via HTTP. In the illustrative embodiment, user input (i.e. the description or descriptor for a particular consumer product on which information is sought) is obtained by an Input Box, which allows the user (i.e. retail sales clerk or consumer) to type in the product description for a particular consumer product on which information is sought.

As indicated at Block C in FIG. 6E1, the consumer or retail clerk enters the product description into the Input Box of the HTML form, and selects the SUBMIT button thereon. In response thereto, the Web browser on the client subsystem 13 sends a GET request to the HTTP Server 11C of the IPD Server 11. When selecting the SUBMIT button on the HTML form, the Web browser executes the METHOD associated with the HTML form and sends the stored product description to the URL specified by ACTION associated with the HTML form (i.e. the Web browser performs the action specified in the ACTION). The ACTION of the HTML form specifies the URL of the CGI script within CGI 11B that will process the request from the HTML form. This amounts to the Web browser constructing a GET request for that URL, with the arguments (the query string) being attached to the end of the URL. The arguments of the HTML form are specified by the INPUT items of the HTML form (i.e. the product description for the consumer product on which information is sought).

As indicated at Block D in FIG. 6E1, the HTTP (http) program 11C passes the arguments (the product description in the query string) to the CGI program 11B and the CGI script translates the Web query string into a proper query to the RDBMS 11A of the IPD Server 11.

As indicated at Block E in FIG. 6E1, the translated query is used to search the RDBMS 11A in order to find all registered consumer products having trademarks or trade names within the RDBMS that are linked to the product description entered into the Input Box of the HTML form. The result returned from the RDBMS 11A is an ASCII record specifying each triplet data set (Trademark, UPN and Manufacturer) which satisfies the above product-description search criteria (to a particular degree) entered into the Input Box of the HTML form. In order for the Web browser of the requesting client subsystem to display the results of the database search during this mode, the ASCII record must be converted into another HTML form for use in refining the consumer product information search.

At Block F in FIG. 6E2, the CGI script 11B creates the elements of another HTML document (Web auxiliary input form), inserts the preliminary search result from the RDBMS 11A into the Web auxiliary input form, and sets the Content-type of this HTML document to text/html. In the illustrative embodiment, the Web auxiliary-input form has an ACTION which specifies the URL of a CGI script within CGI 11B that will act upon the request appropriately as if the system where in UPN-Directed Information Access Mode. The Web auxiliary input form includes an Input Box listing all triplet data sets (i.e. Trademark, Manufacturer, and UPN number) satisfying the input product-description search criteria entered in the primary Web input document, described hereinabove. The qualifying triplets listed in the Input Box are provided with a Radio-Button to allow the consumer or retail sales clerk to select one of the triplets from the list thereof for use in a subsequent refined search of the RDBMS 11A. The Web auxiliary-input form also has a SUBMIT button for sending the HTML form back to the HTTP Server 11C for processing.

As indicated at Block G in FIG. 6E2, when the consumer or retail sales clerk makes a selection with the Radio-Button and then selects the SUBMIT button, the Web browser on the client subsystem 13 sends a request to the HTTP Server 11C of the IPD Server 11.

As indicated at Block H in FIG. 6E2, the HTTP (http) program 11C passes the arguments (the product description in the query string) to the CGI program 11B, and the CGI script translates the Web query string into a proper query for use in searching RDBMS 11A of the IPD Server 11.

At Block I in FIG. 6E2, the query is used to search the RDBMS 11A in order to find the set of URLs (i) linked to the registered consumer product (by the manufacturer or agent thereof) assigned the UPN, (Trademark and Manufacturer) entered into the Input Box of the HTML (auxiliary) form, and (ii) pointing to HTML (or FTP) documents on the WWW containing particular types of consumer product related information. The result returned from the RDBMS 11A is an ASCII record specifying the set of URLs satisfying the above search criteria. In order for the Web browser of the requesting client subsystem to display the results of the database search during this mode, the ASCII record must be converted into a HTML document (i.e. output HTML form).

At Block J in FIG. 6E2, the CGI script 11B creates the elements of an output HTML form, inserts the result from the RDBMS 11A thereinto, and sets the Content-type of this HTML document to text/htrl and sends a request to the HTTP 11C to get the HTML form.

At Block K in FIG. 6E3, the set of URLs categorized by particular product information types is displayed within the output HTML form on the information display frame 20C. Notably, this set of URLs points to particular types of consumer product related registered information within the RDBMS 11A of the system by the manufacturer of the product or its agent(s) thereof using the UPN/URL management tools accessible during the Manufacturer/Product Registration Mode hereof.

As indicated at Block L in FIG. 6E3, the consumer or retail sales clerk can access and display any HTML document (Web page) located at a particular URL within the displayed information menu by selecting the same using a touch screen, mouse, or other input selection device available at the requesting client subsystem 13.

The protocols described above can be realized using any suitable programming language including, for example, an object-oriented programming language such as the Java™ programming language.

Registration Solicitation Mode of the IPI Finding and Serving Subsystem

In the illustrative embodiments of the present invention, the data-synchronized IPD Servers of the system hereof are also provided with an "Automated Registration Solicitation Mode" programmed by the webmaster (or administrator) of the IPI Website(s). In this mode, each IPD Server analyzes the data collected within its Non-IPI Registrant Database. The data analysis procedure seeks to determine: (1) which "unregistered" products in the Non-IPI Registrant Database were the subject of an information request at the IPD Server; (2) how many hits (requests) were made for the product within a predetermined length of time (e.g. one week) by Internet users; and (3) whether the number of requests exceeds a particular "request threshold" (e.g. 100 requests in week period). Then for each unregistered product which has exceeded the request threshold, the IPD Server automatically sends an E-mail message to the associated company. Preferably, the E-mail message is designed to (i) inform the company of recent information requests for their products, and (ii) solicit the registration of such products with the IPD Server. Once registered with the system, such products can be easily found on the Internet by anyone wishing to use the product information finding techniques of the present invention.

Operation of the IPI Finding and Serving Subsystem and Method Hereof

When the Check Box button 21C is selected from the control frame 20B, the IPI Finding and Serving Subsystem enters its "UPN-Directed Information Access Mode" illustrated in FIG. 6C. Preferably, the user is provided with a choice of language (e.g. English, German, French, Japanese, Chinese, etc.) by way of an appropriate menu-selection screen. After the desired language selection is made, the home page is displayed upon the client subsystem's display screen. A typical display screen produced from the IPD Server might read as follows:

"Welcome to UPC-REQUEST™, the only Universal Product-Information Finding and Serving System on the Internet.

Have you purchased a particular product, or are you considering the purchase of a particular product, on which you would like current, up-to-date information from the manufacturer or advertiser?

Look no further than the UPC-REQUEST™ Universal Product-Information Finding and Serving System."

When the subsystem is in its "UPN-Directed Information Access Mode", a Web-based information resource pertaining to any commercial product registered with the system can be displayed and selected by the user in order to automatically access the same from the Internet. Such information resources can include advertisements, specifications, operation descriptions, product simulations, purchase information, maintenance information, warranty and servicing information, product updates, distributor/reseller information, incentives (e.g. discounts, rebates, coupons, etc.), electronic data transaction screens, etc. In this mode, desired product information is obtained by simply entering the registered product's UPN (e.g. its UPC's 12 digit numerical string) into the Input Box of the HTML form displayed in the information display frame 20C. Such data entry can be carried out manually using a keyboard data entry techniques, or automatically using a bar code symbol reader connected to the client subsystem as discussed in detail above. When using the seeded IPI Database described hereinabove, only the first six digits of the UPC number need be entered into the dialogue box. An exemplary display screen produced from the IPD Server might be as follows:

"Simply enter the 12 digit UPC the particular product; click REQUEST, and then wait for the display of the list of Web locators (URLs) at which the desired product information can be found on the Internet?"

In response to such data entry operations, a list or menu of URLs organized according to information subfield classifications as set forth, for example, in FIG. 4A2, are displayed on client subsystem $C_a$ making the request of the IPD Server. At this stage, another display screen associated with the HTML form produced from the IPD Server would appear with an exemplary message as follows:

"Please select the URL from the displayed URL Menu using the information subfield product information category displayed above. This will connect you to the product information related to the selected URL. You can return to the URL display list at anytime."

Upon selecting a particular URL from the displayed URL menu, video and audio information content are automatically served from the IPI Server 12 hosting the selected URL and thereafter displayed on the client subsystem 13.

When the Check Box button 21D is selected, the IPI Finding and Searching Subsystem enters its Trademark-Directed Search Mode, illustrated in FIGS. 6D1 through 6D3. Preferably, the user is provided with a choice of languages (e.g. English, German, French, Japanese, Chinese, etc.) by way of an appropriate menu-selection screen.

When the system is in its Trademark-Directed Search Mode, a predesignated information resource pertaining to any commercial product registered with the system can be automatically accessed from the Internet and displayed from the Internet browser of a client subsystem 13. Such information resources can include advertisements, specifications, operation descriptions, product simulations, product upgrade information, purchase information, maintenance information, warranty and servicing information, etc. In this mode, desired product information is obtained by simply entering the registered product's trademark(s) and/or associated company name into the Input Box of the HTML form displayed on the information display frame 20C of the client subsystem. An exemplary message associated with the HTML form produced from the IPD Server 11 might be as follows:

"Simply enter the trademark used in connection with the particular product and/or the company name of the product's manufacturer; click REQUEST, and then wait for the display of a list of Web locators (URLs) at which desired types of product information can be found on the Internet?"

In response to such data entry operations, a list of URLs organized according to the information subfield classifications set forth in FIG. 4A2 is displayed on the client subsystem placing the request. Upon selecting a particular URL from the displayed list thereof, video and audio information content are automatically served from the IPI Server hosting the selected URL and thereafter displayed on the client subsystem.

In an alternative embodiment of the present invention, the UPN-Directed Information Access Mode and the Trademark-Directed Search Mode can be integrated into a single server application so that there is no need or desire to manually select between mode activation buttons 21C and 21D, respectively. In such an embodiment, the interaction between the IPD Server and the requesting client subsystem can be designed to support the following Web server display screens and script underlying the same:

"Welcome to UPC-REQUEST™, the only Universal Product-Information Finding and Serving System on the Internet.

Have you purchased a particular product, or are you considering the purchase of a particular product, on which you would like current, up-to-date information from the manufacturer or advertiser?

Look no further than the UPC-REQUEST™Universal Product Information Finding and Serving System."

"Simply enter the 12 digit UPC number of the particular product, click REQUEST, and select from the displayed menu of Web locators (URLs) to find the desired product information on the WWW.

"If you do not know the UPC number associated with the product you are looking for, then simply enter the trademark used in connection with the particular product and/or the company name of the manufacturer, then click REQUEST, and wait for the display of the list of Web locators (URLs) at which the desired product information can be found?

"Please select the URL from the displayed URL list by clicking on it. This will connect you to the product information related to the selected URL. You can return to the URL display list at anytime."

Notably, such an integrated Web server application can be realized in a variety of ways. The exact words and graphics used to create an interactive script for an integrated Web server application will vary from embodiment to embodiment of the present invention.

In instances when an IPI Website in accordance with the present invention is being served to consumers in retail environments using a computer-based kiosk as shown in FIG. 3A2, the consumer as well as retail sales clerk is presented with the option of ascertaining the price of a product in the store. This is achieved by simply depressing the "Price Display" button 21F on Control Strip 20B, shown in FIG. 3C, to engage the system in its price lookup/display mode. In this mode of operation, the consumer then need only scan the UPC bar code symbol on the product using the bar code scanner 26 in order for the price to be looked-up in the Product Price Database maintained in the Retailer's Price Server (RPS) 35, and displayed on the kiosk display screen. In general, the Product Price Database of the hosting retailer can be made accessible by the computer-based kiosk in several possible ways. As shown in FIG. 2, one way is to place the retailer's RPS on Internet (by using an HTTP server) and connect the RPS to the IPD Server 11 of the system by way of a CGI well known in the art. The CGI can be made accessible only by authorized client subsystems (e.g. computer-based kiosks installed in the hosting retailer's store and possible administrators of the information delivery system of the present invention). An alternative technique of connecting the Product Price Database to each computer-based kiosk would involve providing the RPS with a direct interface to each computer-based kiosk in the hosting retailer's store(s). This alternative technique may require the use of computer networking technology well known in the art.

A Best Mode Embodiment of IPI Finding and Serving Subsystem of the Present Invention The IPI finding subsystem (i.e. system) of the present invention can be realized on the Internet in a variety of different ways. Each embodiment of the system will provide manufacturers, retailers, consumers and sponsors with various benefits hitherto unachievable using prior art systems and methodologies. A best mode embodiment of the system will now be described below with reference to Intent-to-Use (ITU) servicemarks that Applicant has sought to register under the Lanbam Act and ultimately to use in reducing the Internet-based consumer product information finding system to commercial practice in the near future. The inventive subject matter herein disclosed can be readily applied to carry out such an Internet-based information finding and delivery system.

Figure 7:
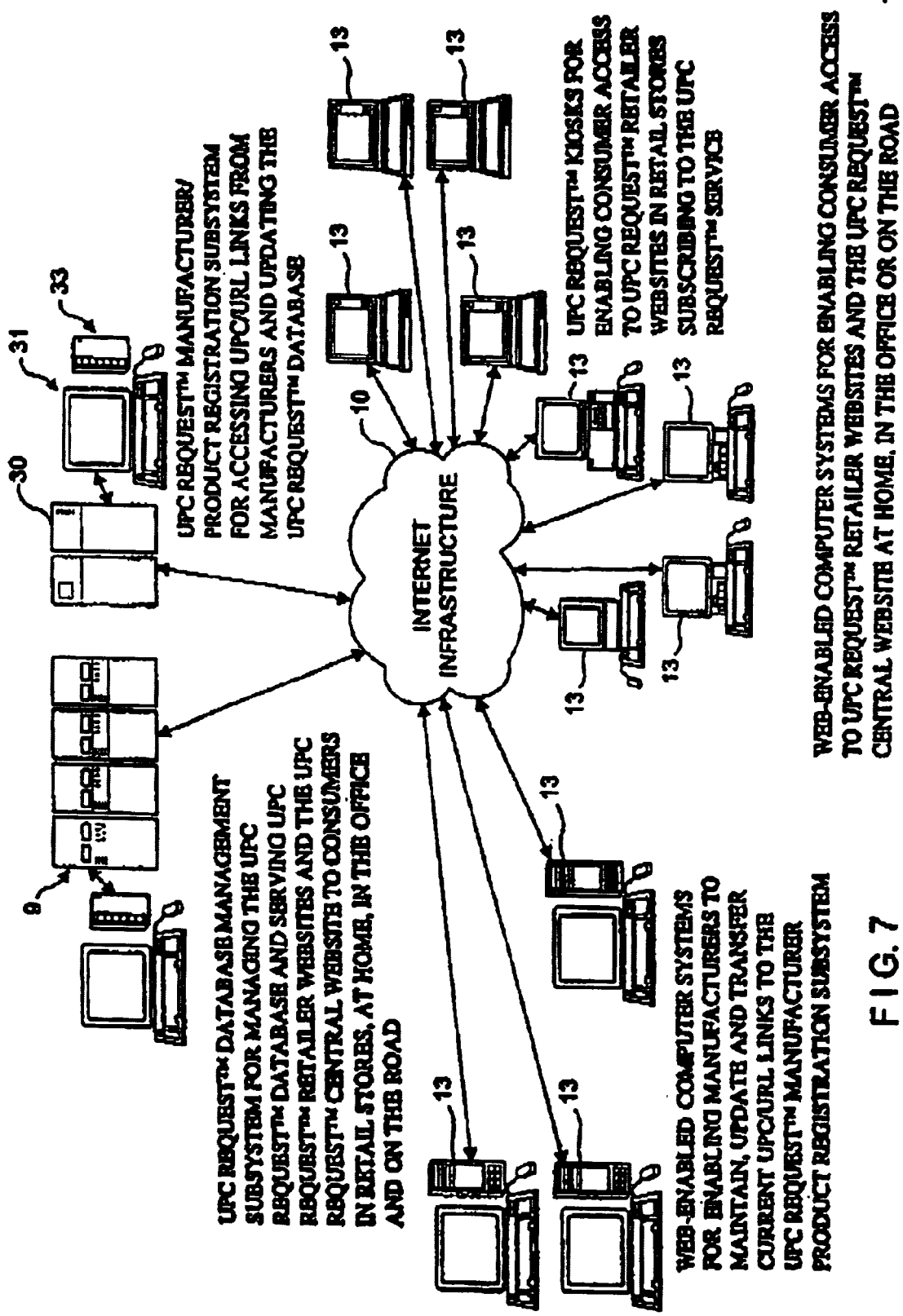
FIG. 7 is a schematic representation of an exemplary embodiment of the IPI Finding and Delivery Subsystem of the present invention showing the various constituent subsystems thereof.
Figure 8:
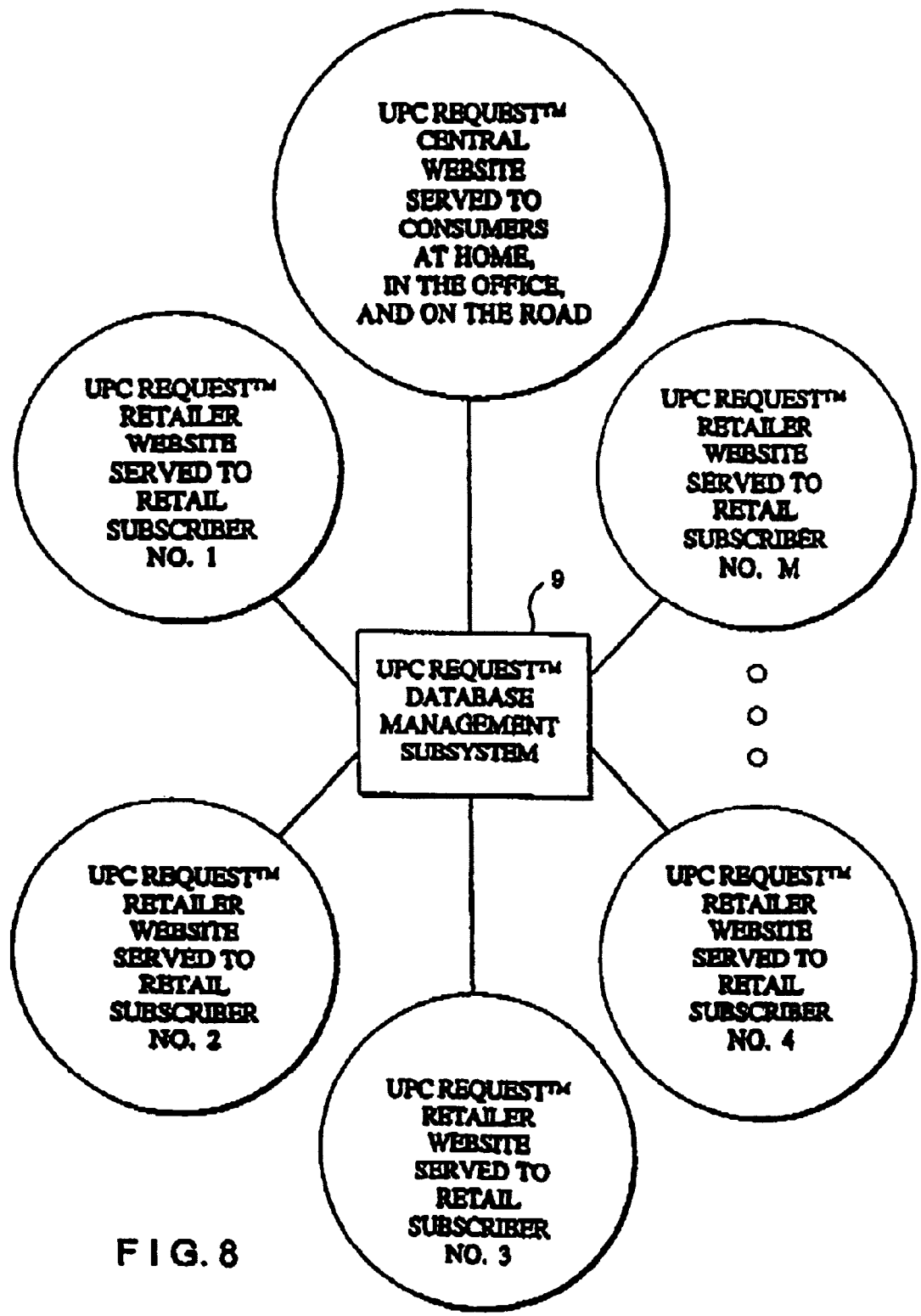
FIG. 8 is a schematic representation of portfolio of Websites supported and managed by the UPN/URL database management subsystem with the assistance of the manufacturer/product registration subsystem and Web-enabled client subsystems operated by manufacturers and/or their agents in accordance with the information management principles of the present invention.

According to the best mode embodiment, the IPI Finding and Serving Subsystem 2, referred to as the "UPC REQUEST™ Consumer Product Information Finding System" in FIGS. 7 and 8 hereof, comprises an integration of several subsystems including, for example: the UPC REQUEST™ Manufacturer/Product Registration Subsystem 33 (e.g. Web Document Server 30 and Workstation 31) including Wed-based and Value Added Networks (VAN)-based infrastructure and processes 14 for supporting EDI and UPN/URL database management operations by manufacturers and/or their agents; the UPC REQUEST Database Management Subsystem 9 interfaced with the UPC REQUEST™ Manufacturer/Product Registration Subsystem 33; numerous UPC REQUEST™ kiosks (e.g. client subsystems 13) installed in retail stores, retail outlets and the like, each having a bar code symbol driven Internet browser providing access to the Internet through an Internet Service Provider (ISP); and all of the Web-enabled client subsystems 13 located in consumer homes, in consumer offices and on the road, having access to the Internet through an ISP. While distributed geographically, these subsystems are integrated through the infrastructure of the Internet.

The function of the UPC REQUEST™ Manufacturer/Product Registration Subsystem 33 is two-fold: to enable qualified manufacturers to quickly and easily register their companies with the System (i.e. the UPC REQUEST™ Database Management Subsystem 9) by way of a Web-enabled computer system of their choice; and (2) enable manufacturers and/or their agents to easily link, manage and update their UPC numbers and linked URLs using any Web-enabled computer system 13 running the EDI-based UPN/URL Database Management software (downloaded during manufacturer registration), and periodically transmit such updated information to the UPC REQUEST™ Database Management Subsystem in order to update each manufacturer's information within the UPC REQUEST™ Database (i.e., IPI Database shown in FIGS. 4A1 and 4A2).

The function of the UPC REQUEST™ Database Management Subsystem 9 is to maintain and update the UPC REQUEST™ Database (shown in FIGS. 4A1, 4A2 and FIGS. 4C through 4C4), which contains various information items regarding registered manufacturers, service-subscribing retailers, and registered consumer products including, for example, UPC (and/or UPC/EAN) numbers assigned to consumer products and linked URLs pointing to published HTTP-encoded documents (i.e. Web pages) containing particular types of information related to such products.

Within the store of each retailer subscribing to the UPC REQUEST™ Consumer Information Service, the function of the UPC REQUEST™ kiosk is to provide consumer access to the UPC REQUEST™ Retailer Website (e.g. UPC REQUEST™@ Wal-Mart, UPC REQUEST™ @ Home Depot, etc.). The UPC REQUEST™ Retailer Website served to kiosks with the retailer's store provides consumer access to UPN/URL information links relating only to those products sold by the retailer and maintained within the UPC REQUEST™ Database Management System by the manufacturer or agent thereof. If desired by the subscribing retailer, its UPC REQUEST™ Retailer Website can be freely served to customers over the Internet, e.g. accessible from a hot-link embedded somewhere in the retailer's Website.

Within the realm of the UPC REQUEST™ System 2, the function of the Web-enabled client computer system 13 of each consumer, wherever it may be located (e.g. at home, in the office or on the road), is to provide consumer access to the UPC REQUEST™ Central Website which is freely served over the Internet to any consumer having a Web-enabled computer system. Unlike each UPC REQUEST™ Retailer Website maintained by the UPC REQUEST™ Database Management System, the UPC REQUEST™ Central Website provides consumer access to UPN/URL information links relating to every product maintained within the UPC REQUEST™ Database Management System by every registered manufacturer. Any attempt by a consumer to access information from a particular UPC REQUEST™ Retailer Website regarding a product not sold in the retailer's store will automatically result in a link over to the UPC REQUEST™ Central Website.

A Brief Description of the UPC REQUEST™ Service

When installed in retail stores, the UPC REQUEST™ System will provide five revolutionary Internet-based consumer information services under the servicemarks HOME-PAGE™, INFO-LINK™, CYBER-SERVICE™, TRADE-MARK™ and PRODUCT-TYPE™, respectively. Each of these information services is accessible to consumers and sales clerks alike from a UPC REQUEST™ Retailer Website (e.g. UPC REQUEST™ @ Home Depot Website) accessed within a retail store, as well as from on the UPC REQUEST™ Central Website.

To constantly remind the public at large of the "fee-paying" sponsors of the UPC REQUEST™ System, all Web pages displayed by the UPC REQUEST™ System in a retail store (e.g. on UPC REQUEST™ @ Home Depot Website), or on the UPC REQUEST™ Central Website, will be displayed within a three-frame display "framework" comprising a sponsor frame, a control frame, and an information frame.

The "sponsor frame", located on the upper-most portion of the Internet browser screen, displays the sponsor's greeting such as, for example, "Welcome to UPC REQUEST™, sponsored by Visa and Federal Express."

The "control frame", located on the left-most side of the Internet browser screen, will provide five mode activations buttons. The first mode activation button 21A enables consumers to request the INFO-LINK™ service. The second mode activation button 21B enables consumers to request the HOME-PAGE™ service. The third mode activation button 21C enables consumers to request CYBER-SERVICE™. The fourth mode activation button 21D enables consumers to request TRADE-MARK™. The fifth mode activation button 21E enables consumers to request PRODUCT-TYPE™. A sixth button enables the download a free plug-in software module which automatically installs a "Product Information" button on the graphical user interface of the consumer's Internet browser, so that the UPC REQUEST™ Central Website can be accessed anywhere in the world with a single click of the mouse button.

The "information frame", occupying the balance of the Internet browser screen, will display: all HTTP (i.e. Web) and FTP pages launched by in-store scanning of UPC-labeled products during HOME-PAGE™ or CYBER-SERVICE™; all HTTP and FTP pages launched by clicking on hypertext-links embedded within Web pages accessed through a particular UPC REQUEST™ Retailer Website in retail stores or from the UPC REQUEST™ Central Website; as well as all information search and display (menu) screens served by a UPC REQUEST™ Retailer Website on the UPC REQUEST™ Central Website.

In retail stores subscribing to the UPC REQUEST™ System, HOME-PAGE™ manufacturer's website search site will enable consumers to automatically access the WWW Home Page of any registered manufacturer by scanning the UPC (or UPC/EAN) bar code symbol on any product thereof using the bar code symbol reader associated with a UPC REQUEST™ kiosk. In general, the UPC REQUEST™ kiosk can be realized by any Web-enabled computer system 13 having an Internet browser program, on-line access to the UPC REQUEST™ Retailer Website, and optionally a touch-screen display panel. The UPC REQUEST™ kiosk may, however, be realized as an inexpensive Internet access terminal comprising a Web-enabled network computer (NC), an LCD touch-screen panel, and a laser scanning bar code symbol reader integrated within an ultra-compact housing that is mountable within diverse locations within retail stores. As shown in FIG. 3A5, the UPC REQUEST™ kiosk may also be integrated within a conventional Point Of Sale (POS) station having a laser scanning bar code symbol reader and a large rotatable LCD display panel. Being as easy to install as a telephone modem, UPC REQUEST™ kiosks of this design can be widely deployed throughout retail stores world-wide with minimal modifications to the preexisting information infrastructure.

At home, in the office, or on the road, HOME-PAGE™ enables consumers to automatically access the WWW Home Page of any registered manufacturer by entering the UPN (or UPC/EAN number) on any product into the search screen served up by a particular UPC REQUEST™ Retailer Website, or by the UPC REQUEST™ Central Website.

INFO-LINK™, carried out using EDI-based UPN/URL Database Management software (downloaded from Manufacturer/Product Registration Subsystem 33), enables manufacturers to simply relate (link), manage and update therein (i) the UPN (or UPC/EAN number) on any product with (ii) the Internet address (i.e. URL) of product-related Web pages published on the Internet by the manufacturer, its agents, or others, for subsequent access and display by consumers using CYBER-SERVICE™. While the INFO-LINK™ service would be made accessible through UPC REQUEST™ kiosks 13 in retail stores (i.e. for the sake of vendors who frequent the same), the actual UPN/URL information linking and management operations associated with the INFO-LINK™ service will typically occur in the "back-offices" of registered manufacturers using Internet-enabled computer systems accessing INFO-LINK™ through a hot-linked URL posted on the UPC REQUEST™ Retailer Website and/or the UPC REQUEST™ Central Website.

CYBER-SERVICE™, accessible through a particular UPC REQUEST™ Retail Website or the UPC REQUEST™ Central Website, enables consumers at home, in the office, on the road, and in retail stores, to quickly access particular types of product-related information which have been published on the WWW by registered manufacturers, their agents and others about consumer products registered with the UPC REQUEST™ Database Management System. CYBER-SERVICE™ displays such product-related information in a menu-like format organized by particular information types (e.g., Product Advertisements, Product Endorsements, Product Reviews, Product Rebates and Incentives, Product Description, Product Manual/Instructions, Product Updates (at FTP Sites), Warranty and Repair Service, Direct Product Purchase, Retailers, Wholesalers, Complementary Products, Company Annual Report, Stock Purchase, etc.). Each displayed information menu associated with a consumer product contains hyperlinked URLs pointing to HTTP-documents containing particular types of product-related information linked to the product by the manufacturer or its agent.

When CYBER-SERVICE™ is selected from a particular UPC REQUEST™ Retail Website, each product-related Web page listed in the displayed "information menu" can be accessed and displayed simply by touching the corresponding Internet address (i.e. URL) displayed on the touch-screen display panel of the UPC REQUEST™ kiosk in the retail store. When CYBER-SERVICE™ is selected from the UPC REQUEST™ Central Website, each product-related Web page listed in the displayed "information menu" can be accessed and displayed simply by clicking the display screen thereof accessed by an Internet-enabled computer system.

TRADE-MARK™, accessible through a particular UPC REQUEST™ Retail Website or the UPC REQUEST™ Central Website, enables consumers to quickly access particular types of product-related information from the UPC REQUEST™ Database, by using the trademark or trade name of the related product. When this mode of service is requested, a search screen is displayed within the information frame so that the consumer or sales clerk can enter the trademark or trade name for the related consumer product.

PRODUCT-TYPE™, accessible through a particular UPC REQUEST™ Retail Website or the UPC REQUEST™ Central Website, enables consumers to quickly access particular types of product-related information from the UPC REQUEST™ Database, by using a descriptive term for the related product. When this mode of service is requested, a search screen is displayed within the information frame so that the consumer or sales clerk can enter a descriptive term for the related consumer product.

To maximize value to a particular retail store's customers, each UPC REQUEST™ Retail Website served at each retail store subscriber would be made accessible to consumers outside their retail stores (e.g. at home, in the office or on the road) by several Internet access methods including, for example: through a hot-linked URL posted on the retail store's Website, pointing to the UPC REQUEST™ Retail Website; through a publicly accessible URL, e.g.http://www.upcrequest.com/@ retail store; etc.

Benefits Provided to Sponsors Promoting the UPC REQUEST™ System

HOME-PAGE™ and CYBER-SERVICE™ will foster customer loyalty and patronage with sponsors by providing consumers with valuable product-related information before and after product purchases.

CYBER-SERVICE™ will provide sponsors with an economical and effective way of marketing products and services to their customers and shoppers worldwide.

HOME-PAGE™ will provide sponsors with valuable advertising space on the UPC REQUEST™ Central Website, for subleasing to retailers, manufacturers and business concerns.

INFO-LINK™ will provide sponsors with an effective way of promoting their products and/or services among manufacturers, retailers and consumers using the UPC REQUESTS™ System.

Benefits Provided to Customers Using the UPC REQUEST™ System in Retail Stores

HOME-PAGE™ will allow customers to automatically access the Home Page of any manufacturer's Website by simply scanning the UPC bar code symbol on any product thereof at any UPC REQUEST™ information kiosk in a retailer's store.

CYBER-SERVICE™ will allow customers to quickly access (by touch-screen URL selection) particular types of product-related information that have been published on the World Wide Web (WWW) by manufacturers, their agents or others, and registered within the UPC REQUEST™ Database through INFO-LINK™.

TRADE-MARK™ will allow customers to quickly access product related information menus from the UPC REQUEST™ Database using trademarks or trade names used in connection with the product on which information is being sought.

PRODUCT-TYPE™ will allow customers to quickly access product related information menus from the UPC REQUEST™ Database using descriptive terms related to the product on which information is being sought.

Benefits Provided to Customers Using the UPC REQUEST™ System at Home, in the Office, or on the Road HOME-PAGE™ will allow customers to automatically access the Home Page of any manufacturer's Website by simply entering the UPC (or UPC/EAN) number on any consumer product, into a UPC REQUEST™ search screen served from the UPC REQUEST™ Central Website and accessible to anyone using an Internet-enabled computer system at home, in the office, or on the road.

CYBER-SERVICE™ will allow customers to quickly access from the UPC REQUEST™ Database, particular types of product-related information that have been published on the WWW by manufacturers, their agents or others, and registered within the UPC REQUEST™ Database through the INFO-LINK™ service.

TRADE-MARK™ will allow customers to quickly access product related information menus from the UPC REQUEST™ Database using trademarks or trade names used in connection with the product on which information is being sought.

PRODUCT-TYPE™ will allow customers to quickly access product related information menus from the UPC REQUEST™ Database using descriptive terms related to the product on which information is being sought.

Benefits Provided to Retailers Providing UPC REQUEST™ System in their Stores

HOME-PAGE™ and CYBER-SERVICE™ will foster customer loyalty and patronage with retailers by providing shoppers with valuable product-related information before and after product purchases.

CYBER-SERVICE™ will provide retailers with an economical and effective way of marketing its products to customers and shoppers within its stores.

CYBER-SERVICE™ will provide retail sales personnel with an opportunity to learn about a retailer's products by scanning the UPC bar code symbols on such products, and selecting product-related Web pages for in-store review and sales-training sessions whenever customer demand allows.

HOME-PAGE™ and CYBER-SERVICE™ will provide retailers with valuable advertising space in their stores for subleasing to manufacturers and others (e.g. Local sponsors)

in order to self-finance the store-wide delivery of the UPC REQUEST™ Service.

TRADE-MARK™ will allow sales clerks and customers to quickly access product related information menus from the UPC REQUEST™ Database using trademarks or trade names used in connection with the product on which information is being sought.

PRODUCT-TYPE™ will allow sales clerks and customers to quickly access product related information menus from the UPC REQUEST™ Database using descriptive terms related to the product on which information is being sought.

Proposed Revenue Model for the UPC REQUEST™ System

The UPC REQUEST™ System will generate revenue from at least four sources: Manufacturer Fees paid by manufacturers who want to register their products and product-related Web pages with the UPC REQUEST™ Database; Retailer Fees paid by retailers who want to provide bar code driven access to the UPC REQUEST™ System in retail stores; Sponsor Fees paid by Sponsors of the UPC REQUEST™ System; and Advertiser Fees paid by advertisers on the UPC REQUEST™ Central Website.

Manufacturers desiring to register their consumer products and product-related Web pages within the UPC REQUEST™ Database would pay a one-time Manufacturer Registration Fee, based on volume of sales. An annual maintenance fee may be desired or necessary. Minimally, such fees should cover the cost of the EDI and UPN/URL Database Management software (and updates) automatically downloaded to each manufacturer upon registration. Such Web-based EDI software enables manufacturers to easily manage the UPC numbers and Web page URLs associated with their changing product lines, and to automatically transmit such information to the UPC REQUEST™ Manufacturer/Product Registration Subsystem in order that the UPC REQUEST™ Database Management Subsystem is periodically updated.

Retailers providing bar code driven access to the UPC REQUEST™ System in their retail stores would pay an annual Retailer License Fee based on the number of UPC REQUEST™ kiosks deployed therein (within store isles, at POS stations and behind information/service counters).

Each sponsor of the UPC REQUEST™ System would pay an annual Sponsor Fee for the right to display its name, trademark/servicemark and/or message in hypertext within a selected portion of the sponsor frame displayed by licensed UPC REQUEST™ kiosks in retail stores, as well as Internet-enabled computer systems accessing the UPC REQUEST™ Central Website. For marketing reasons, it would be desirable to limit the number of sponsors of the UPC REQUEST™ System at any instant in time.

Advertisers, who advertise on the UPC REQUEST™ Central Website, would pay an Advertiser Fee based on the time and location that the Web advertisement is displayed.

Usage of the UPC REQUEST™ in Diverse Retail Markets

The UPC REQUEST™ System can be used to provide consumers quick access to useful product-related information in diverse types of retail shopping environments including, for example, retail superstores, discount department stores, home-improvement stores, computer superstores, drugstores and pharmacies, music stores, video rental stores, bookstores, supermarkets, grocery stores and the like. Each of these retail markets provides a unique environment in which the UPC REQUEST™ System can be used by manufacturers of consumer products to effectively deliver product-related information to consumers in retail stores, at home, in the office or on the road, before and after consumer purchases.

As the UPC REQUEST™ System provides manufacturers with an effective way and means of making direct contact with present and future customers, it enables both manufacturers and retailers alike to influence demand in ways that have hitherto have been unavailable. Such features of the UPC REQUEST™ System present enormous growth opportunities in retail supply and demand chain management across diverse markets within our ever expanding global economy.

Modifications of the Illustrative Embodiments of the Invention

The present invention has been described in great detail with reference to the above illustrative embodiments. It is understood, however, that numerous modifications will readily occur to those with ordinary skill in the art having had the benefit of reading the present disclosure.

For example, in the illustrative embodiments described hereinabove, separate databases are maintained by each data-synchronized IPD Server for (i) registered products within the system, and (ii) non-registered products within the system. Notably, the reasons for using a dual database design of this sort would be based largely on economics, namely: only those companies who have paid the required maintenance (or registration) fees get their products and linked-URLs "registered" with the system, whereas non-paying companies and organizations do not get their products and linked-URLs registered with the system, regardless of how such product-URL information is ascertained (e.g. by solicitation versus data-mining).

Thus it is contemplated that in some embodiments of the present invention, each IPD Server will be designed to maintain only a single database for maintaining product-URL information currently available on the Internet. In such embodiments of the present invention, the concept of "non-registered" products will be altogether avoided, since the system implementation and administration may be designed to not require companies to pay maintenance (or registration) fees in order that their products and linked URLs are registered with the IPI system. Instead, some alternative income producing scheme will be used in such embodiments of the present invention (e.g. user fees, subscription fees, Internet browser-licensing fees, etc.) for system maintenance and administration.

When practicing the system and method of the present invention, it is preferred that the UPC label (with its human-readable UPC number) assigned to the particular product be attached, embossed or otherwise embodied on an accessible surface thereof. In addition to applying the UPC label to the external packaging of the product, it is preferred that the UPC label also be printed on any and all product instructions and manuals provided with the product. In this way, the UPC number can be easily read by a human being and then used to access a desired type of product information using the system and method of the present invention.

In order that the system hereof can be used to find information pertaining to large products such as automobiles, motorcycles, skidoos, farm machinery, boats, etc., the present invention also contemplates assigning UPNs (e.g. UPC or EAN numbers) to such products and attaching, embossing or otherwise embodying the same on an accessible surface thereof. Also, the UPN label can be printed on all instruction booklets and/or operating manuals normally provided with the product. In this way, information related to any particular product that is posted anywhere on the Internet and linked to URLs registered with the IPD Servers 11 of the system hereof can be readily found using the unique UPC number assigned thereto by the manufacturer at the time of sale. Notably multimedia information about such products can be most helpful in regard to the operation, repair and servicing of such products.

The system and method of the present invention has been shown to combine the use of UPNs, trademarks and company names when making a product information request of the system. It is understood, however, that the present invention can be practiced using anyone of these items of information, alone or in combination with each other, in order to place a product information request with the system hereof.

Also, while the system of the illustrative embodiment has been shown used to collect, transport and serve information related to consumer products, it is understood that the system can be used to link the URLs of HTML (and other Internet) documents with consumer services assigned uniform service numbers (USN) which may be based on the UPC or EAN numbering system, or some other suitable system. In such alternative embodiments, the IPI Database would contain information pertaining to uniform service numbers (USN) that have been linked to the URLs of HTML or like documents on the Internet by the manufacturer or its agents, in essentially the same manner as conducted for consumer products. Such USN/URL management operations can be carried out in a similar to that described in connection with UPN/URL management along the retail supply and demand chain.

In connection with the consumer service information embodiment of the present invention, it is understood that at present, few (if any) services have been assigned a UPC (or EAN) number in the manner that nearly all consumer products have been assigned in the contemporary period. In spite of this fact, however, the present invention contemplates the need and utility of widespread assignment of UPC, EAN or similar numbers by service providers to particular services (as well as the imprinting of UPC, EAN or similar symbols on printed service brochures and advertisements. Notably, assigning uniform service numbers (USNs) to particular services, and labeling printed and graphical brochures and advertisements with such universal numbers, will provide a number of new opportunities hitherto unavailable.

In particular, service-related information could be easily found (i.e. located and accessed) on Websites using the system and method of the present invention, and thereafter the service can easily be procured through an electronic data transaction. In accordance with the present invention, this can be achieved by uniquely identifying and assigning "particular" services by a Universal Service Code (USC) which has many if not all of the attributes of a conventional UPC. While not necessary, a single digit may be optionally added to the USC in order to demark that services are being identified rather than products. An example of such USC labeling would be printing an assigned UPC label (number) on: admission tickets to a theatrical, dramatic or musical performance and/or its playbill; admission tickets to a movie; admission ticket to a concert and/or its concert program; admission tickets to a sporting event and/or its sports program; admission tickets to an art, science or history museum; admission tickets to the zoo or botanical gardens; and the like. The UPC label would be encoded to identify a particular event at which an entertainment, educational or professional service is provided. The UPC label printed on the tangible medium associated with the promotion of or access to the particular service would then be registered with the IPI Registrant Database of the system hereof, along with the name of the provider of the service, and a list of URLs that identify the Web locations at which particular kinds of information related to the particular service can be found (in accordance with the categories of FIG. 4A2).

These and all other such modifications and variations are deemed to be within the scope and spirit of the present invention as defined by the accompanying Claims to Invention.

What is claimed is:

1. A method of managing and delivering manufacturer-specified consumer product information to consumers in the marketplace, said method comprising the steps of:

(a) for a plurality of UPN-labeled consumer products offered for sale within a the marketplace, having the manufacturer of said plurality of UPN-labeled consumer products or an agent thereof, access a relational database and store therein, information elements representative of (1) a plurality of universal product numbers (UPNs) assigned to said plurality of UPN-labeled consumer products manufactured by said manufacturer and registered with said relational database, and (2A) a trademark (TM) symbolically linked to each said UPN, (2B) a product description (PD) symbolically linked to each said UPN, and (2C) one or more uniform resource locators (URL) symbolically linked to each said UPN, wherein each said URL specifies the location of an information resource located on the Internet and related to one of said plurality of UPN-labeled consumer products registered with said relational database by said manufacturer, and wherein a UPN/TM/PD/URL data link is created and maintained in said relational database for each said UPN-labeled consumer product registered with said relational database by the manufacturer;

(b) operably connecting an Internet information server to the infrastructure of the Internet and to said relational database, so as to enable said Internet information server to service a request made by an Internet-enabled client computer, for information on the Internet about one of said plurality of UPN-labeled consumer products registered with said relational database by said manufacturer and/or its agent;

(c) operably connecting one or more Internet-based product information servers, to the infrastructure of Internet, in which information resources related to one or more of said plurality of UPN-labeled consumer products are stored at said plurality of URLs;

(d) operably connecting a plurality of Internet-enabled client computers to the infrastructure of the Internet;

(e) transmitting from at least one of said Internet-enabled client computers, a request for information on the Internet about a UPN-labeled consumer product registered with said relational database, wherein each said request transmitted by said Internet-enabled computer may include either the UPN, TM and/or PD symbolically linked to the UPN assigned to a registered UPN-labeled consumer product on which consumer product information on the Internet is being sought by a consumer within said marketplace;

(f) receiving at said Internet information server, the request transmitted by said Internet-enabled client computer, and recovering the UPN, TM and/or PD contained in said request so as to enable said Internet information server to access said URLs symbolically linked to the UPN, TM and/or PD and stored in said relational database, and then transmit said accessed URLs to said Internet-enabled client computer for display to and use by a consumer in accessing information resources stored in said Internet-based product information server, at said URLs;

(g) automatically soliciting the registration of consumer products by manufacturers whose UPN/TM/PD/URL data links have been accessed but were not available in said relational database, and (h) enabling a manufacturer and/or its agents to dynamically update and manage UPN/TM/PD/URL data links associated with the manufacturer.

2. The method of claim 1, wherein at least one of said Internet-based client computers comprises an Internet-enabled consumer product information kiosk installed within said marketplace, wherein said Internet-enabled consumer product information kiosk has (i) a bar code symbol reader for reading the UPN labels on said plurality of UPN-labeled consumer products and entering UPN information into said Internet-enabled consumer product information kiosk, (ii) a data entry and display screen for entering TM and PD related information into said Internet-enabled consumer product information kiosk and displaying consumer product information resources accessed from Internet-based information servers, and (ii) UPN, TM and PD directed modes of consumer product information search operation.

3. The method of claim 1, wherein said UPN assigned to each said UPN-labeled consumer product is a unique Uniform Product Code (UPC) number assigned to said UPN-labeled consumer product.

4. The method of claim 2, wherein said Internet-enabled consumer product information kiosk comprises an Internet browser program enabling either the UPN, TM and/or TM symbolically linked to the UPN of a registered UPN-labeled consumer product, to be used to access consumer product information contained within said Internet-based product information servers on the Internet.

5. The method of claim 1, wherein said information resources contain multi-media information content relating to one or more of said plurality of UPN-labeled consumer products.

6. The method of claim 1, wherein said manufacturer or an agent thereof uses an Internet-enabled browser to access said relational database, and store UPN/TM/PD/URL data links therein.

7. The method of claim 1, wherein said bar code symbol reader is an automatic laser-scanning bar code symbol reader used to read the UPN-label on at least one of said plurality of UPN-labeled consumer products.

8. A system for managing and delivering manufacturer-specified consumer product information to consumers within a marketplace, said system comprising:

a relational database accessible by the manufacturer of a plurality of UPN-labeled consumer products offered for sale within the marketplace, or by an agent thereof, for storing therein information elements representative of (1) a plurality of universal product numbers (UPNs) assigned to a plurality of UPN-labeled consumer products manufactured by said manufacturer and registered with said relational database, and (2A) a trademark (TM) symbolically linked to each said UPN, (2B) a product description (PD) symbolically linked to each said UPN, and (2C) one or more uniform resource locators (URLs) symbolically linked to each said UPN, wherein each said URL specifies the location of an information resource located on the Internet related to one of said plurality of UPN-labeled consumer products registered with said relational database by said manufacturer, and wherein a UPN/TM/PD/URL data link is created and maintained in said relational database for each UPN-labeled consumer product registered with said relational database by the manufacturer, and offered for sale in said marketplace an Internet information server, operably connected to the infrastructure of the Internet and said relational database, and being capable of servicing a request made by an Internet-enabled client computer, for information on the Internet about one of said plurality of UPN-labeled consumer products registered with said relational database by said manufacturer;

a plurality of Internet-based product information servers, each operably connected to the infrastructure of Internet and storing information resources located at one or more of said plurality of URLs stored in said relational database, and being related to one or more of said plurality of UPN-labeled consumer products;

a plurality of Internet-enabled client computers installed within said marketplace, each said Internet-enabled client computer being operably connected to the infrastructure of the Internet and being capable of transmitting a request therefrom for information resources on the Internet about a UPN-labeled consumer product registered with said relational database;

wherein each said request may include either the UPN, TM and/or PD symbolically linked to the UPN assigned to a registered UPN-labeled consumer product on which consumer product information on the Internet is being sought by a consumer within said retail store environment, whereby each request transmitted by said Internet-enabled client computer is received by said Internet information server, and the UPN, TM and/or PD contained in said request is recovered by said Internet information server and used to access said URLs symbolically linked to the UPN, TM and/or PD and stored in said relational database, and said URLs accessed from said relational database are transmitted to said Internet-enabled client computer for display to and use by a consumer in accessing information resources stored in said Internet-based product information servers, at said URLs;

means for automatically soliciting the registration of consumer products by manufacturers whose UPN/TM/PD/URL data links have been accessed but were not available in said relational database; and means for enabling a manufacturer and/or its agents to dynamically update and manage UPN/TM/PD/URL data links associated with the manufacturer.

9. The system of claim 8, wherein said UPN assigned to each said UPN-labeled consumer product is a unique Uniform Product Code (UPC) number assigned to said UPN-labeled consumer product.

10. The system of claim 8, wherein at least one of said Internet-enabled client computers comprises an Internet-enabled consumer product information kiosk having (i) an automatic bar code symbol reader for automatically reading the UPN labels on said plurality of UPN-labeled consumer products and entering UPN information into said Internet-enabled consumer product information kiosk, (ii) a touch-type data entry and display screen for entering TM and PD related information into said Internet-enabled consumer product information kiosk and displaying consumer product information resources accessed from Internet-based information servers, and (ii) UPN, TM and/or PD directed modes of consumer product information search operation.

11. The system of claim 8, wherein each said Internet-enabled client computer comprises an Internet browser program enabling either the UPN, TM and/or PD symbolically linked to the UPN of a registered UPN-labeled consumer product, to be used to access consumer product information contained within said Internet-based product information servers on the Internet.

12. The system of claim 8, wherein said information resources contain multi-media information content relating to one or more of said plurality of UPN-labeled consumer products.

13. The system of claim 10, wherein said automatic bar code symbol reader is an automatic laser scanning bar code symbol reader.

14. The system of claim 8, wherein the manufacturer or an agent thereof uses an Internet-enabled browser to access said relational database, and store UPN/TM/PD/URL information links therein.

* * * * *

UNITED STATES PATENT AND TRADEMARK OFFICE
CERTIFICATE OF CORRECTION

PATENT NO. : 7,089,199 B2
APPLICATION NO. : 10/281336
DATED : August 8, 2006
INVENTOR(S) : Thomas J. Perkowski It is certified that error appears in the above-identified patent and that said Letters Patent is hereby corrected as shown below:

On the Title page (73), replace with the following:

Assignee:

IPF, Inc. of Stamford, Connecticut

Signed and Sealed this

Ninth Day of January, 2007

JON W. DUDAS
*Director of the United States Patent and Trademark Office*